(12) United States Patent
Williams et al.

(10) Patent No.: US 7,746,042 B2
(45) Date of Patent: Jun. 29, 2010

(54) LOW-NOISE DC/DC CONVERTER WITH CONTROLLED DIODE CONDUCTION

(75) Inventors: Richard K. Williams, Cupertino, CA (US); Kevin P. D'Angelo, Santa Clara, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/890,947

(22) Filed: Aug. 8, 2007

(65) Prior Publication Data
US 2008/0084197 A1 Apr. 10, 2008

Related U.S. Application Data

(60) Provisional application No. 60/849,862, filed on Oct. 5, 2006, provisional application No. 60/931,225, filed on May 22, 2007.

(51) Int. Cl.
*G05F 1/618* (2006.01)
(52) U.S. Cl. .................................. 323/223; 323/282
(58) Field of Classification Search ................. 323/223, 323/282, 222; 363/39, 41, 127, 56.04; 327/110
See application file for complete search history.

(56) References Cited

U.S. PATENT DOCUMENTS

| 5,457,624 | A | 10/1995 | Hastings | 363/127 |
|---|---|---|---|---|
| 5,672,993 | A * | 9/1997 | Runaldue | 327/404 |
| 6,038,154 | A | 3/2000 | Boylan | 363/127 |
| 6,107,844 | A * | 8/2000 | Berg et al. | 327/110 |
| 6,275,399 | B1 * | 8/2001 | Miyazaki et al. | 363/98 |
| 6,333,623 | B1 * | 12/2001 | Heisley et al. | 323/280 |
| 6,381,159 | B2 | 4/2002 | Oknaian et al. | 363/98 |
| 6,747,441 | B2 * | 6/2004 | Johnson et al. | 323/282 |
| 6,798,178 | B1 * | 9/2004 | Bayadroun | 323/274 |
| 6,961,253 | B1 | 11/2005 | Cohen | 363/89 |
| 7,605,571 | B2 * | 10/2009 | Kung et al. | 323/223 |
| 2006/0158127 | A1 * | 7/2006 | Xu | 315/128 |
| 2006/0192589 | A1 * | 8/2006 | Okazaki et al. | 326/112 |
| 2007/0040542 | A1 * | 2/2007 | Cortigiani et al. | 323/312 |
| 2008/0084197 | A1 * | 4/2008 | Williams et al. | 323/282 |

OTHER PUBLICATIONS

Adel Sedra and Kenneth Smith, Microelectronic Circuits, Dec. 1991, Third Edition, Saunders College Publishing, p. 428.*

* cited by examiner

*Primary Examiner*—Harry Behm
(74) *Attorney, Agent, or Firm*—Patentability Associates

(57) ABSTRACT

The synchronous rectifier MOSFET in a Buck or boost DC/DC converter is operated as a current source rather than being turned off, thereby reducing undesirable losses in efficiency, the generation of unwanted electrical and radiated noise, and numerous other potential problems, particularly when the converter is operating in a light-load condition.

18 Claims, 31 Drawing Sheets

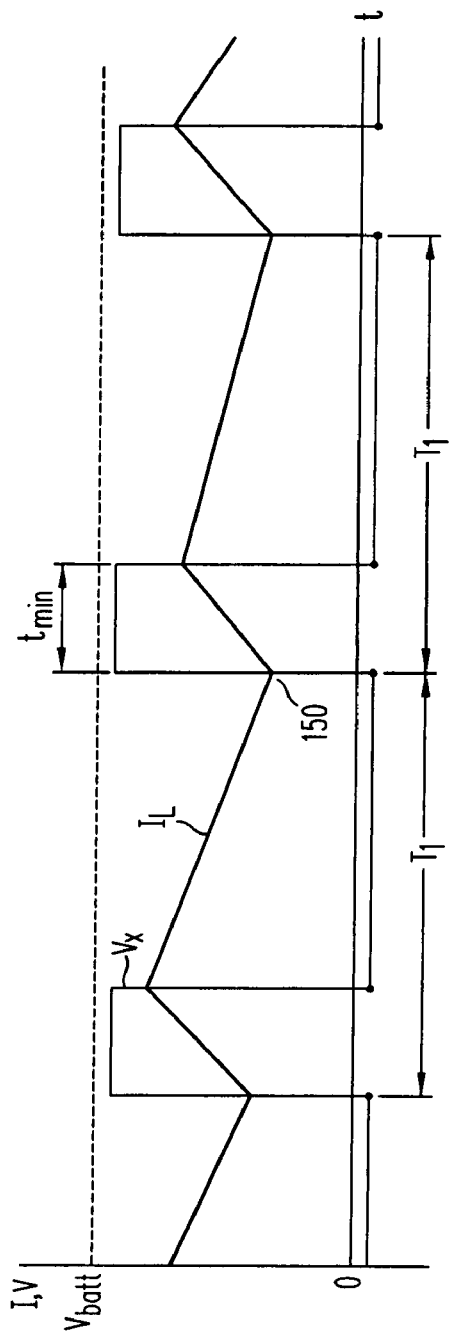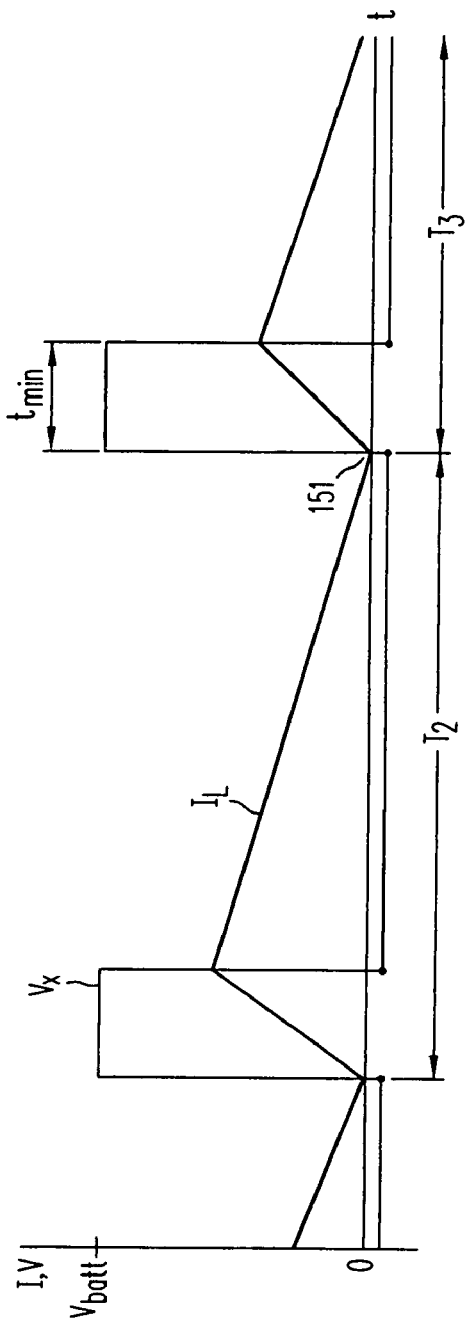

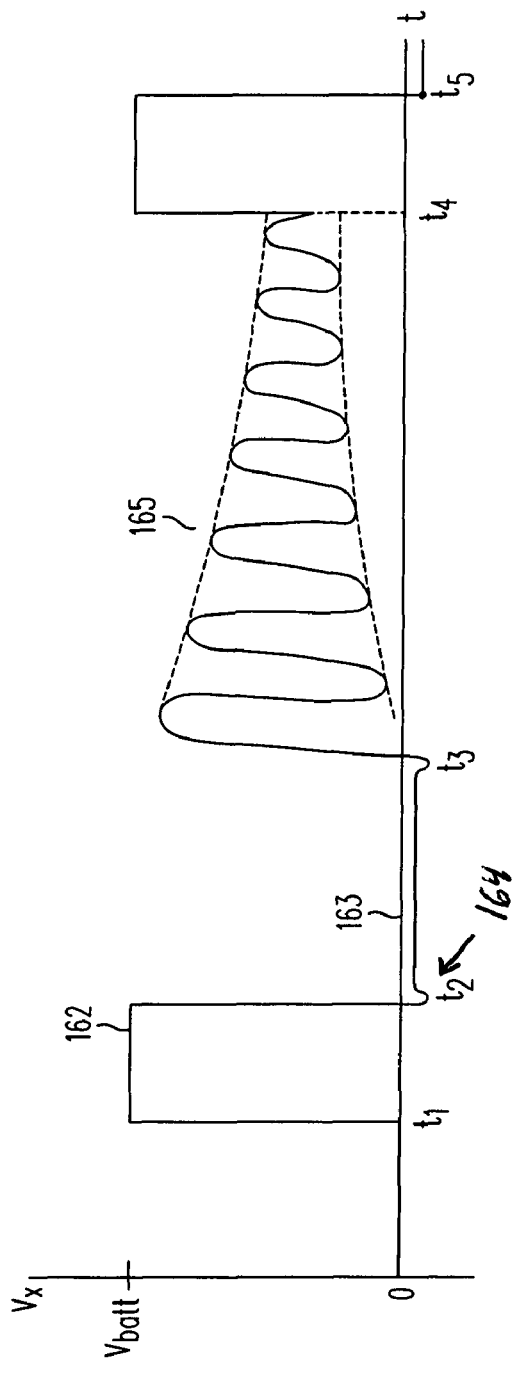
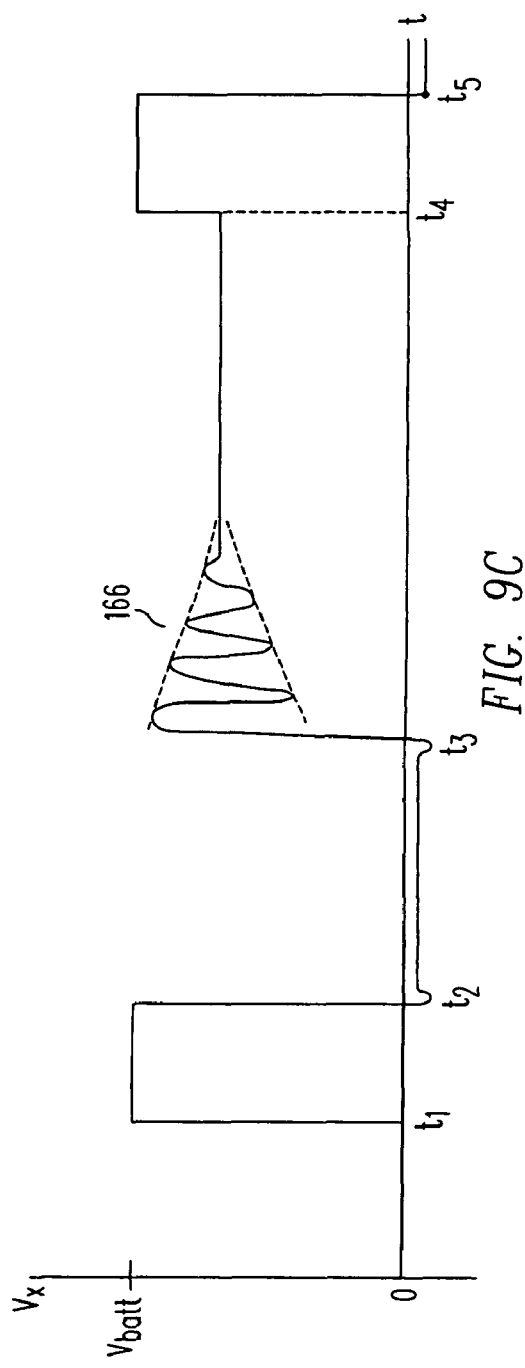
FIG. 9B
FIG. 9C

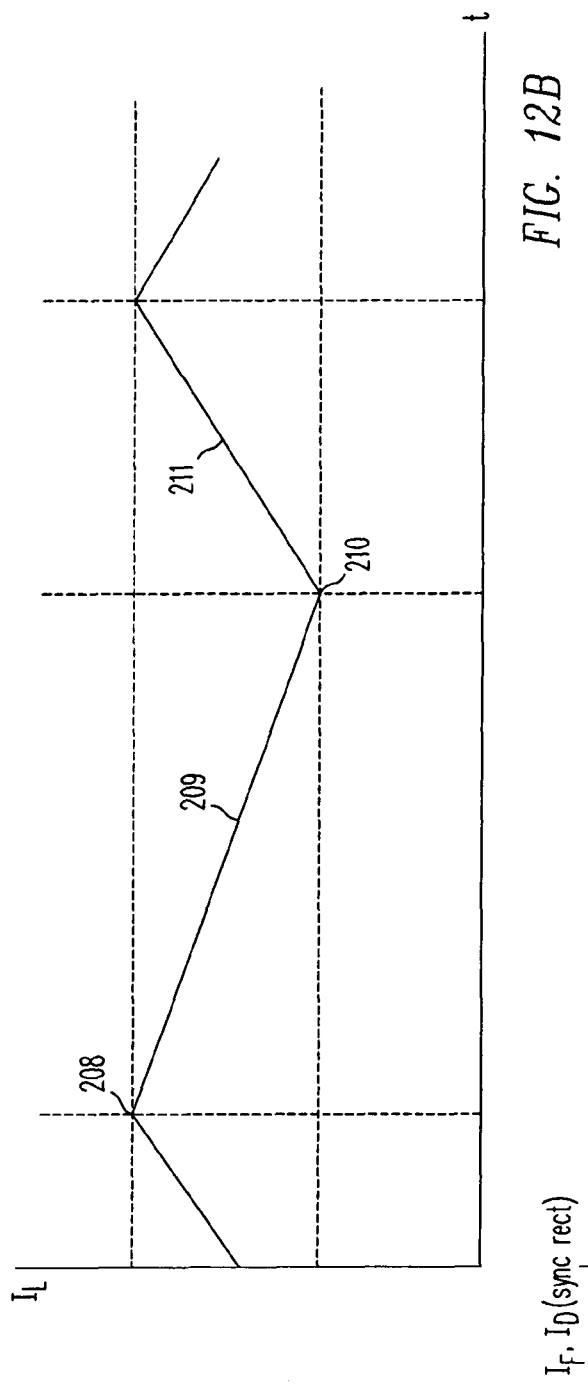
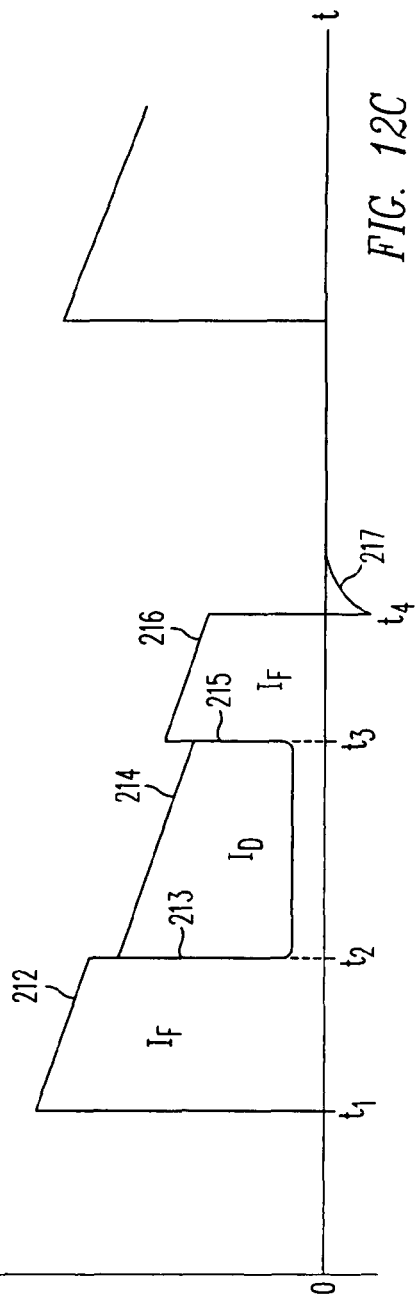
FIG. 12B
FIG. 12C

LOW-NOISE DC/DC CONVERTER WITH CONTROLLED DIODE CONDUCTION

This application claims the priority of Provisional Application No. 60/849,862, filed Oct. 5, 2006, which is incorporated herein by reference in its entirety.

FIELD OF THE INVENTION

This invention pertains to the design, operation and performance of switching power supplies for use in DC/DC conversion and voltage regulation, and to the semiconductor components used in such converters.

BACKGROUND OF THE INVENTION

Voltage regulation is commonly required to prevent variations in the supply voltage powering various microelectronic components such as digital ICs, semiconductor memories, display modules, hard disk drives, RF circuitry, microprocessors, digital signal processors and analog ICs, especially in battery powered application such as cell phones, notebook computers and consumer products.

Since the battery or DC input voltage of a product often must be stepped-up to a higher DC voltage, or stepped-down to a lower DC voltage, such regulators are referred to as DC-to-DC converters. Step-down converters, commonly referred to as Buck converters, are used whenever a battery's voltage is greater than the desired load voltage. Step-down converters may include inductive switching regulators, capacitive charge pumps, and linear regulators. Conversely, step-up converters, commonly referred to boost converters, are needed whenever a battery's voltage is lower than the voltage needed to power the load. Step-up converters may include inductive switching regulators or capacitive charge pumps.

Inductive Switching Converters

Of the voltage regulators referred to above, the inductive switching converter can achieve superior performance over the widest range of currents, input voltages and output voltages. The fundamental principal of a DC/DC inductive switching converter is that the current in an inductor (coil or transformer) cannot be changed instantly and that an inductor will produce an opposing voltage to resist any change in its current.

By using one or more transistors switching at a high frequency to repeatedly magnetize and de-magnetize an inductor, the inductor can be used to step-up or step-down the converter's input voltage, producing an output voltage that is different from its input voltage. The transistors are typically MOSFETs with a low on-state resistance, commonly referred to as "power MOSFETs." Using feedback from the converter's output voltage to control the switching conditions, a constant, well-regulated output voltage can be maintained despite rapid changes in the converter's input voltage or output current.

To remove any AC noise or ripple generated by the switching action of the transistors, an output capacitor is placed across the output terminals of the switching regulator circuit. Together the inductor and the output capacitor form a "low-pass" filter able to prevent most of the transistors' switching noise from reaching the load. The switching frequency, typically 1 MHz or more, must be high relative to the resonant frequency of the filter's "LC" tank. Averaged across multiple switching cycles, the switched inductor behaves like a programmable current source with a slow-changing average current.

Since the average inductor current is controlled by transistors that are either biased as "on" or "off" switches, the power dissipation in the transistors is theoretically small, and high converter efficiencies, in range of 80% to 90%, can be realized. Specifically, when a power MOSFET is biased as an on-state switch using a "high" gate bias, it exhibits a linear I-V drain characteristic with a low $R_{DS}(on)$ resistance, typically 200 milliohms or less. At a current of 0.5 A, for example, such a device will exhibit a maximum voltage drop $I_D \cdot R_{DS}(on)$ of only 100 mV despite its high drain current. The power dissipated during its on-state conduction time is equal to $I_D^2 \cdot R_{DS}(on)$. In the example given above, the power dissipation during the time the transistor is conducting is equal to $(0.5 \text{ A})^2 \cdot (0.2\Omega)$, or 50 mW.

In its off state, a power MOSFET has its gate connected to its source, so that its source-to-gate voltage $V_{GS}=0$. Even with a drain voltage $V_{DS}$ equal to a converter's battery input voltage $V_{batt}$, a power MOSFET's drain current $I_{DSS}$ is very small, typically well below one microampere and more generally in the range of nanoamperes. The current $I_{DSS}$ consists primarily of junction leakage.

Thus, a power MOSFET used as a switch in a DC/DC converter is efficient because in its off condition it exhibits low currents at high voltages, and in its on state it exhibits high currents at low voltages. Ignoring switching transients, the $I_D \cdot V_{DS}$ product in the power MOSFET remains small, and power dissipation in the switch remains low. If the duration of the transistor switching events is relatively short compared to the period between switching events, the power loss during switching can be considered negligible or, alternatively, treated as a fixed power loss. At multi-megahertz switching frequencies, however, the switching waveform analysis becomes more significant and must be considered by analyzing the drain voltage, drain current, and gate voltage of the transistor as a function of time.

Buck Converter Operation

Shown in FIG. 1A is a common non-isolated step-down DC/DC converter topology of a Buck converter 1. Buck converter 1 includes a power MOSFET 4, an inductor 6, a Schottky diode 7, and a capacitor 9. With its positive terminal connected to the input battery voltage $V_{batt}$, MOSFET 4 acts like a "high-side" switch connecting to and controlling the current in inductor 6. Operation of MOSFET 4 is controlled by a pulse-width modulation (PWM) controller 2, with a gate buffer 3 driving the gate of MOSFET 4. Power MOSFET 4 may be a P-channel or N-channel MOSFET, with appropriate adjustments to gate buffer 3. Diode 5 is a P-N junction parasitic to MOSFET 4, in parallel with its drain and source, and connected in a polarity such that diode 5 remains reverse-biased under normal operating conditions.

Schottky diode 7 has its cathode tied to MOSFET 4 and to inductor 6, an electrical node labeled by the voltage $V_x$. Capacitor 8 represents the capacitance parasitic to Schottky diode 7. Load 10 represents an electrical load connected to the output terminal of converter 1. The output voltage $V_{out}$ is fed back to the input terminal of PWM controller 2 as a feedback voltage $V_{FB}$, which controls the current $I_L$ in inductor 6 by controlling the switching of MOSFET 4.

Converter 1 is categorized as a "non-synchronous" or "conventional" Buck converter, since rectifier 7 is a diode rather than a MOSFET. Diode 7 conducts when MOSFET 4 is off, and must carry the full current $I_L$ through inductor 6 during such intervals. The power dissipation in Schottky diode 7 during conduction is $I_L \cdot V_f$, where $V_f$ is the forward voltage drop across Schottky diode 7. In this circuit a Schottky diode is used instead of a silicon P-N rectifier diode because Schottky diodes have a lower forward voltage drop and lower power dissipation. A Schottky diode typically has a $V_f$ under 400 mV, as compared to a $V_f$ of approximately 700 mV in a silicon P-N rectifier diode. Despite this, the power dissipation in Schottky diode 7 can be substantial, lowering the efficiency of converter 1 and creating thermal dissipation issues.

Under the operation of PWM controller 2, Buck converter 1 exhibits a voltage waveform at node $V_x$ of the kind shown in FIG. 2A. Prior to time $t_1$ the high side MOSFET 4 is in its on state, acting as a switch with a resistance $R_{DS}$(switch). The voltage at node $V_x$ and across rectifier diode 7 is then equal to $V_{batt}-I_L \cdot R_{DS}$(switch), a voltage that ideally is close to the input voltage $V_{batt}$. The voltage across the "off" Schottky diode 7 is illustrated by point 40 in the I-V characteristic of Schottky diode 7, shown in FIG. 3A. While the current appears to be "zero" on right side of the linear graph, a small leakage current flows through Schottky diode 7 when it is reverse-biased.

Referring again to FIG. 2A, at time $t_1$, the high-side MOSFET 4 is turned off and inductor 6 rapidly drives the voltage $V_x$ negative until Schottky diode 7 conducts, clamping $V_x$ to minus the forward voltage drop $V_f$ of Schottky diode 7, a voltage slightly below ground, as shown in by point 41 in FIG. 3A. During this transition, some negative overshoot and ringing beyond $-V_f$ occurs due to stray inductances associated with the components' bond wires and with conductive traces on the printed circuit board.

The voltage $V_x$ remains at $-V_f$ until PWM controller 2 turns on the high side power MOSFET 4 at time $t_2$. Schottky diode 7 then rapidly becomes reverse-biased, as the voltage $V_x$ returns to its starting condition. When MOSFET 4 starts to conduct, the entire supply voltage $V_{batt}$ is present across its drain-to-source terminals, i.e. $V_{DS} \approx V_{batt}$. Therefore, during this interval the drain-to source voltage $V_{DS}$ of MOSFET 4 is greater than its gate-to-source voltage $V_{GS}$.

In this condition, MOSFET 4 is temporarily in its saturated region of operation and behaves as a controlled current source rather than a switch. In saturation, a MOSFET is biased into an "on" state by enhancing its gate potential, thereby inverting the silicon beneath its gate to form a conductive channel. In the presence of a high drain-to-source voltage, the MOSFET "saturates" and exhibits a drain current relatively independent of its drain-to-source voltage.

As the saturated MOSFET 4 conducts current, it forces the low-side Schottky diode 7 into its off-state by reverse-biasing it, removing any stored minority carrier charge present within its junction. The process of removing charge stored in a diode by reverse-biasing it immediately following forward conduction is referred to as forced diode recovery, or "reverse recovery." In a Schottky diode, however, since very few minority carriers are present during conduction, the reverse recovery period can be very short or even negligible.

After the reverse recovery of diode 7, the voltage $V_x$ rises and $V_{DS}$ falls below $V_{GS}$ in the on-state MOSFET 4. When this happens, MOSFET 4 moves out of saturation and into its linear region of operation, an operating condition where $I_D$ exhibits a linear relationship with $V_{DS}$ and MOSFET 4 behaves like gate-controlled variable resistance. The resulting voltage transient $dV_x/dt$ depends on the parasitic capacitances and inductance in the circuit and the nature of the reverse recovery of Schottky diode 7. High transient rates can cause ringing, leading to conducted and radiated noise and associated electromagnetic interference. Some ringing can lead to overshoot above the input voltage $V_{batt}$ as a result of stray inductance in the circuit, particularly associated with Schottky diode 7, and may inadvertently forward-bias the P-N junction in the normally off parasitic diode 5.

The circuit is self-timed in the sense that only MOSFET 4 is under the control of PWM controller 2. Schottky diode 7 responds to the conditions imposed on it by inductor 6 and MOSFET 4, and does not require an independent control signal to determine when it conducts. The operating sequence of the non-synchronous Buck converter is summarized in Table 1:

TABLE 1

| Mode | High-Side | Low-Side | $I_L$ Direction | Diode Bias |
|---|---|---|---|---|
| Magnetization | On Switch ($R_{DS}$) | None | To Output | Reverse Bias (RB) |
| Recirculation | Off | None | | Forward Bias (FB) |
| Recovery | On Current Source | None | | Reverse Recovery |

As shown in Table 1, the switching sequence of a conventional Buck converter includes: charging the output capacitor and magnetizing the inductor through an on-state high-side MOSFET, recirculating inductor current through a forward biased Schottky rectifier while the MOSFET is off, and then turning the high-side MOSFET back on. In the last phase, referred to as "recovery", when the high-side MOSFET is turned on again, the voltage at the node between the high-side MOSFET and the inductor is initially below ground. After recovery, the entire cycle is repeated.

In summary, a conventional Buck converter comprises a single high-side power MOSFET operated as a switch, with a variable on-time that is used to control an output voltage, and a Schottky rectifier which must carry the inductor's full recirculation current, whenever the MOSFET switch is turned off.

Synchronous Buck Converter Operation

An alternative version of a Buck converter, known as a synchronous Buck converter, replaces the Schottky rectifier diode with a power MOSFET, where the power MOSFET is synchronized, i.e. controlled, to conduct whenever the other power MOSFET is switched off. A synchronous Buck converter therefore requires two power MOSFETs configured as a half-bridge or push-pull output to drive the inductor, where the low-side or ground-connected synchronous rectifier MOSFET is turned on when the high-side power MOSFET is turned off.

Since a MOSFET operated as a switch exhibits a linear I-V characteristic, it can be made sufficiently large to exhibit a low on-state resistance and a voltage drop lower than that of a Schottky diode. The synchronous rectifier MOSFET is generally in parallel with a diode, either a parasitic P-N junction diode or a discrete Schottky diode. The synchronous rectifier MOSFET, when conducting, shunts current from the diode and diverts it into the "channel" of the MOSFET. The addition of a synchronous rectifier complicates the operation of a Buck converter, since a break-before-make circuit is needed to guarantee that, during switching transitions, a brief moment exists when both MOSFETs are turned off, i.e. no current flows through either MOSFET.

An example of a synchronous Buck converter 20 is shown in FIG. 1B. Buck converter 20 comprises a power MOSFET 25, an inductor 27, a synchronous rectifier power MOSFET 28 in parallel, as described above, with a parasitic P-N diode 29, and an output filter capacitor 31. Operation of MOSFET 25 is controlled by a pulse-width modulation (PWM) controller 21, with a gate buffer 23 driving the gate of MOSFET 25. While PWM controller 21 is referred to as a "PWM controller," implying fixed-frequency variable-pulse-width operation, it may alternatively operate in a variable frequency, sometimes referred to as pulse-frequency-modulation (PFM) mode, where the clock period is allowed to vary, or alternatively alternating between PFM and PWM modes depending on load and input conditions. The term "PFM" is ambiguous as to whether a transistor's on time, off time, or both are varying. It is included here only as a reference to prior art terminology and is not used herein.

The energy input from the power source, a battery or other power input, is switched or gated through MOSFET 25. With its positive terminal connected to the battery or other power input, MOSFET 25 acts like a "high-side" switch controlling the current in inductor 27. Diode 26 is a P-N junction parasitic to MOSFET 25, in parallel with its drain and source. Capacitor 30 represents the capacitance parasitic to P-N diode 29.

By controlling the switching and on-time of MOSFET 25, the energy stored in the magnetic field of inductor 27 can be adjusted dynamically to control the voltage on output filter capacitor 31. The output voltage $V_{out}$ is fed back as a voltage $V_{FB}$ to the input of PWM controller circuit 21, which controls the current $I_L$ in inductor 27 through the repeated switching of MOSFET 25. Load 32 represents an electrical load connected to the output of Buck converter 20.

Driven out of phase with MOSFET 25 by gate buffer 24, synchronous rectifier MOSFET 28 conducts during a portion of the time when MOSFET 25 is off. In prior art synchronous Buck converters, synchronous rectifier MOSFET 28 never conducts when high-side MOSFET 25 is on and conducting. With its positive terminal connected to the inductor 27, i.e. to the node at which the intermediate voltage $V_x$ is present, and with its negative terminal connected circuit ground, MOSFET 28 acts like a "low-side" switch, shunting the current in diode 29. Diode 29 is a P-N junction parasitic to synchronous rectifier MOSFET 28, in parallel with its drain and source, and diode 29 therefore conducts substantial current only during the brief interval when both MOSFETs 25 and 28 are off, i.e. during the break-before-make interval, aided by parallel capacitor 30, shunting some fraction of the current transient.

Break-before-make (BBM) circuit 22 prevents shoot-through conduction by guaranteeing that MOSFETs 25 and 28 do not conduct simultaneously so as to short or "crow-bar" the input and power source of converter 20. During this brief BBM interval, diode 29 must, along with capacitor 30, carry the current $I_L$ through inductor 27. The break-before make interval occurs twice in one full cycle—once in the transition immediately after the high-side MOSFET 25 turns off before the synchronous rectifier MOSFET 28 turns on and a second time after the synchronous rectifier MOSFET 28 turns off but immediately before the high side MOSFET 25 turns on. In prior art synchronous Buck converters, synchronous rectifier MOSFET 28 never conducts during the break-before-make interval.

The BBM interval, while necessarily preventing shoot through conduction, can lead to a variety of conditions giving rise to oscillations and electrical noise. Noise in a synchronous Buck converter can be especially problematic during the interval after the synchronous rectifier has turned off just as the high side MOSFET turns on again, creating a transient condition known as "forced diode recovery". Noisy operation may also arise when using a synchronous rectifier under "light load" conditions, when the load is drawing low current and the current in the inductor can actually change direction temporarily.

Under normal PWM operation, synchronous Buck converter 20 exhibits a waveform on node $V_x$ as shown in FIG. 2B. Prior to time $t_1$ the high-side MOSFET 25 is in its on state acting as a switch with a resistance $R_{DS}$(switch). The intermediate voltage $V_x$ at the node between MOSFETs 25 and 28 and inductor 27 is then equal to $V_{batt}-I_L \cdot R_{DS}$(switch), a voltage ideally close to the input voltage $V_{batt}$, and both diode 26 and diode 29 are reverse biased. The voltage across the "off" rectifier diode 29 is illustrated at point 42 in the I-V characteristic of diode 29, shown in FIG. 3B. While the current appears to be "zero" on the linear graph, some leakage current flows through diode 29 under reverse bias conditions, albeit less than the leakage current that would flow through a Schottky diode.

At time $t_1$, high-side MOSFET 25 is turned off and the inductor 27 rapidly drives the voltage $V_x$ negative until P-N diode 29 conducts, clamping the voltage $V_x$ to the negative of the forward conducting voltage $V_f$ of diode 29, a voltage slightly below ground, as shown in by point 43 in the graph of FIG. 3B. Some overshoot and ringing occurs due to stray inductances associated with the components' bond wires and printed circuit board conductive traces. The transient behavior at time $t_1$, when the high-side transistor 25 turns off is similar to that of conventional Buck converter 1. In contrast to Buck converter 1, however, conduction in diode 29 persists only for a limited duration $t_{BBM}$ as determined by the break-before-make interval, and diode 29 need not carry the full current $I_L$ through inductor 27 during the entire recirculation stage.

At time $t_2$, equal to $t_1+t_{BBM}$, low-side synchronous rectifier MOSFET 28 turns-on and shunts a substantial portion of the current flowing in diode 29. The below ground potential of $V_x$ is then reduced from $-V_f$ to $-I_L \cdot R_{DS}$(sync rect), a voltage closer to zero as illustrated by point 44 in FIG. 3B. In the interval between time $t_2$ and time $t_3$, the current in inductor 27 re-circulates through synchronous rectifier MOSFET 28. Synchronous rectifier MOSFET 28 remains on until PWM controller 21 determines that the high side-MOSFET 25 must again be turned on.

Provided this interval of conduction through synchronous rectifier MOSFET 28 is not too long or the average inductor current $I_L$ is not too low, the polarity of the current $I_L$ flowing in inductor 27 will remain in the direction toward the output terminal of converter 20 and energy will flow from converter 20 toward its output terminal and into capacitor 31, a current direction we designate herein as "To Output".

The transition to conduction through high-side MOSFET 25 in synchronous Buck converter 20 involves first switching off the low-side synchronous rectifier MOSFET 28 for a second break-before-make interval $t_{BBM}$, during which time MOSFETs 25 and 28 are both "off", and letting the voltage across the forward conducting rectifier diode 29 temporarily return to a value of $-V_f$, as illustrated by point 43 in FIG. 3B. This occurs in the interval between time $t_3$ and time $t_4$ in FIG. 2B.

During this interval, stored charge once again begins to accumulate in the low-side rectifier diode 29. Since diode 29 represents a silicon P-N junction intrinsic to synchronous rectifier MOSFET 28 rather than a Schottky diode, it stores more charge and exhibits a higher forward voltage drop than Schottky diode 7 in Buck-converter 1. This additional stored charge adversely impacts the switching transition at time $t_4$, following the break-before-make interval.

Prior to time $t_4$, the voltage $V_x$ remains at $-V_f$ until the high side power MOSFET 26 turns back on and begins to conduct current. The forward conducting P-N rectifier diode 29 then becomes rapidly reverse-biased. Before the voltage $V_x$ can rise, however, all of the charge stored in rectifier diode 28 must be depleted. This circuit behavior is illustrated schematically by parasitic capacitor 30 to emulate prolonged conduction in P-N diode 29 resulting in the postponed rise of voltage $V_x$. Such operation is referred to as diode recovery.

At the onset of this switching transition, as the gate voltage of high-side MOSFET 25 is ramped up and $V_x$ is near ground potential, MOSFET 25 is temporarily biased with a drain-to-source voltage greater than its gate bias, i.e. $|V_{DS}|>|V_{GS}|$, and MOSFET 25 is "saturated." A saturated MOSFET behaves as a programmable current source where the drain current is strongly dependent on its gate bias but only minimally affected by its drain voltage. The switching waveform of conduction current in saturated MOSFET 25 influences the voltage transient across diode 29 as it recovers. If the voltage rise across the diode 29 is gradual, power dissipation in diode 29 is increased but the voltage switching transient may be relatively low in noise.

Conversely, if the voltage across diode 29 rises rapidly, power dissipation in diode 29 may be reduced, but significant overshoot and ringing can occur in the voltage $V_x$. Such behavior, referred to as "snappy" diode recovery, can lead to unwanted conducted and radiated noise and electromagnetic interference impacting both load and input connected circuitry and overall circuit performance. In some instances the voltage $V_x$ may "ring" above the input voltage $V_{batt}$ as a result of stray inductance in the circuit, and lead to unwanted forward biasing of high-side diode 26, which in turn can lead to more charge storage, oscillations and circuit instability.

During diode recovery, high-side MOSFET 25 is on and saturated like a current source but does not exhibit as a constant current because its gate is ramping as it tries to pull $V_x$ high. Because diode 29 holds the $V_x$ voltage near ground, MOSFET 25 is unavoidably saturated and behaves as a ramped current source until diode 29 recovers and $V_x$ rises. This condition actually lowers the converter's efficiency for two reasons. One reason is that the diode recovery current represents a power loss needed to extract minority carriers or supply recombination current until the diode 29 recovers and turns off. The diode recovery current behaves similar to shoot-through current since it supplied directly across the battery input terminals of the converter.

The other power loss occurs because MOSFET 25 is supporting high $V_{DS}$ drain voltage and increasing current simultaneously and therefore burns instantaneous power of magnitude $P_{xover}=I_D(t) \cdot V_{DS}(t)$. This loss is sometimes referred to as the MOSFET's switching or "cross-over" loss $P_{xover}$. Since the total power is the time integral of $P_{xover}$, it is most efficient to limit the time which MOSFET 25 remains in this condition with $V_{DS} \approx V_{batt}$. Unfortunately, diode 29 prevents the $V_{DS}$ from dropping until recovery is nearly complete.

The subject of diode recovery is discussed in greater detail in the next section of this application.

After the recovery of diode 29, $V_x$ rises and the drain-to-source voltage across high-side MOSFET 25 drops commensurately as the transistor eventually moves into its linear, i.e. variable resistor, mode of operation. The magnetization of inductor 27 again commences and the cycle begins anew.

Unlike the conventional Buck converter, where a single active MOSFET transistor is under control of a PWM controller, a synchronous Buck converter requires the control of two power MOSFETs driven to conduct out of phase and never to conduct simultaneously. As described, the operating sequence of a synchronous Buck converter under normal load conditions is summarized in the Table 2:

After recovery, the entire cycle is repeated. Note that the synchronous rectifier MOSFET is never on and conducting when the high-side MOSFET is conducting or during the break-before-make interval.

In summary, a synchronous Buck converter comprises a high-side power MOSFET operated as a switch with a variable on-time used to control an output voltage, a synchronous rectifier MOSFET that conducts some portion of the time when the high-side MOSFET is off and never when the high-side MOSFET is on, and a rectifier diode which must carry the inductor's recirculation current during switching transients, whenever both MOSFET's are turned off.

Forced Diode Recovery

In switch-mode circuits comprising a MOSFET half-bridge, i.e., a push pull stage, driving an inductor, such as a synchronous Buck converter, two important factors must be considered. First, both MOSFETs cannot operate as on-state switches at the same time without shorting out the power source input. The practical realization of this first consideration is to guarantee both MOSFET switches are never on simultaneously, generally by using sequential circuitry to turn off an on-state MOSFET switch, i.e. break the circuit, before turning on the other MOSFET, i.e. to "make" a connection. Such break-before-make (BBM) circuitry, also known as "shoot-through" protection, cross-over protection, dead-time control, etc., means that every switching transition includes an intermediate state when all the switches are off and the intermediate node "floats" to a voltage not determined by the switches.

The second consideration is that during any interval when both MOSFETs are off and the common node between them, which is connected to the inductor, floats, the inductor will necessarily drive the floating node to a voltage outside the supply rails powering the circuit. Whenever an inductor drives a node voltage in a circuit outside the power supply rails, a diode must either become forward biased or must experience avalanche breakdown to maintain current continuity in the magnetized inductor at the instant of the transition, namely $I_L(t_0-)=I_L(t_0+)$, i.e. to clamp the maximum inductor voltage. In general power applications, it is preferable to use the forward-biasing of a Schottky or a P-N junction diode rather than relying on an avalanche breakdown or Zener diode effect, primarily because of the lower voltage

TABLE 2

| Mode | High-Side | Low-Side | $I_L$ Direction | Diode Bias |
| --- | --- | --- | --- | --- |
| Magnetization | On Switch ($R_{DS}$) | Off | To Output | Reverse Bias (RB) |
| BBM | Off | Off | | Forward Bias (FB) |
| Recirculation | Off | On Switch ($R_{DS}$) | | Shunted FB |
| BBM | Off | Off | | Forward Bias (FB) |
| Recovery | On Current Source (Ramp) | Off | | Reverse Recovery |

As illustrated, the switching sequence of a synchronous Buck converter under normal load conditions comprises charging the output capacitor and magnetizing the inductor through a high-side MOSFET, turning off the high-side MOSFET and recirculating inductor current through a forward biased rectifier during a first BBM interval, turning-on and shunting the rectifier diode current through a synchronous rectifier MOSFET, turning off the synchronous rectifier MOSFET and again recirculating inductor current through the forward biased rectifier diode during a second BBM interval, and then turning the high-side MOSFET back on. In the last phase, referred to as "recovery", the voltage $V_x$ is initially below ground at the time of turn-on the high-side MOSFET.

drop, reduced power dissipation and higher efficiency offered by the forward-biased diode as a voltage clamp.

In non-isolated switching power supply topologies like the Buck converter, the synchronous Buck converter, the boost converter, and the synchronous boost converter, disconnecting the inductor from the battery or other input power source causes the inductor to immediately force diode conduction. Diode conduction, however, leads to unwanted charge storage which not only can increase power losses but more importantly can result in increased noise, ringing, and instability during switching events.

Synchronous rectification does not eliminate the diode charge storage problem, since a synchronous rectifier MOS- FET must be turned off before the other MOSFET is turned on, in order to meet the first consideration described above. The break-before-make interval allows the rectifier diode to conduct and store charge. In an integrated circuit or discrete implementation of power MOSFET, a silicon P-N junction diode parallel to the synchronous rectifier MOSFET conducts immediately upon switching off the synchronous rectifier MOSFET. Attempts to divert the current from the silicon diode using a discrete Schottky diode in parallel with the MOSFET offer limited benefits, especially since stray inductance prevents the Schottky diode from conducting within the short BBM interval.

In switched-inductor power circuits such as switching power supplies and PWM motor drives, significant noise can occur during rapid reverse-biasing of a power rectifier immediately following its forward-biasing, a condition known as forced diode recovery. FIGS. 4A-4C represent a phenomenological description of the forced-diode recovery process and its influence on switching transient generated noise in a synchronous Buck converter, e.g. in DC/DC converters topologically similar to synchronous Buck converter 20 in FIG. 1B. Specifically, circuit 50 in FIG. 4A illustrates an electrical equivalent of Buck converter 20 during diode recirculation immediately after high side MOSFET 25 is turned off, as represented by open switch 52.

In circuit 50, voltage source 51 represents the battery or other voltage input $V_{batt}$, resistor 54 represents an idealized approximation of load 32, and voltage-source 57 represents charged capacitor 31 which for short duration transients can be modeled as an AC short. Fixed current source 53 is an idealized representation of inductor 27 operating under steady state switching conditions—a valid assumption so long that the clock's switching frequency is substantially greater than the resonant frequency of the LC filter.

Diode 55 represents the forward-biased silicon P-N junction intrinsic to MOSFET 25, and capacitor 56 represents charge stored in the forward biased junction. So long that the leakage current $I_{DSS}$ in open switch 52 is substantially zero, i.e. typically less than one microampere, then the inductor current is entirely carried by diode 55, or $I_D=I_L$. A voltage $V_f$ develops across forward-biased diode 55 commensurate with this current level.

This condition persists during the entire BBM interval.

In FIG. 4B, circuit 60 represents converter 20 immediately after high-side MOSFET 25 is turned on. As a saturated device with a steadily rising gate voltage, MOSFET 25 is represented as a controlled current source 61 producing a relatively constant dI/dt and reverse biasing diode 55. Before $V_x$ can rise, however, all the charge stored in rectifier diode 29 must be depleted. This stored charge comprises both depletion capacitance represented by capacitor 56 and minority carriers stored in "real" junction diode 55, referred to as "diffusion capacitance". The transient current $i_C$ represents the current needed to discharge diffusion capacitance 56 while the current $i_{RR}$ describes the reverse recovery charge needed to overcome diffusion capacitance and turn-off the forward biasing of diode 56.

While depletion capacitance and diffusion capacitance each exhibit different transient characteristics, their combined impact determines the overall "diode recovery", a phenomenon delaying the cessation of conduction in P-N diode 55 and postponing the rise of voltage $V_x$.

It should be noted, that transient simulations in commonly-used circuit simulators such as SPICE and its derivatives do not accurately predict diode recovery waveforms, since the compact mathematical model for a P-N diode lacks the two-dimensional physics describing diffusion capacitance. Accurately simulating forced diode recovery requires a physics-based two-dimensional device simulator such as PISCES, MEDICI, etc., driven by time dependent bias conditions imposed by the overall circuit or by coupling device and circuit simulation together (see R. K. Williams et al., Int. Symp. Power Semi Dev (ISPSD91); pp. 254-257 (IEEE, 1991)).

As a general observation, compact-model circuit simulation produces a more "ideal" forced diode recovery waveform than the behavior of a real diode by underestimating the amount of stored charge and its associated power loss, underestimating the recovery delay caused by stored minority carriers, and by underestimating the $dV_x/dt$ that occurs at the conclusion of the recovery transition. By underestimating the voltage slew rate in a "snappy" diode, simulation also predicts less ringing on the $V_x$ pin than is observed in real circuits and thereby infers less noise and EMI problems than are actually encountered in physical systems. Another interpretation of this result is that any method that reduces dV/dt in compact-model circuit simulation is likely to produce an even greater improvement in real world implementations.

Circuit 70 in FIG. 4C illustrates synchronous Buck converter 20 immediately after high-side MOSFET 25 is turned on as a fully-enhanced on-state switch, represented as a resistor 72. The low-side diode 29 and synchronous rectifier MOSFET 28, now in their off state, are represented by open switch 75 exhibiting a leakage current $I_{DSS}$ that is substantially zero.

The recovery of diode 29 is illustrated in FIG. 5 as an overlay of its current and voltage waveforms versus time at the onset of reverse recovery. Prior to the transition diode 29 conducts current $I_f$ shown by line segment 81, and has a corresponding forward-bias voltage of $V_f$, shown by line segment 86. As the high side MOSFET 25 begins to conduct, it reduces the recirculation current flowing in diode 29, illustrated by sloping line segment 82.

The voltage across diode 29 diminishes only slightly due to the exponential nature of P-N diode conduction. At point 90 the current in the diode actually reverses direction, allowing current to momentarily flow from its cathode to its anode, backwards from normal conduction. Ideally, a diode will only let conduction occur when it is forward biased, i.e. when the current is flowing from its anode to its cathode. Because of unwanted stored charge, beyond point 90, reverse current is flowing in diode 55.

The magnitude of the reverse current increases until significant charge has been removed and can no longer support such levels of reverse current. At point 83 the reverse current reaches its peak value $I_{RR}$ then begins to decrease in magnitude along a more exponentially shaped curve 84. The totally integrated area of the reverse diode current versus time starting at point 90 and finishing at point 85, where the diode current is substantially zero, is defined as the reverse recovery charge $Q_{RR}$, having units of coulombs and expressed by the following:

$$Q_{RR} = \int_{t@pt.90}^{t@pt.85} I_D(t) \cdot dt$$

The onset of the rise of the voltage $V_x$ is delayed some time after the peak reverse current occurs but eventually begins to rise rapidly in line segment 87 as the last vestige of minority carrier charge is removed or recombines within the two-dimensional P-N junction. The voltage $V_x$ (the drain voltage of MOSFET 25) then overshoots, shown by line segments 88, and after ringing then settles to a steady state value of $[V_{batt}-I_L \cdot R_{DS}(\text{switch})]$ at point 89.

Another problem with the high dV/dt following diode recovery is MOSFET false turn-on induced noise. After diode conduction ceases and the drain voltage $V_x$ is rising rapidly, the equivalent circuit 100 of converter 20 can be represented as in FIG. 6A comprising a synchronous rectifier 101, a gate buffer 103, a temporarily saturated high-side MOSFET 102, and a fixed current source 104 representing inductor 27.

As illustrated, synchronous rectifier 101 comprises N-channel MOSFET 110, with integral gate-to-drain feedback capacitance 107 of magnitude $C_{dg}$, gate-to-source capacitance 108 of magnitude $C_{gs}$, and body-to-drain capacitance 109 of magnitude $C_{db}$. The capacitance $C_{db}$ is in parallel with the MOSFET's drain-to-source terminals whenever the source and body are shorted, a common configuration in MOSFET power devices. Parasitic drain resistance 111 of magnitude $r_d$, source resistance 112 of magnitude $r_s$, and distributed gate resistance 106 of magnitude $r_g$ complete the model of MOSFET 110. The gate buffer 103 biasing MOSFET 110 into its off state includes a pull-down device 105 with a resistance $R_{driver}$. Diode 113 represents the P-N junction in parallel with high side MOSFET 102.

The waveforms 120 of the gate voltage $V_G$ and drain voltage $V_x$ of MOSFET 110 and the current $I_s$(switch) in high-side diode 113 are illustrated in FIG. 6B. Prior to time $t_1$, the gate of MOSFET 110 is biased by gate buffer 103 to the voltage $V_{batt}$, with switch 114 closed and switch 115 open. At this time the voltage $V_x$ is biased below ground by an amount equal to $-I_L \cdot R_{DS}$(sync rect) and high-side diode 113 remains reverse-biased.

At time $t_1$, the gate of the synchronous rectifier 101 is driven by gate buffer 103 from $V_{batt}$ to ground, as shown by the transition from curve 121 to 122. This involves the opening of switch 114 and the closing of switch 115. The negative voltage across synchronous rectifier MOSFET 110 increases to $V_f$ as the channel of MOSFET 110 is turned off, shown by the transition from curve 124 to 125, and diode 116 takes over the function of carrying the recirculation current through inductor 27.

At time $t_2$, as the voltage $V_x$ begins to rise rapidly along curve 129, capacitive displacement current flows through gate-to-drain capacitor 107 and forms a voltage divider with gate-to-source capacitor 108 and the series resistance of distributed gate resistance 106 and pull-down device 105. If this series resistance ($r_g + R_{driver}$) is sufficiently large, the voltage at the gate of MOSFET 110 (node $V_G'$) can increase above the threshold voltage of MOSFET 110, as shown by curve 123, This momentarily causes synchronous rectifier MOSFET 110 to again conduct, triggering unwanted oscillations 126 in the voltage $V_x$ node which vary in magnitude and in duration. The result is a burst of noise spread over a range of frequencies—noise especially problematic in communication applications. Controlling the gate voltage during high dV/dt transients is difficult since synchronous rectifier 101 includes seven passive elements and a P-N diode, all of which affect its terminal characteristics.

The oscillations can be further compounded if transient ringing 126 exceeds 600 mV, essentially one forward-biased diode voltage $V_f$ above $V_{batt}$, in which case high-side diode 113 conducts, as shown in curves 129A and 129B adding other charge storage and oscillatory modes. Only after some period of uncontrolled oscillations does drain voltage $V_x$ finally settle to its final voltage as shown by line 127.

In summary, forced diode recovery in a synchronous Buck converter prior to high side conduction can lead to reverse rectifier currents and efficiency loss, high dV/dt slew rates, ringing, voltage overshoot, oscillations, forward-biasing of the high side MOSFET's diode, and uncontrollable bursts of noise spread across a range of frequencies. Unfortunately, all known hard switching converters, that is, converters other than resonant and quasi-resonant converters, require forced diode recovery for some interval to extract charge stored in a P-N junction.

One approach to prevent diode conduction in the MOSFET's intrinsic P-N junction is to connect the synchronous rectifier MOSFET in parallel with an external Schottky rectifier. The purpose of the Schottky diode is to divert the recirculation current of inductor 142 during the break-before-make interval into a lower-voltage-drop circuit path in parallel with the synchronous rectifier MOSFET. Unfortunately, as illustrated in equivalent circuit 140 of FIG. 7, this method does not work in high-frequency DC/DC converters since Schottky diode 146 includes stray inductance 147 that delays the onset of Schottky conduction whenever synchronous rectifier MOSFET 144 is off and P-N diode 145 conducts. By the time Schottky diode 146 begins to conduct, the break-before-make interval is over, high-side MOSFET 141 is conducting, the voltage at $V_x$ is already rising, and forced diode recovery has already commenced.

Light Load Operation in Synchronous Buck Converters

Another factor in optimizing a DC/DC converter is its efficiency, operational stability, and noise behavior at low output power conditions, i.e. when the load is drawing a current one or two orders of magnitude lower than it draws during normal operation.

In this so called "light load" condition, the inductor conducts currents only slightly above zero. In some circumstances, the current in the inductor may actually reverse direction, oscillating between flowing toward the load, i.e. out of the converter, and from the load, i.e. into the converter's output.

FIGS. 8A-8C illustrate the intermediate voltage $V_x$ and the inductor current $I_L$ in a synchronous Buck converter under three different load conditions. Specifically, FIG. 8A illustrates $V_x$ and $I_L$ when the converter is operating at a full load condition where the average inductor current $I_L$ is far above zero. As described above, the voltage $V_x$ switches between a slightly negative value during recirculation and a positive voltage slightly below $V_{batt}$ during high-side MOSFET conduction. The repeated period $T_1$ represents converter operation in the fixed-frequency pulse width modulation (PWM) mode. When the $V_x$ pulse has been reduced to its minimum width $t_{min}$, the constant oscillating period $T_1$ represents the shortest interval where fixed frequency PWM operation can be maintained. If a lower output current is required and the clock period is not increased, the output voltage will start to rise and the converter will lose its ability to regulate.

FIG. 8B illustrates the operation of a Buck converter under a low current load resulting in a minimum inductor current 151 near zero. Under this condition, the period T must increase and the clock frequency drop to avoid a gradual rise in the converter's output voltage, i.e. $T_3 > T_2 > T_1$. By using a fixed on-time pulse of minimum duration and by varying the off time according to feedback of the output voltage, the pulse frequency modulation is able to regulate the output through constant changes in the oscillating period. The disadvantage of PFM operation is that the variable frequency produces a varying frequency noise spectrum, but efficiency remains relatively high.

At even lighter loads, FIG. 8C illustrates the switching waveforms where the inductor current passes through zero, and negative conduction occurs in the synchronous rectifier MOSFET. At the time indicated by point 152, the current begins to flow from the load back into the converter, i.e. in a direction decreasing the energy stored on the switcher's output capacitor. At point 153, where the controller once again turns on the high-side MOSFET to refresh, i.e. to magnetize, the inductor, the negative current reaches a peak and begins to decrease in magnitude. At time point 154, the current turns positive and energy once again flows out of the converter and toward the load.

The operating state table for a synchronous Buck converter operating in light load is then modified to include current reversal, as shown in Table 3:

TABLE 3

| Mode | High-Side | Low-Side | I_L Direction | Diode Bias |
| --- | --- | --- | --- | --- |
| Magnetization | On Switch (R_DS) | Off | To Output | Reverse Bias (RB) |
| BBM | Off | Off | | Forward Bias (FB) |
| Recirculation | Off | On Switch (R_DS) | | Shunted Forward Bias (FB) |
| Reversal | Off | On Switch (R_DS) | From Output | Reverse Bias (RB) |
| BBM | Off | Off | Depends | Depends (RB/FB) |
| Recovery | On Current Source | Off | To Output | Reverse Recovery |

The "recirculate" and "reversal" states may oscillate any number of times depending on the current in the inductor in light load. Unfortunately, current reversal is energy inefficient, wasting energy by "sloshing" current back and forth between the inductor within the converter and the output capacitor. The problem of reverse current flow in the inductor occurs because a MOSFET can conduct in either polarity and with equal conductivity, so the magnitude of the "from load" current and the "to load" current may be nearly equal. As a result, leaving the synchronous rectifier MOSFET on during current reversal in light load lowers the converter's efficiency.

So while the synchronous rectifier never conducts when the high side MOSFET is on and conducting, and never conducts during the break-before-make, depending on the magnitude of inductor current it can stay on too long during recirculation leading to current reversal and oscillation between the reversal and recirculating states.

Since reversal and recirculating states alternate repeatedly at a frequency depending on the load, the PWM controller's instruction to turn on the high-side MOSFET occurs asynchronously, i.e. when the PWM controller decides it is needed. The converter therefore enters into the BBM state in an indeterminate polarity, with the inductor current flowing from the output or to the output depending on the last state of the converter. In any case, large reverse-currents lower efficiency, and may potentially further aggravate noise during BBM operation and diode recovery.

One remedy proposed by several workers is to detect when the reverse current condition is about to occur and to switch the synchronous rectifier MOSFET off. Theoretically, since the P-N diode in parallel with the synchronous rectifier MOSFET is reverse-biased under the current reversal condition, it cannot conduct and the inductor current will become discontinuous, i.e. interrupted, just as it behaves in a conventional Buck converter.

Turning off the synchronous rectifier during a light-load condition modifies the operating phases of the converter, as described in Table 4:

TABLE 4

| Mode | High-Side | Low-Side | I_L Direction | Diode Bias |
| --- | --- | --- | --- | --- |
| Magnetization | On Switch (R_DS) | Off | To Output | Reverse Bias (RB) |
| BBM | Off | Off | | Forward Bias (FB) |
| Recirculation | Off | On Switch (R_DS) | | Shunted FB |
| Reversal | Off | Off | Zero | Reverse Bias (RB) |
| BBM | Off | Off | 0/To Output | Depends (~0/FB) |
| Recovery | On Current Source | Off | To Output | Reverse Recovery |

As described, the charge, first BBM and recirculation phases behave as described previously. At the onset of current reversal, however the off low-side MOSFET is switched off, blocking current from flowing backwards into the converter from the output. The converter then alternates any number of times between the recirculate mode with its synchronous rectifier "on" and reversal mode where the synchronous rectifier MOSFET is "off". The synchronous rectifier can be switched off by detecting when the current starts to reverse polarity or simply by disabling synchronous rectifier operation whenever the inductor current drops below a specified value. If the second BBM interval commences while the inductor current is zero, i.e. in the reversal phase, both MOSFETs remain off and no action is needed. If the BBM commences following the recirculation phase, then the synchronous rectifier must be shut off for the BBM interval and forced diode recovery occurs before the cycle repeats. Thus, in this prior art approach, the synchronous MOSFET is always off and non-conducting during high-side MOSFET conduction, during break-before-make operation, and during light-load current reversal.

With its synchronous rectifier biased off during light load reverse conduction, a synchronous Buck behaves like a conventional Buck converter except that the rectifier is realized as a silicon P-N diode rather than as Schottky diode. The waveforms for the intermediate voltage $V_x$ and the inductor current $I_L$ in the discontinuous operation of a Buck converter under light load are illustrated in FIGS. 9A-9C.

FIG. 9A illustrates the inductor current $I_L$ commencing with high-side MOSFET turn-on at time to and increasing until at point 161 and time $t_2$, when the high side MOSFET is turned off and after a brief BBM interval (too short to illustrate clearly on this the time scale shown), the low-side synchronous rectifier MOSFET is turned on. Corresponding to the inductor current of FIG. 9A, the voltage $V_x$, illustrated by line 162 in FIG. 9B, is approximately equal to $V_{batt}$ during the magnetizing interval from time $t_1$ to time $t_2$.

After a short BBM interval 164, the low-side synchronous rectifier MOSFET is turned on, forcing $V_x$ to slightly below ground during the interval 163 from $t_2$ to $t_3$. During this interval, the inductor current $I_L$ ramps down toward zero, and at time $t_3$, reverse current in the synchronous rectifier MOSFET and the inductor is prevented by shutting off the low-side MOSFET.

Immediately upon shutting off the synchronous rectifier MOSFET, oscillations 165 of the voltage $V_x$ commence. These oscillations are attributable to the RLC tank circuit shown in circuit 170 of FIG. 10, where the "tank" includes a low-side MOSFET 174, with a depletion capacitance 176, a diode diffusion capacitance 175, a stray inductance 178 and a small-signal AC series resistance 177, and where the inductor 171 includes a winding resistance 179 of magnitude $r_{coil}$. The oscillating tank is completed by filter capacitor 172 and load impedance 173. While the equivalent LC resonant frequency determines the natural frequency of oscillation, the damping constant is determined by the equivalent RC time constant. Any stored charge in P-N diode 175 also affects the oscillating behavior of the circuit when both the high-side MOSFET 180 and the low-side MOSFET 174 are off.

High side MOSFET 180 remains off in this interval and is illustrated for clarity as an open switch. Under this condition, coil 171 of inductance L cannot be represented as a current source since the oscillations will occur near the passive circuit's resonant frequency, not driven by a significantly higher clock frequency. The oscillations 165 continue until time $t_4$, when the high side MOSFET 180 is turned on by the PWM controller, and again the coil 171 is magnetized.

FIG. 9C illustrates the same behavior but where oscillations 166 die out faster than oscillations 165. The voltage $V_x$ at time $t_4$ depends on a number of parameters primarily from passive network 170 and preexisting conditions. Note on the scale drawn, the BBM interval is only illustrated as a short spike in the negative $V_x$ voltage. In any event oscillations in the voltage $V_x$ give rise to further unwanted noise generation and the potential for unwanted electromagnetic interference (EMI).

Synchronous Boost Converter Operation

Similar issues with uncontrolled charge storage in P-N diodes occur in synchronous boost converters. Synchronous boost converter 190 shown in FIG. 11 includes an N-channel low-side power MOSFET 191, a battery-connected inductor 193, and a "floating" synchronous rectifier MOSFET 192, with the gates of MOSFETs 191 and 192 driven by a break-before-make circuit 195 and controlled by a PWM controller 196 in response to a feedback voltage $V_{FB}$ from the output of converter 190, which is present across a filter capacitor 194. The synchronous rectifier MOSFET 192 is considered "floating" in the sense that its source and drain terminals are not permanently connected to any supply rail, i.e. ground or $V_{batt}$.

Diode 197 is a P-N diode intrinsic to synchronous rectifier MOSFET 192, regardless of whether synchronous rectifier MOSFET 192 is a P-channel or an N-channel device. Schottky diode 199 may be included in parallel with MOSFET 192 but may include series inductance (not shown). Diode 198 is a P-N junction diode intrinsic to N-channel low-side MOSFET 191.

At start-up, when power is first connected to converter 190, $V_{out}$ is pre-biased to a positive voltage $V_{out}(0-)$ because diode 197 becomes forward biased and charges capacitor 194 to a voltage one forward-biased diode-drop below the battery input, i.e. $V_{out}(0-)=V_{batt}-V_f$. After pre-biasing, the operation of synchronous boost converter 190 commences according to Table 5:

TABLE 5

| Mode | Low-Side | Floating | $I_L$ Direction | Diode Bias |
|---|---|---|---|---|
| Magnetization | On Switch ($R_{DS}$) | Off | To Ground | Reverse Bias (RB) |
| BBM | Off | Off | To Output | Forward Bias (FB) |
| Recirculation | Off | On Switch ($R_{DS}$) | | Shunted FB |
| BBM | Off | Off | | Forward Bias (FB) |
| Recovery | Ramping On Current Source | Off | | Reverse Recovery |

The operation of synchronous boost converter 190 involves turning on low-side MOSFET 191 in its linear region of operation, i.e. operating MOSFET 191 as a "switch", and magnetizing inductor 193, while synchronous rectifier MOSFET 192 remains off. Assuming that the output of converter 190 is pre-biased to some potential above ground to a voltage $V_{out}(0-)$ then turning on MOSFET 191 pulls $V_x$ to a voltage near ground and diode 197 is reverse-biased.

At time $t_1$, low side MOSFET 191 is turned off and inductor 193 drives voltage $V_x$ positive to a potential above $V_{out}(0-)$, forward-biasing diode 197 and charging capacitor 194 to a voltage higher than $V_{batt}$, thereby "boosting" the input voltage. As shown in the waveform of $V_x$ in FIG. 12A, the voltage transient 200 may momentarily overshoot and ring to a voltage above $V_{out}+V_f$, as illustrated by oscillations 202. Eventually, the inductor voltage stabilizes at the voltage equal to $V_{out}+V_f$, where $V_{out}$ gradually increases on a cycle-by-cycle basis.

With the inductor no longer being magnetized, the inductor current $I_L$, shown in FIG. 12B, begins to decay from its peak value 208 at a steady rate (line 209). The inductor current $I_L$ is initially carried entirely by forward biased diode 197, as shown by the $I_f$ curve 212 in FIG. 12C.

After a break-before-make interval, at time $t_2=t_1+t_{BBM}$, synchronous rectifier MOSFET 192 turns-on, diverting current from diode 197 into MOSFET 192 and lowering the voltage $V_x$ to $V_{batt}+I \cdot R_{DS}$(sync rect), as shown by curve 203 in FIG. 12A. The MOSFET drain current $I_D$, shown by curve 214, replaces most of current $I_f$ in diode 197, illustrated by curve 213 in FIG. 12C, while $I_L$ continues to decline.

After some period of time, PWM controller 196 determines that the inductor 193 needs to be magnetized again, and accordingly at time $t_3$ synchronous rectifier 192 is turned off, the voltage $V_x$ returns to its higher potential (line 204), and diode 197 carries the full inductor current, as shown by curve 215 in FIG. 12C. During this second BBM interval, charge becomes stored within P-N diode 197.

Then, at time $t_4=t_3+t_{BBM}$, low-side MOSFET 191 again turns on, but because of the charge stored in diode 197, the voltage $V_x$ cannot change instantly. As diode 197 becomes reverse-biased and is forced into diode recovery, its current drops rapidly, overshoots and reverses direction as shown by curves 216 and 217, consistent with the same reverse recovery terminal characteristics described previously in FIG. 5. The forced diode recovery results in a high dV/dt, as shown by $V_x$ transient 205 in FIG. 12A, further leading to voltage overshoot and ringing 206, which potentially can even momentarily drop below ground and risk forward biasing diode 198. As a result of the high slew rate and voltage overshoot, substantial noise and EMI are generated.

Thereafter, converter 190 returns to magnetizing the inductor 193, the current begins rising from its minimum value 210 at a steady rate (line 211), and the voltage on the drain of the low-side MOSFET 191 equilibrates at $I \cdot R_{DS}$(sync rect), as shown by line 207 in FIG. 12A.

As in a synchronous Buck converter, noisy forced-diode recovery in a synchronous boost converter occurs due to unwanted diode conduction and charge storage during the break-before-make interval just prior to magnetizing the inductor. As shown in Table 5, in a prior art synchronous boost regulator, floating synchronous rectifier MOSFET 192 is never on and conducting when low-side MOSFET 191 is on and conducting, or during break-before intervals when both MOSFETs are off.

Like their synchronous Buck counterparts, synchronous boost converters also exhibit current reversal in light load applications, leading to a loss of efficiency at low output currents, unless the synchronous rectifier MOSFET is turned off prior to current reversal. Turning off the synchronous rectifier MOSFET, while preventing reverse current flow, results in discontinuous conduction and LRC oscillations, causing unwanted noise. As shown in the waveforms of FIG. 13A, the inductor current $I_L$ reaches its peak value 220 at time $t_1$, the end of the magnetizing cycle. The shut off of the low side MOSFET 191 leads to a decay in inductor current (line 221). During this period the voltage $V_x$, shown in FIG. 13B, exhibits a transient (line 225) and ringing 226 before finally, after a break-before-make interval, settling to a voltage equal to $V_{out}+I \cdot R_{DS}$(sync rect) (line 227). If the inductor current is too small, however, at time $t_3$, the current will reverse direction (dashed line), reaching an energy-wasting peak reverse current at point 223, unless the synchronous rectifier is shut off.

By shutting off the synchronous rectifier at time $t_3$ the reverse current is prevented and the converter's light load efficiency improved, but unfortunately the voltage $V_x$ immediately exhibits oscillations 228, generating electrical and radiated noise. At time $t_5$ the low-side MOSFET 191 is again turned on, ramping current (line 224) from zero while $V_x$ exhibits a rapid negative going voltage transient (line 229) with a high dV/dt, potentially causing negative voltage overshoot and further ringing and noise generation 230. Depending on when during or subsequent to oscillations 228 time $t_5$ occurs, this transition may cause forced diode recovery, further exacerbating the noise problem.

Thus, in this prior art synchronous boost converter, the synchronous MOSFET is always off and non-conducting during low-side MOSFET conduction, during break-before-make operation, and during light-load current reversal.

Other Effects of Uncontrolled Diode Conduction

In full-load operation, diode conduction in synchronous Buck and synchronous boost converters leads to unwanted charge storage, rapid transient behavior, and forced-diode-recovery-induced noise. High slew rates also can result in false turn-on and by introducing substrate noise, provoke displacement-current-induced CMOS latch-up. CMOS latch-up is a potentially damaging condition wherein an integrated circuit exhibits loss of control and high currents resulting from parasitic PNPN thyristor conduction.

In light-load conditions, the requirement to turn off the synchronous rectifier MOSFET and operate a converter as a non-synchronous Buck or a non-synchronous boost converter in discontinuous mode to prevent current reversal in the MOSFET leads to other unwanted oscillations and noise, whereby stored charge in the P-N diode can further influence circuit stability.

The various conditions of synchronous Buck and boost converters are summarized in the flow chart of FIG. 14. Using the term "switch" for the MOSFET connected to the power source and the term SR for the diode and parallel synchronous rectifier MOSFET supporting recirculation, the operation of both Buck and boost converter topologies with synchronous rectifiers follow the same flow chart. This flow starts with the magnetize operation 240, where the switch is on and in its linear region, i.e. as a resistor $R_{DS}$, and the synchronous rectifier MOSFET is off. Transition to the $1^{st}$ BBM interval 241 involves turning the switch off. The $1^{st}$ BBM interval 241 is followed by recirculation 242 where the synchronous rectifier is on. Some noise occurs during the transition into the $1^{st}$ BBM interval 241.

Under normal operation, the synchronous rectifier MOSFET is then turned off during the $2^{nd}$ BBM interval 243, again generating noise. In light-load conditions, however, recirculation state 242 and the current reversal state 245 alternate in an oscillatory manner, where the synchronous rectifier is shut off entering the reversal state 245 and reactivated returning to state 242. Oscillations and noise are problematic during reversal state 245. Transitioning into the $2^{nd}$ BBM interval during light load may occur directly from the reversal condition 243 or from the recirculation state 242, but with differing noise characteristics.

After the $2^{nd}$ BBM interval 243, forced diode recovery 244 commences as the switch MOSFET temporarily becomes saturated, potentially generating substantial electrical noise. After recovery, when the MOSFET switch is once again in its linear, i.e. $R_{DS}$ region of operation, the magnetize phase 240 commences and the entire cycle repeats.

Thus, noise occurs during several phases of a converter's operation—during the $1^{st}$ BBM interval 241; during light-load current reversal 245; during the $2^{nd}$ BBM interval 243; and during the forced diode recovery condition 244. All of these noise-generating conditions involve charge storage in a P-N junction diode.

In conclusion, uncontrolled diode conduction and charge storage occurring in synchronous Buck and synchronous boost converters during break-before-make operation and also during light-load conduction result in undesirable losses in efficiency, the generation of unwanted electrical and radiated noise, and numerous other potential issues such as false turn-on of an off-state MOSFET. Problems with BBM operation, oscillations and poor efficiency during light load plague both synchronous boost and synchronous Buck converters. What is needed is a means by which to simultaneously control noise and improve efficiency in switching power supplies with synchronous rectification by controlling the amount of stored charge in the P-N diode associated with a synchronous rectifier MOSFET.

SUMMARY OF THE INVENTION

A DC/DC converter according to this invention includes a pair of MOSFETs and an inductor. The DC/DC converter may comprise a Buck converter or a boost converter. A Buck converter includes a high-side MOSFET and a low-side synchronous rectifier MOSFET connected in a series conduction path across the input voltage rails and an inductor connected in a conduction path between a common node between the two MOSFETs and an output terminal of the converter. The synchronous rectifier MOSFET includes a P-N junction diode parallel to its drain-to-source terminals with its anode connected to the negative input rail. A boost converter includes an inductor and a low-side MOSFET connected in a series conduction path across the input voltage rails and a floating synchronous rectifier MOSFET connected in a conduction path between a common node between the inductor and the low-side MOSFET and an output terminal of the converter. The synchronous rectifier MOSFET includes a P-N junction diode parallel to its drain-to-source terminals with its cathode connected to the output terminal of the converter. Either type of converter typically includes a capacitor across its output and ground terminals.

Whether under full-load or light-load conditions, the problems described above, including loss of efficiency and unwanted noise, are greatly reduced or eliminated by operating the synchronous rectifier MOSFET, i.e., the low-side MOSFET in the Buck converter and the floating MOSFET in the boost converter, as a current source in the break-before-make intervals.

Under light-load conditions, when the load current is small or negligible, operating the synchronous rectifier MOSFET as a current source also reduces ringing and noise. This mode of operation may be achieved by detecting the load or inductor current directly or indirectly and before the current reverses, changing the gate bias of the synchronous rectifier MOSFET from that of a low-resistance switch or variable resistor, into that of a controlled current source. Indirect measurement of inductor current can made measuring the magnitude and polarity of the voltage across the synchronous rectifier MOSFET during its low-resistance state.

The disclosed synchronous rectifier MOSFET therefore alternates between at least the following two states during operation: a low resistance state, where it operates in its linear region with a large gate bias; or a low, controlled current source state, where it operates in its saturation region with a small gate bias near threshold. These two conditions may be employed in either normal or light-load operation of the converter. The synchronous rectifier MOSFET may comprise either an N-channel or a P-channel device.

In a preferred embodiment, the synchronous rectifier MOSFET in a synchronous switching converter is biased to operate as a low, controlled current source in its saturated region whenever the MOSFET other than the synchronous rectifier MOSFET is fully turned-on with a low-resistance.

In another embodiment whenever the converter is operating, i.e. attempting to regulate a fixed output voltage, the synchronous rectifier is never turned off, i.e. biased with its gate electrically connected to its source.

Operating the synchronous rectifier MOSFET as a current source shunts current from the P-N diode associated with the synchronous rectifier MOSFET and thereby reduces the amount of stored charge in the P-N diode. This reduces undesirable losses in efficiency, the generation of unwanted electrical and radiated noise, and numerous other potential issues such as false turn-on of an off-state MOSFET.

To operate the synchronous rectifier MOSFET as a current source, the gate drive circuit for the synchronous rectifier MOSFET maintains the gate of the synchronous rectifier MOSFET at a voltage near threshold, biasing the MOSFET into its saturation region of operation and maintaining a substantially fixed or controlled value of drain current, e.g. in the range of tens to hundreds of microamperes, relatively independent of its drain voltage.

The synchronous rectifier MOSFET's saturation current may represent a predefined value or vary as a percentage of the full load current, i.e. as a percentage of the inductor flowing during high-current linear-region operation, or as a function of some other variable. Synchronous rectifier MOSFET operation as a current source may comprise biasing the gate of a power MOSFET at a fixed gate voltage, trimmed to a certain magnitude current or untrimmed, sensing current and using feedback to accurately control the drain current, or by using a current mirror to set the gate bias. The drain current may also be adjustable using a programmable gate voltage, e.g. driving the MOSFET's gate with the output of a D/A converter.

In conjunction with a pulse width modulation controller and a break-before-make circuit the gate drive circuit switches the synchronous rectifier MOSFET between an on-condition where the MOSFET exhibits a low resistance state and a low-current condition wherein the synchronous rectifier MOSFET functions as a current source. Optionally the synchronous rectifier MOSFET may be completely shut off if the switching regulator is not operating for extended durations.

BRIEF DESCRIPTION OF THE DRAWINGS

FIG. 4B is an equivalent circuit diagram illustrating the operation of a synchronous Buck converter immediately after the high-side MOSFET is turned on.

FIG. 8A is a graph of the inductor current in a synchronous Buck converter operating at full load.

FIG. 8B is a graph of the inductor current in a synchronous Buck converter operating at zero minimum inductor current.

FIG. 9B is a graph of the intermediate voltage showing the oscillations that occur after turn off of the synchronous rectifier.

FIG. 9C is a graph of the intermediate voltage showing the damped oscillations that can occur after turn off of the synchronous rectifier.

FIG. 12B is a graph of the inductor current during the operation of a synchronous boost converter.

FIG. 12C is a graph of the currents in the diode and synchronous rectifier during the operation of a synchronous boost converter.

FIG. 18B is an equivalent circuit of the Buck converter immediately after high-side MOSFET has turned on.

DESCRIPTION OF THE INVENTION

Figure 1A:
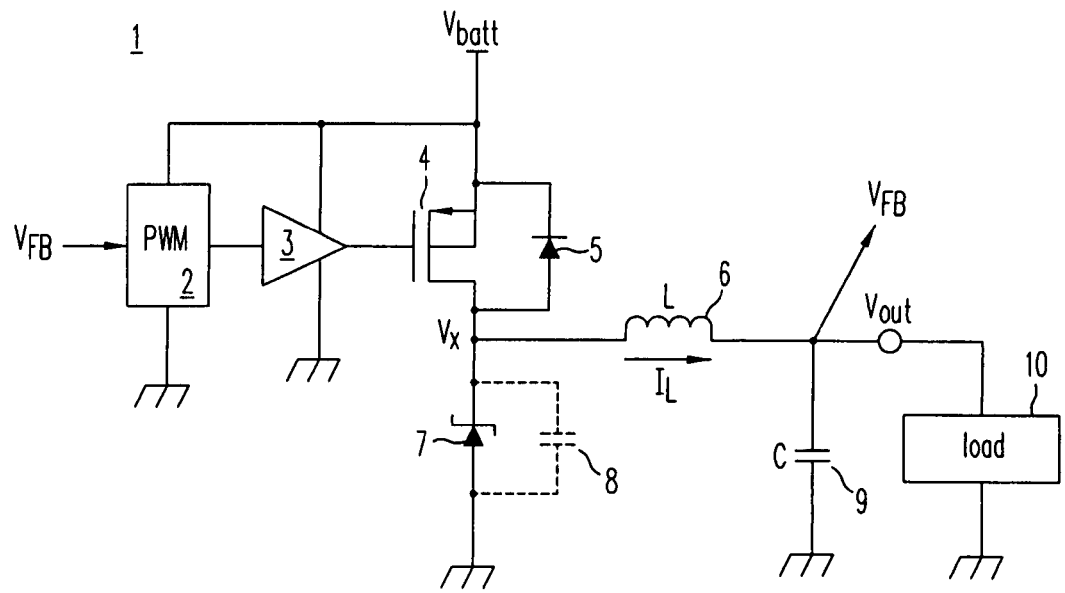
FIG. 1A shows a schematic circuit diagram of a conventional Buck converter.
Figure 1B:
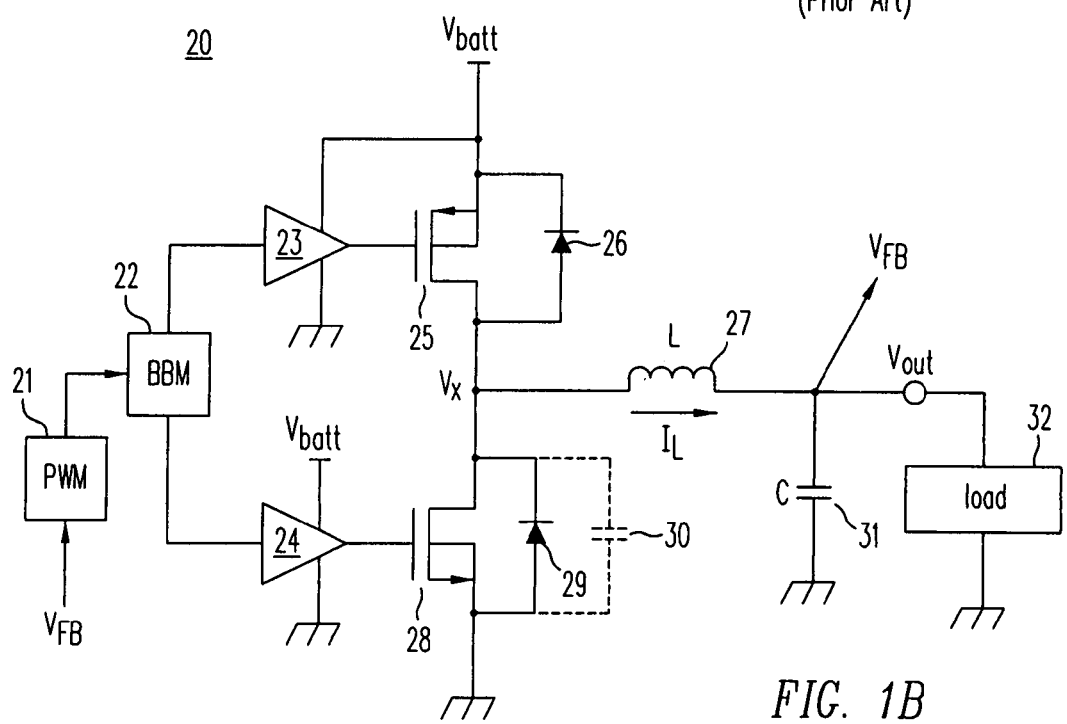
FIG. 1B shows a schematic circuit diagram of a conventional synchronous Buck converter.

According to one embodiment of this invention, a new method for DC/DC switching conversion and voltage regulation with reduced noise and improved efficiency utilizes a synchronous rectifier MOSFET which is never turned off, but instead alternates between a low-resistance, high-current state and a low-current, controlled-current-source mode. By not turning the synchronous rectifier off completely, especially during break-before-make operation and during light-load conditions, the above mentioned problems involving stored charge in a momentarily forward-biased P-N diode, including loss of efficiency, high dV/dt transients, unwanted noise, ringing, instability, and unwanted MOSFET turn-on are solved or greatly diminished. The method can be applied to both synchronous Buck step-down and synchronous boost step-up converters and is useful for synchronous rectifiers comprising either N-channel or P-channel MOSFETs.

In an alternative embodiment of this invention, the synchronous rectifier MOSFET operates in a low-current, controlled-current-source mode during the break-before-make (BBM) interval immediately prior to the main MOSFET turning on, and also during light load operations, but the synchronous rectifier MOSFET may be turned off completely when the main MOSFET, i.e. the power MOSFET other than the synchronous rectifier MOSFET, is conducting in a low resistance state.

Principle of Operation

In the operation of a DC/DC converter in accordance with the invention, the synchronous rectifier MOSFET alternates between at least two states: a low-resistance, high-current state and a controlled, low-current state. In one embodiment, no condition occurs wherein the synchronous rectifier MOSFET is turned fully off, e.g., by connecting its gate connected to its source potential or biasing its gate to a voltage two or more orders of magnitude below its threshold voltage.

In another embodiment, the synchronous rectifier may be turned completely off at some point in the cycle, but it is not turned completely off during the break-before make interval immediately preceding the main MOSFET turning on. In a preferred embodiment, the disclosed synchronous rectifier is always at least slightly conductive, carrying some minimum current in the range of a few microamperes to no more than a few hundred microamperes.

The synchronous rectifier MOSFET alternates between these two states during operation, i.e. a low-resistance, high-current state and a controlled, low-current state, in either normal or light load operation of the converter.

In its highly-conductive, low-resistance state, the synchronous rectifier is biased into its linear region by a large gateto-source bias, e.g. the battery input or 5V, and exhibits a linear drain-current to drain-voltage relationship with a characteristic slope $1/R_{DS(on)}$. Except under short circuit conditions, the MOSFET's drain current in this state is determined by its drain voltage in accordance with Ohms law. Peak drain current may comprise 300 mA to over twenty amperes, depending on the size of the power MOSFET. This highly-conductive low-resistance state exists in both in the operation of conventional synchronously rectified DC/DC converters and in the operation of a converter according to this invention.

In accordance with this invention, in its second, low-current state, the synchronous rectifier MOSFET behaves as a controlled current source operating in its saturation region with a small gate bias near threshold. The gate bias of the synchronous rectifier MOSFET is set so as to provide a MOSFET channel current of a few microamperes to no more than a few hundred microamperes, many orders of magnitude less than the channel current in the synchronous rectifier MOSFET's highly conductive, low-resistance state, described in the preceding paragraph. While this saturated channel current may be small, it contradicts the prevailing wisdom of the prior art, which is to prevent any channel current or leakage in the synchronous rectifier MOSFET by turning its channel completely off when the synchronous rectifier MOSFET is not carrying high currents, i.e. when the other (main) MOSFET in the converter is operating in its highly conductive, low-resistance state.

When the intrinsic drain-to-body diode of the synchronous rectifier MOSFET is reverse-biased, i.e. in Quadrant I, the only current flowing in the device is the channel current. This condition occurs when $V_x$ is near the converter's input voltage for a Buck converter and when $V_x$ is near ground in a boost converter.

However, a synchronous rectifier MOSFET may also operate in Quadrant III, where the MOSFET's intrinsic drain-to-body diode is forward-biased, while the MOSFET is on, i.e., while a current is flowing in its channel. In a synchronous Buck converter, this condition occurs whenever the high-side MOSFET is turned off and in a synchronous boost converter whenever the low-side MOSFET is turned off. In Quadrant III, the synchronous rectifier MOSFET's channel shunts current away from its drain-to-body parallel diode. In such a condition, even a small amount of channel conduction can greatly reduce stored charge in the forward-biased parallel diode, improving efficiency and reducing noise.

Operating the synchronous rectifier MOSFET in this manner, as a current source, shunts current from the P-N diode associated with the synchronous rectifier MOSFET and thereby reduces the amount of stored charge in the P-N diode. This reduces undesirable losses in efficiency, the generation of unwanted electrical and radiated noise, and numerous other potential issues such as false turn-on of an off-state MOSFET.

Thus, in accordance with a preferred embodiment of this invention, whenever the synchronous rectifier MOSFET in a DC/DC converter is not biased with a large gate drive to operate in its highly conductive, low-resistance linear state, it is not turned off, but instead biased in its saturation region of operation with a low gate-to-source voltage near threshold, maintaining a substantially fixed or controlled value of drain current relatively independent of its drain voltage.

The high-side MOSFET in a synchronous Buck converter or the low-side MOSFET in a synchronous boost converter may operate in a more conventional manner, alternating between two states, either as a low resistance in its linear region biased with a large gate bias, or off with substantially no conduction, typically with its gate electrically connected to its source.

In accordance with this invention, operation of a synchronous Buck converter under normal load conditions involves two criteria: The first criterion is that the low-side synchronous rectifier is biased in an on-state in its saturation region of operation, conducting a low, controlled current, at least during the break-before-make interval immediately prior to the high-side MOSFET turning on. The second criterion is that the low-side synchronous rectifier MOSFET is not biased into a highly conductive, low-resistance state at the same time that the high-side MOSFET is biased into a highly conductive, low-resistant state.

Moreover, in the operation of a Buck converter according to this invention, after the high-side MOSFET has been turned on and is operating in a low-resistance state, the low-side synchronous rectifier MOSFET may be biased fully off, e.g. with its gate shorted to its source, or alternatively the low-side synchronous rectifier MOSFET may remain biased in an on-state in its saturation region of operation conducting a low, controlled current. As a matter of convenience, it may be easier to implement a circuit whereby whenever the low-side synchronous rectifier is not in an on-state with a low resistance, it is biased in an on-state in its saturation region of operation conducting a low, controlled current.

In accordance with this invention, operation of a synchronous boost converter under normal load conditions also involves two criteria: The first criterion is that the floating synchronous rectifier is biased in an on-state in its saturation region of operation, conducting a low, controlled current, at least during the break-before-make interval immediately prior to the low-side MOSFET turning on. The second criterion is that the floating synchronous rectifier MOSFET is not biased into a highly conductive, low-resistance state at the same time that the low-side MOSFET is biased into a highly conductive, low resistance state.

Moreover, in the operation of a synchronous boost converter according to this invention, after the low-side MOSFET has been turned on and is operating in a low-resistance state, the floating synchronous rectifier MOSFET may be biased fully off, e.g. with its gate shorted to its source, or alternatively the floating synchronous rectifier MOSFET may remain biased in an on-state in its saturation region of operation conducting a low, controlled current. As a matter of convenience it may be easier to implement a circuit whereby whenever the floating synchronous rectifier is not in an on-state with a low resistance, it is biased in an on-state in its saturation region of operation conducting a low, controlled current.

Table 6 summarizes the operating conditions of a DC/DC synchronous converter and regulator applicable to both synchronous Buck and synchronous boost converters.

TABLE 6

| Mode | Main MOSFET | Sync Rectifier MOSFET | $I_L$ Direction | Diode Bias |
| --- | --- | --- | --- | --- |
| Magnetization | On Switch ($R_{DS}$) | Off or On (Low-I Sat) | To Output | Reverse Bias (RB) |
| BBM | Off | Off or On (Low-I Sat) | | Forward Bias (FB) |

TABLE 6-continued

| Mode | Main MOSFET | Sync Rectifier MOSFET | $I_L$ Direction | Diode Bias |
|---|---|---|---|---|
| Recirculation | Off | On Switch ($R_{DS}$) | | Shunted Forward Bias (FB) |
| BBM | Off | Not Off On (Low-I Sat) | | Forward Bias (FB) |
| Recovery | On Current Source (Ramp) | Not Off On (Low-I Sat) | | Reverse Recovery |

During light load operation, it is preferable to leave the synchronous rectifier MOSFET in an on-state in its saturation region, conducting a low, controlled current constantly. In an alternative embodiment, the synchronous rectifier MOSFET should remain in an on-state in its saturation region, conducting a low, controlled current at least for some duration after the synchronous rectifier is no longer biased with a large gate drive into a low resistance state. Table 7 summarizes the light-load operating conditions of a DC/DC synchronous converter. As shown, during magnetization and the BBM interval prior to recirculation the synchronous rectifier's conduction is optional, but during reversal, and in the BBM interval immediately prior to when the main MOSFET turns on again, it is important to maintain some level of conduction in the synchronous rectifier MOSFET.

TABLE 7

| Mode | Main MOSFET | Sync Rectifier MOSFET | $I_L$ Direction | Diode Bias |
|---|---|---|---|---|
| Magnetization | On Switch ($R_{DS}$) | Off or On (Low-I Sat) | To Output | Reverse Bias (RB) |
| BBM | Off | Off or On (Low-I Sat) | | Forward Bias (FB) |
| Recirculation | Off | On Switch ($R_{DS}$) | | Shunted Forward Bias (FB) |
| Reversal | Off | Not Off On (Low-I Sat) | Low-I From Output | Reverse Bias (RB) |
| BBM | Off | Not Off On (Low-I Sat) | 0/To Output | Depends (~0/FB) |
| Recovery | On Current Source | Not Off On (Low-I Sat) | To Output | Reverse Recovery |

Low-Noise Buck Converter Implementation

Figure 15A:
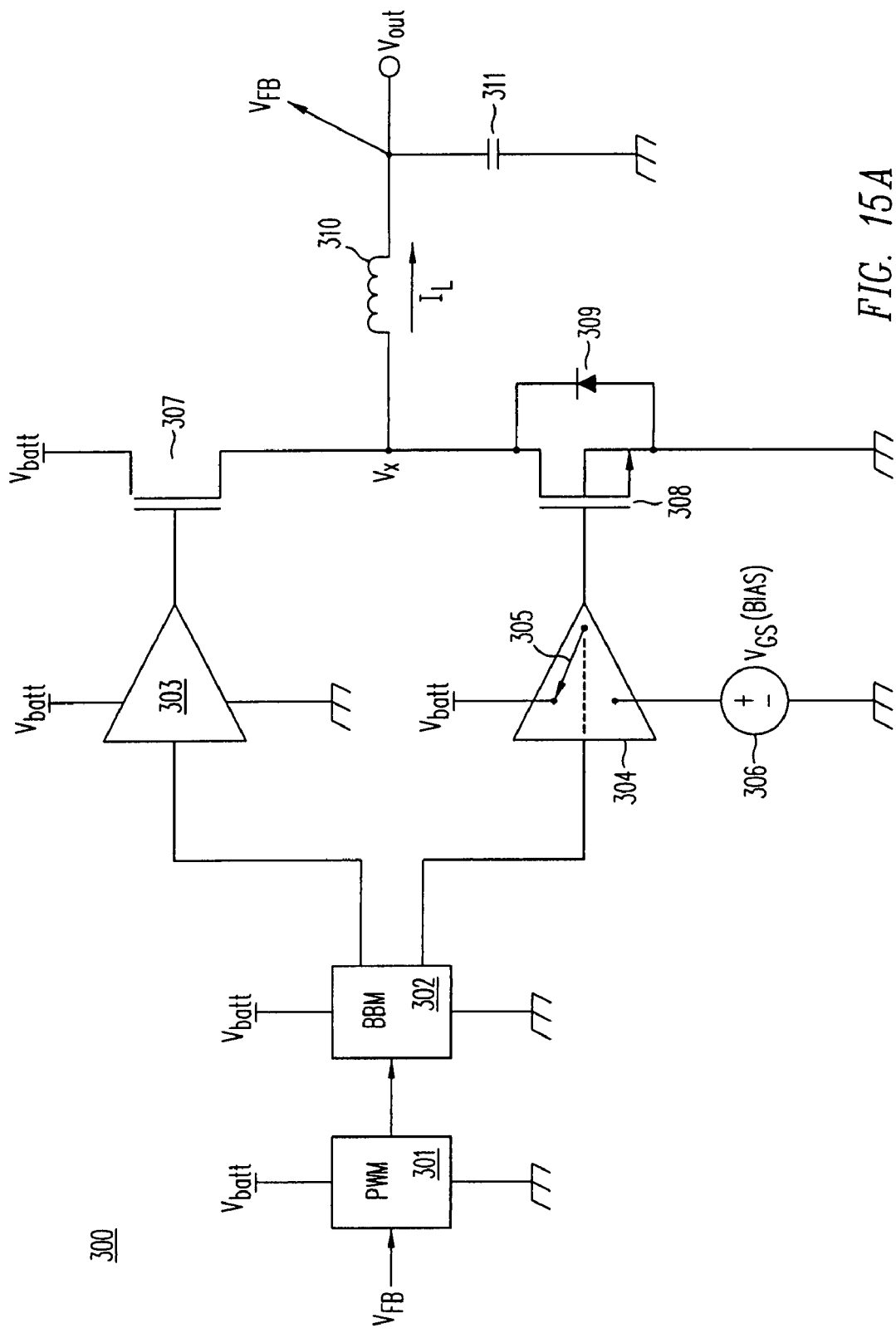
FIG. 15A is a schematic circuit diagram of a low noise synchronous Buck converter in accordance with the invention, including a fixed-bias drive.

An example of a synchronous Buck converter 300 in accordance with the invention is shown in FIG. 15A. Synchronous Buck converter 300 includes a power MOSFET 307, an inductor 310, a synchronous rectifier power MOSFET 308, and an output filter capacitor 311. Operation of MOSFET 307 is controlled by a pulse-width modulation (PWM) controller 301, with a gate buffer 303 driving the gate of MOSFET 307. While PWM controller 301 is referred to as "PWM controller," implying fixed-frequency variable-pulse-width operation, it may alternatively operate in a variable frequency or pulse-frequency-modulation (PFM) mode where the clock period is allowed to vary, or alternatively it may alternate between PFM and PWM modes depending on load and input conditions. As used herein, the term "PWM controller" includes all of these alternatives.

The energy input from the power source, typically a battery or other power input, into synchronous Buck converter 300 is switched or gated through MOSFET 307. With its positive terminal connected to the battery or input, MOSFET 307 acts like a "high-side" switch, controlling the current in inductor 310.

By controlling the current in inductor 310 through the switching and on-time control of MOSFET 307, the energy stored in the magnetic field of inductor 310 can be adjusted dynamically to control the output voltage $V_{out}$ across output filter capacitor 311. The output voltage $V_{out}$ is fed back to the input of PWM controller 301 as a feedback voltage $V_{FB}$, which controls the current $I_L$ in inductor 310 through the repeated switching of MOSFET 307.

Driven out of phase with MOSFET 307 by a gate buffer 304, a synchronous rectifier MOSFET 308 conducts when MOSFET 307 is off. With its positive terminal connected to inductor 310, i.e. to the node at which the intermediate voltage $V_x$ is present, and its negative terminal connected the circuit ground, MOSFET 308 acts like a "low-side" switch, shunting the current conducted in a diode 309. Diode 309 is a P-N junction parasitic to synchronous rectifier MOSFET 308, in parallel with the drain and source of MOSFET 308. Diode 309 therefore conducts a substantial current only during the brief interval when both MOSFETs 307 and 308 are off, i.e. during the "break-before-make" interval, aided by parallel capacitance shunting some fraction of the current transient.

Break-before-make (BBM) circuit 302 prevents shoot-through conduction by guaranteeing that MOSFETs 307 and 308 do not conduct simultaneously and short or "crow-bar" the input and power source of converter 300. During this brief BBM interval, diode 309, in parallel with synchronous rectifier MOSFET 308, must, along with the intrinsic capacitance in MOSFET 308, carry the current $I_L$ through inductor 310. The break-before make interval occurs twice in each full cycle—once in the transition immediately after the high-side MOSFET 307 turns off and before the synchronous rectifier MOSFET 308 turns on, and a second time after the turn-on period of the synchronous rectifier MOSFET 308 ends but immediately before the high side MOSFET 307 turns on. A voltage source 306 connected to gate buffer 304 ensures that gate buffer 304 biases low side MOSFET 308 as a current source with a gate bias near, at or slightly above, its threshold voltage, i.e., $V_{GS} \neq 0$, rather than turning MOSFET 308 off.

The voltage source $V_{GS(BIAS)}$ 306 may be constructed in any number of ways. For example, voltage source 306 may be the output of a band gap voltage reference scaled up or down by additional circuitry to produce a voltage corresponding to a desired drain current in MOSFET 308. For example, if the band gap 1.2V voltage reference voltage is significantly higher than the MOSFET's threshold voltage, too high of a current will result. In such cases the bandgap voltage can be reduced using a resistor divider to produce a desired value of $V_{GS(BIAS)}$ and hence a desired drain current. Alternatively if the band gap 1.2V voltage reference voltage is significantly lower than the MOSFET's threshold voltage, too little drain current will result. In such cases the band gap voltage can be increased using a an amplifier or $V_{BE}$ multiplier circuit to produce a desired value of $V_{GS(BIAS)}$ and hence a desired drain current.

Controlling Gate Bias for Low Saturation Currents

FIG. 15A illustrates that the gate bias $V_{GS(BIAS)}$ is applied to the gate of synchronous rectifier MOSFET 308 to establish a specific drain current limit in MOSFET 308. The theoretical value of $V_{GS(BIAS)}$ needed to produce a specific drain current can be determined from the well known equation of saturation current for a MOSFET, namely, $$I_{Dsat} = \frac{\mu \cdot C_{ox}}{2} \cdot \frac{W}{L}(V_{GS} - V_t)^2 \equiv \frac{k}{2}(V_{GS} - V_t)^2$$

where $\mu$ is the majority carrier mobility, $C_{ox}$ is the gate capacitance given by $C_{ox} = \epsilon_{ox}/x_{ox}$ where $x_{ox}$ is the gate oxide thickness, L is the effective channel length, W is the MOSFET's gate width, $V_t$ is its threshold voltage, and k, known as the MOSFET's transconductance factor, is a description of how much current the MOSFET can carry for a given gate voltage $V_{GS}$. Rearranging this equation gives the relation $$V_{GS} = \sqrt{\frac{2 \cdot I_{Dsat}}{k}} + V_t$$

This equation illustrates that the $V_{GS}$ required to produce a current $I_{Dsat}$ is a voltage greater than the threshold $V_t$ by some overdrive factor defined by the square root of $(2 \cdot I_{Dsat}/k)$. If the MOSFET has a larger gate width or a shorter channel length, the transconductance factor k is larger, and less overdrive is needed to carry a given current.

According to this equation, the gate drive needed to carry a specific current is well known and predictable. Unfortunately, this equation was derived under certain assumptions called "strong inversion" (see Tsividis, *Operation and Modeling of The MOS Transistor*, Oxford University Press (1999), pp. 150-169, which is incorporated herein by reference), which are valid only when the gate is biased above the threshold voltage. When the gate is biased near the threshold voltage, the device operates in moderate inversion and the equations for drain current are different. For example, the previous equation predicts a zero drain current for $V_{GS}=V_t$.

In reality the device continues to conduct current at threshold and even below. For gate biases below threshold, in the so called "subthreshold region", the drain current drops exponentially with gate voltage until at some low gate bias the drain current reaches a plateau comprising only leakage current through the P-N junction diode that is in parallel with the channel. When the drain current is primarily only leakage current, the MOSFET is clearly "off." This, for example, occurs when the gate voltage is a couple of orders of magnitude lower than the threshold voltage. If, for example, a MOSFET has a threshold voltage $V_t=0.8$V, then for a gate voltage $V_{GS} \leq 8$ mV, the device is clearly off and conducts only a junction leakage current.

For gate biases several hundred millivolts above and below threshold, e.g. gate biases of $V_{GS}=V_t \pm 400$ mV, saturated drain currents change dramatically. Picking a gate bias that produces a specific desired drain current is difficult, especially when considering manufacturing variability. Setting voltage source 306 at a fixed value can result in wide lot-to-lot variations in the saturated drain current in MOSFET 308. Using a fixed gate bias method, products therefore must likely be screened to fit the specific range of drain current. For example, the screening limits for drain current for a 1 W switching regulator with a fixed bias used in portable applications may comprise the specified ranges shown in Table 8:

TABLE 8

| | Sat Drain Current | | | |
|---|---|---|---|---|
| | Best | Good | Downgrade | Reject |
| Portable Apps | 1 μA-30 uA | 30 uA-300 uA | 300 uA-1 mA | I > 1 mA, I < 1 uA |
| High Power Apps | 100 μA-1 mA | 1 mA-30 mA | 30 mA-300 mA | I > 300 mA, I < 100 uA |

In low-power applications (typically where the drain current is in the range of 0.5 A to 5 A when the MOSFET is fully on), too much saturation current wastes power which, if not offset by reduced diode recovery losses, can lead to lower overall converter efficiencies. In high-power converters (typically where the drain current is in the range of 5 A to 50 A when the MOSFET is fully on), such small losses are negligible and the noise benefit may offset the penalty for any impact in efficiency even at higher bias currents. Note that a lower limit also exists; if the drain current in low-current saturation mode drops below some specified value, the benefit of the disclosed technique in shunting diode current and reducing stored charge in the diode is reduced or lost altogether.

Typically, the drain current in the MOSFET in its saturated low-current state is at least one or two orders of magnitude (i.e., from 10 to 100 times) greater than the size of the leakage current through the MOSFET when its gate-to-source voltage $V_{gs}$ is equal to zero and no greater than one or two orders of magnitude less than (i.e., from 1% to 10% on the magnitude of the current in the MOSFET when it is in its fully-on condition. The gate-to-source voltage $V_{gs}$ of the MOSFET in its saturated low-current state is typically in a range of 10% to 125% of its extrapolated threshold voltage, preferably in a range of 25% to 100% of its extrapolated threshold voltage. The extrapolated threshold voltage is defined in Dieter K. Schroder, *Semiconductor Material and Device Characterization* (1990), which is incorporated herein by reference.

Figure 25A:
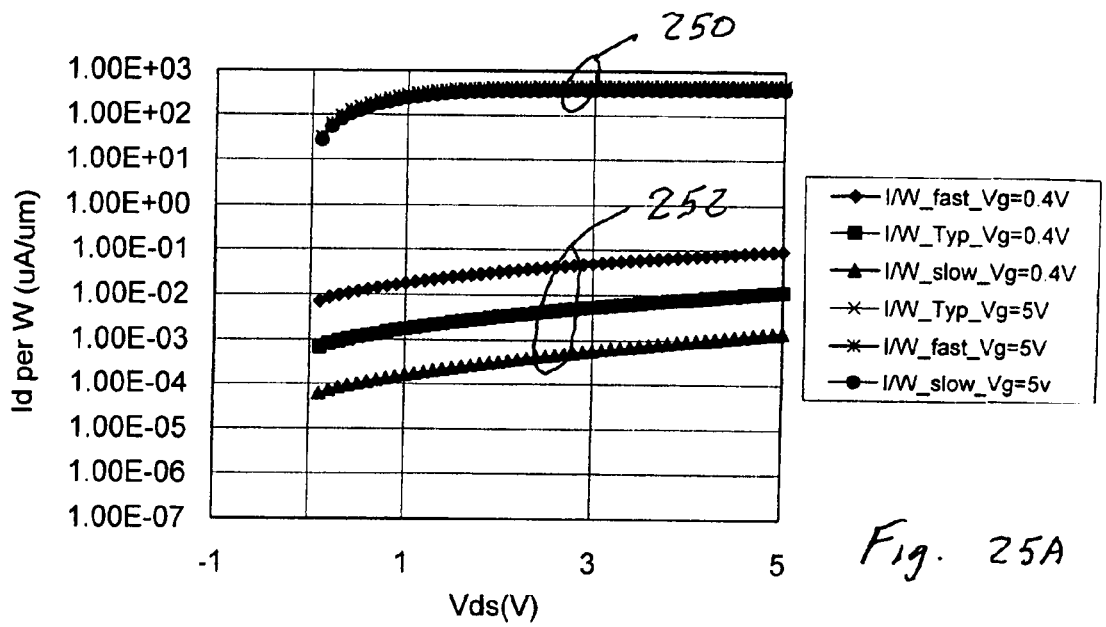
FIGS. 25A and 25B are graphs of normalized drain voltage as a function of drain-to-source voltage $V_d$ and gate-to-source voltage $V_{gs}$.
Figure 25B:
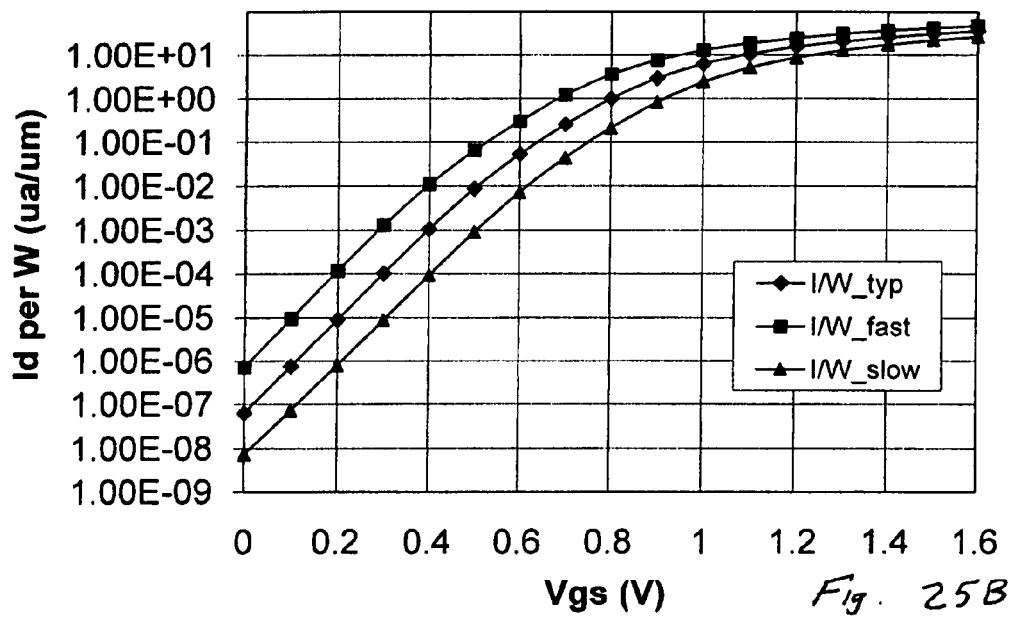

FIGS. 25A and 25B are graphs of the normalized drain current, i.e., the drain current $I_d$ divided by the gate width W (in µA/µm), as a function of the drain-to-source voltage $V_d$ and the gate-to-source voltage $V_{gs}$. In both figures, the Y-axis is plotted on a log scale, and the "fast," "typical" and "slow" curves represent process variations having an effect on the extrapolated threshold voltage of the device. The MOSFET in this example is an N-channel device; the temperature is 27° C.; and the channel length is 0.6 µm, although it could be another value.

FIG. 25A, shows normalized drain current versus drain voltage over a range of $V_{ds}$ from 0V to 5V. The upper curves 250 show the normalized drain current when $V_{gs}$=5V, representative of the fully-on condition, and the lower curves 252 show the normalized drain current when $V_{gs}$=0.4V, representative of the low-current state. In the fully-on condition, the process variations do not significantly affect the drain current, whereas the process variations can cause an order of magnitude change in the drain current in the low-current state. Even with process variations, however, the drain current in the low-current state is always much lower than the fully-on current, which greatly reduces the power loss in the low-current state. In this example, the difference is at least 4 orders of magnitude.

FIG. 25B, shows the normalized drain current as a function of $V_{gs}$ with $V_d$=0.4V, over a range of $V_{gs}$ from zero to 1.6V. In this example, when $V_{gs}$ is zero, the normalized drain "leakage" current is in the range of $1 \times 10^{-8}$ to $1 \times 10^{-6}$ µA/µm, while in the fully-on condition, $V_{gs}$ is much greater than 1.6V, and the normalized drain current is more than 10 µA/µm. In the low-current state, $V_{gs}$ could be about 0.4V, for example, providing a normalized drain current that is in between the leakage current and the fully-on current. In this example, at $V_{gs}$=0.4V the drain current is about 4 orders of magnitude above the leakage current and about 4 orders of magnitude below the fully-on current. In other embodiments, $V_{gs}$ in the low-current state could be adjusted to make the drain current some other value between the leakage current and the fully-on current.

Given natural distributions, the yield of devices that fall within the "good" and "best" categories in Table 8 may be unacceptably low. Aside from tightly controlling threshold voltages and classifying products by performance, other techniques exist to make the $I_{DBIAS}$ current more accurate without suffering unacceptable yield loss. One such technique involves actively trimming, i.e. adjusting, the $V_{GS(BIAS)}$ voltage while measuring the drain current. Typically trimming of a voltage reference is achieved by connecting or shorting a string of series connected resistive elements by fuses, one-time-programmable MOSFETs or EPROM memory devices to permanently adjust the $V_{GS(BIAS)}$ voltage to produce the desired drain current. The trimming is performed only once as part of the manufacturing process.

Another method is self correcting, using feedback of measured drain current compared to a desired reference current, and using the error signal between those two currents to adjust the value of $V_{GS(BIAS)}$ until the measured current or a scalar multiple of it equals the reference current. Such methods cancel the influence of threshold variation altogether.

Figure 15B:
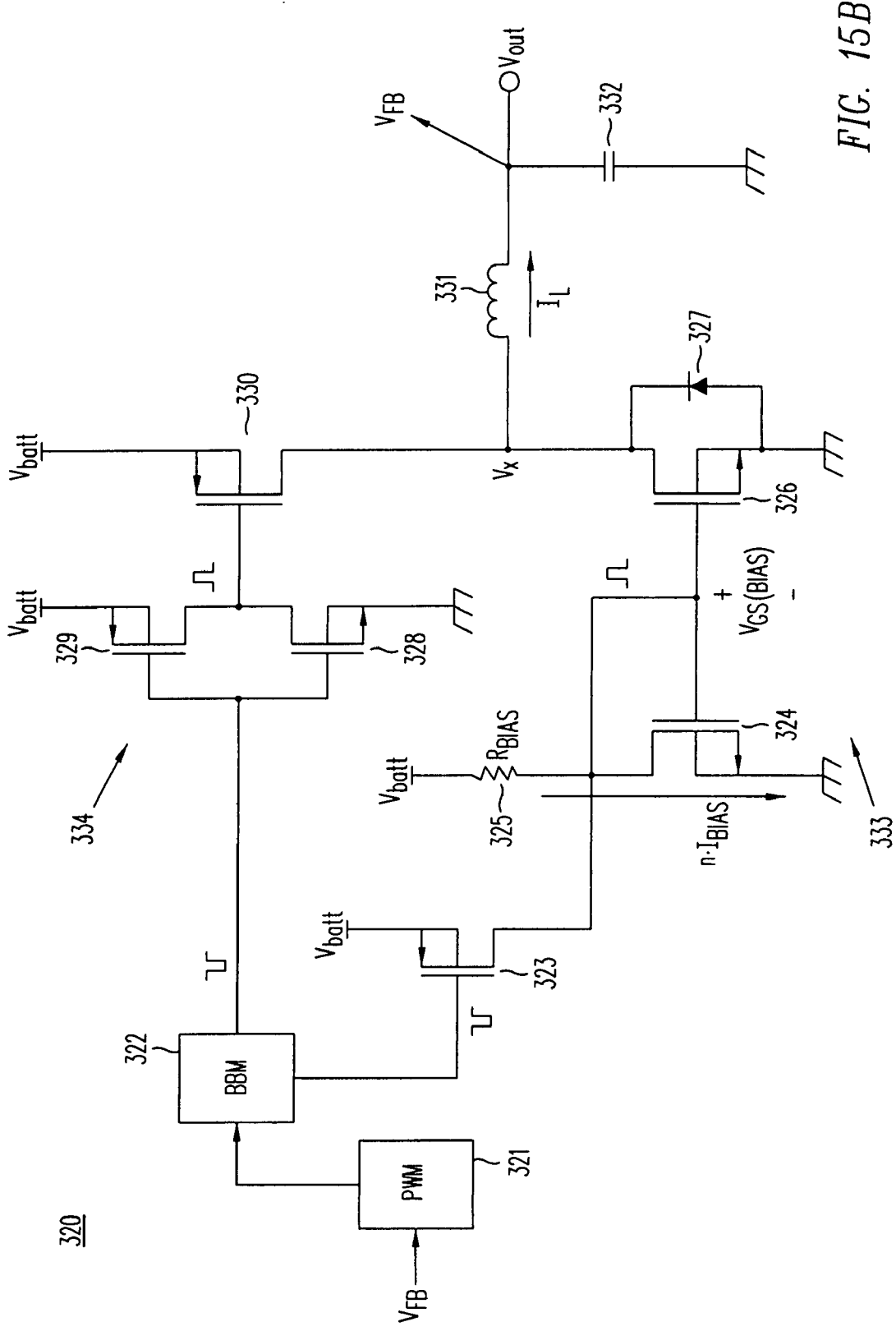
FIG. 15B is a schematic circuit diagram of an alternative embodiment of a low noise synchronous Buck converter in accordance with the invention, including a current mirror drive.

Another technique also insensitive to threshold voltage relies on matching between two devices fabricated monolithically. FIG. 15B shows such an alternative embodiment of a synchronous Buck converter in accordance with the invention. Synchronous Buck converter 320 includes a high-side power MOSFET 330, an inductor 331, a low-side synchronous rectifier power MOSFET 326, and an output filter capacitor 332. Operation of MOSFET 330 is controlled by a pulse-width modulation (PWM) controller 321, with a gate buffer 334, including MOSFETs 328 and 329, comprising a CMOS pair, driving the gate of MOSFET 330. A BBM circuit 322 prevents shoot-through conduction by guaranteeing that MOSFETs 326 and 330 do not conduct high currents simultaneously. A diode 327 is a P-N junction parasitic to synchronous rectifier MOSFET 326, in parallel with the drain and source of MOSFET 326.

Synchronous Buck converter 320 is similar to synchronous Buck converter 300 shown in FIG. 15A except that the low side MOSFET 326 is biased with a current mirror 333. Current mirror 333 includes low-side MOSFET 326 and a current mirror MOSFET 324. The gate of MOSFET 324 is connected to the gate of MOSFET 326 and the gate and drain of MOSFET 324 are shorted together and connected through a bias resistor 325 to the battery voltage $V_{batt}$. Thus, MOSFETs 324 and 326 in combination form current mirror 333, i.e., the current through MOSFET 326 "mirrors" the current through MOSFET 324. A MOSFET 323 is connected between current mirror 333 and $V_{batt}$. Turning MOSFET 323 on "shorts out" the current mirror 333 by connecting the gate of synchronous rectifier MOSFET 326 to $V_{batt}$, turning MOSFET 326 into a low resistance switch.

Because MOSFETs 324 and 326 are monolithically fabricated, their electrical characteristics are matched. By biasing MOSFET 324 at a given current and current density, the bias voltage $V_{GS(BIAS)}$ is generated in a way that includes threshold variability in its voltage. Since MOSFET 326 is fabricated identically to device 324, biasing it with the same gate bias results in a MOSFET having the same current density, and normalized by the ratio n, results in a proportionally larger current independent of process parameters.

Figure 16A:
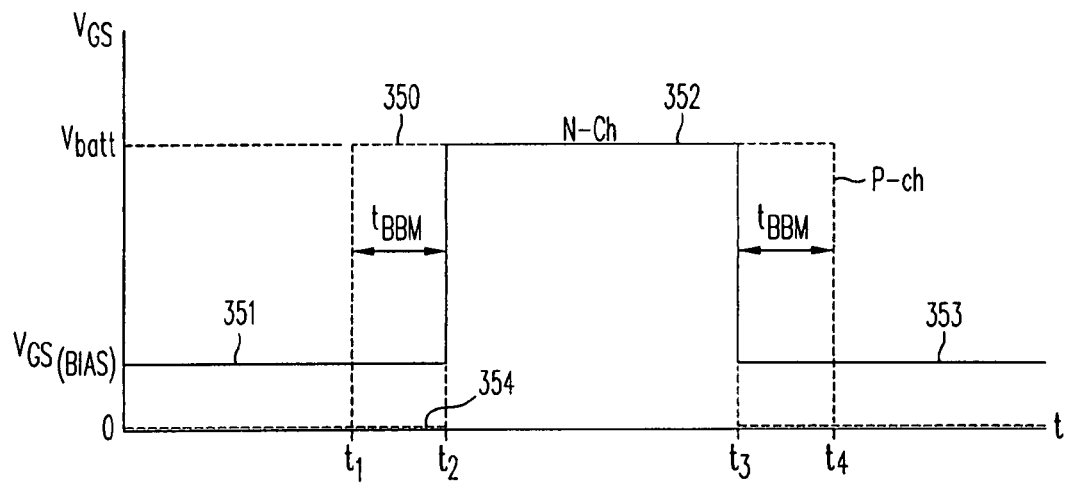
FIG. 16A is a graph of the gate voltage of the low-side MOSFET during the operation of the converter shown in FIG. 15A.
Figure 16B:
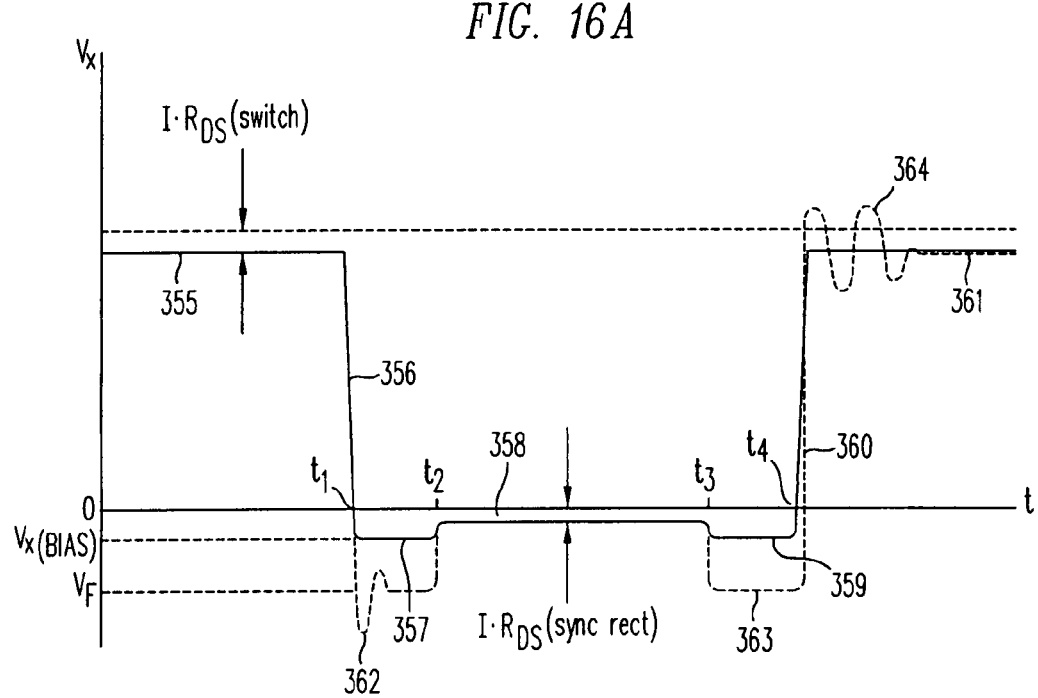
FIG. 16B is a graph of the drain voltage of the low-side MOSFET during the operation of the converter shown in FIG. 15A.

Referring again to converter 300 shown in FIG. 15A, FIGS. 16A and 16B are graphs of the gate voltage $V_{GS}$ and drain voltage $V_x$, respectively, of low-side MOSFET 308 during the operation of converter 300. FIG. 16A shows that, before time $t_2$ and after time $t_3$, the gate of MOSFET 308 is biased at a bias voltage $V_{GS}$(bias) (line 351) that is not equal to zero (line 354). This time period includes both the BBM interval between times $t_1$ and $t_2$ and the BBM interval between times $t_3$ and $t_4$, as well as the time when MOSFET 308 would normally be turned of (before time $t_1$ and after time $t_4$). MOSFET 308 is turned on between times $t_2$ and $t_3$, and its gate is biased at $V_{batt}$ during this interval.

Figure 2A:
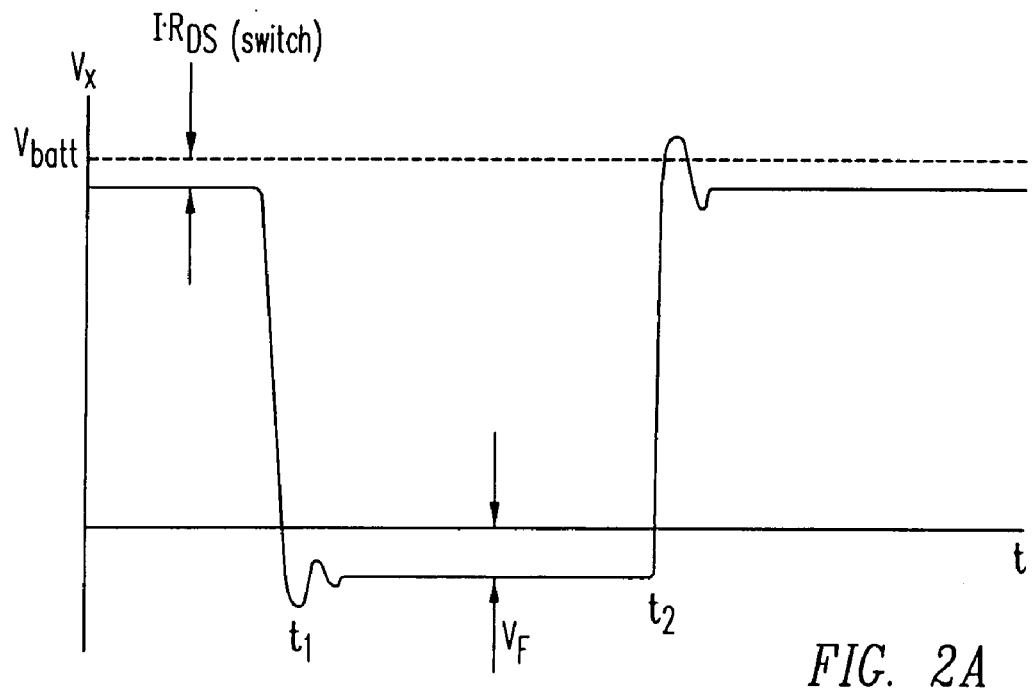
FIG. 2A is a graph of the intermediate voltage during the operation of a conventional Buck converter.
Figure 2B:
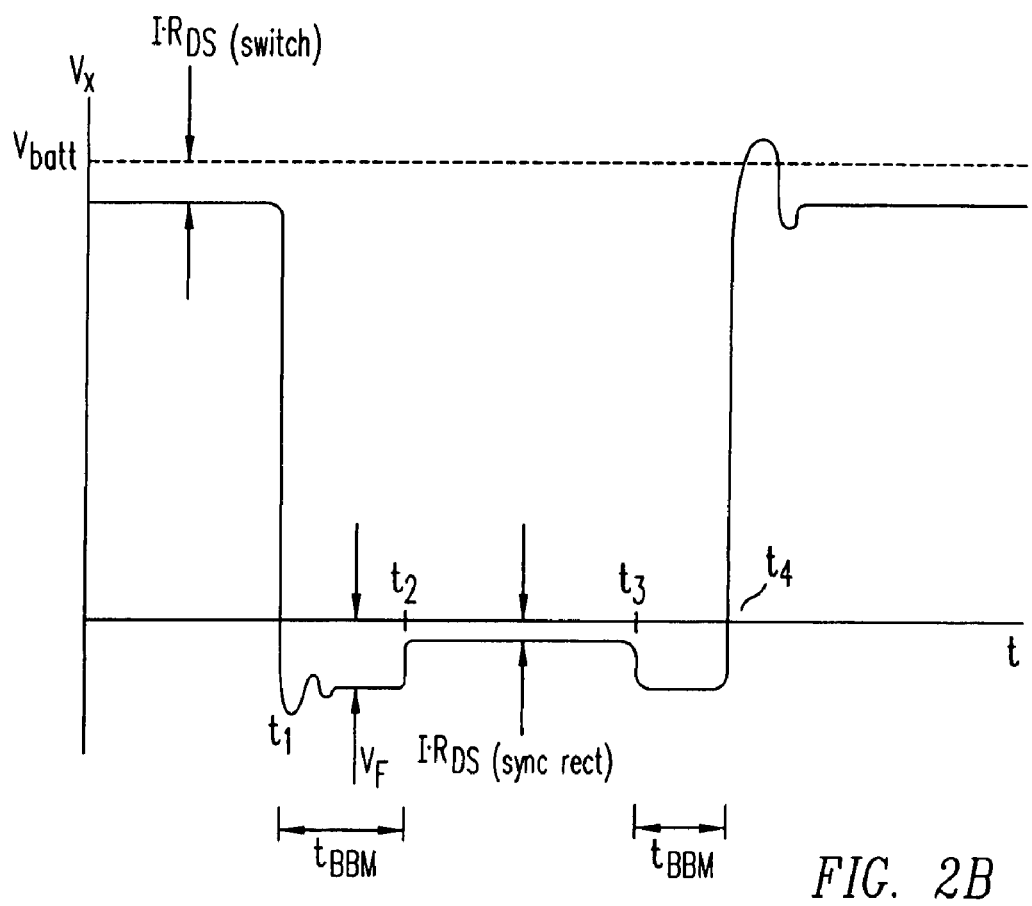
FIG. 2B is a graph of the intermediate voltage during the operation of a conventional synchronous Buck converter.
Figure 3A:
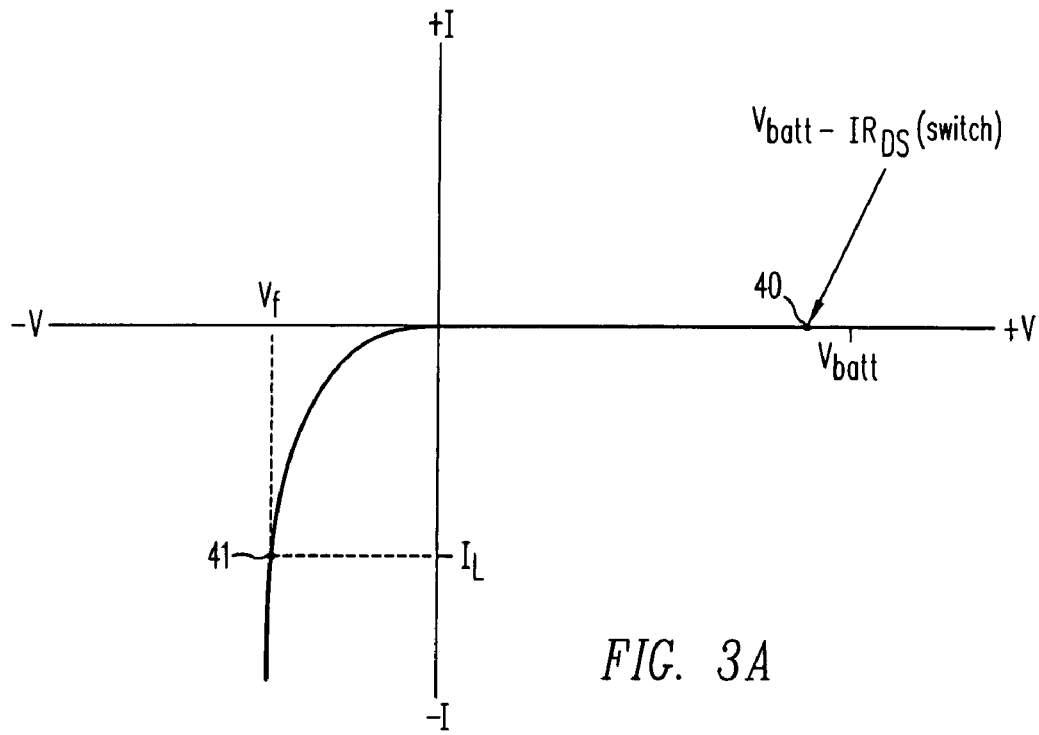
FIG. 3A illustrates the I-V characteristics of a Schottky diode rectifier.
Figure 3B:
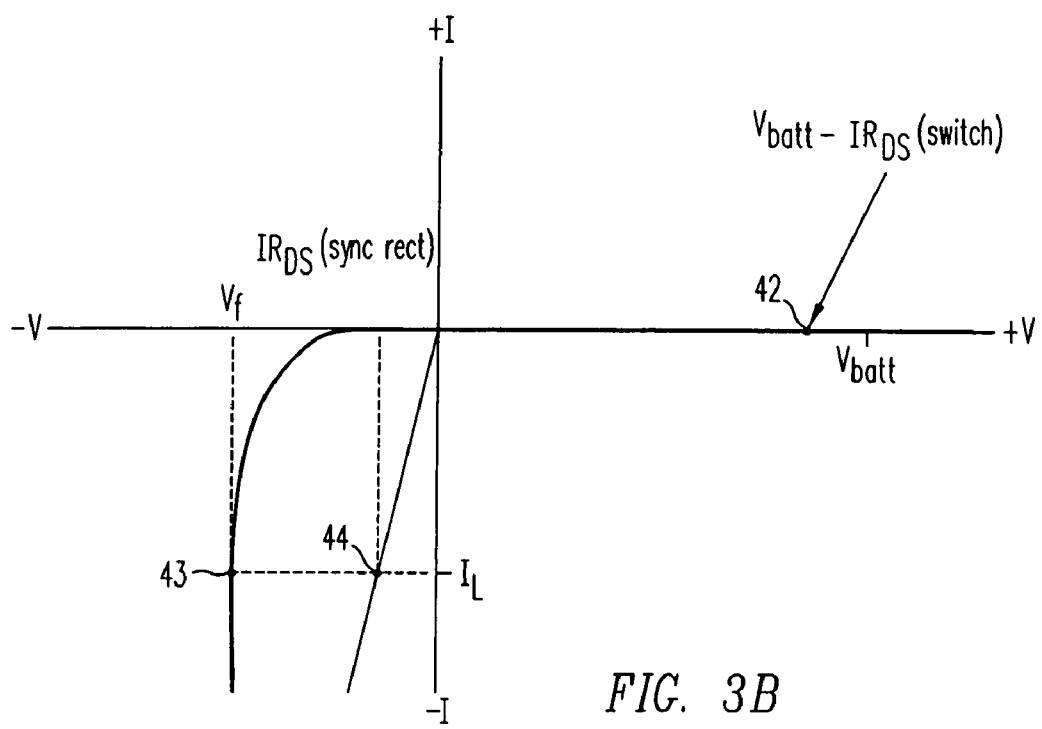
FIG. 3B illustrates the I-V characteristics of a synchronous rectifier MOSFET.
Figure 4A:
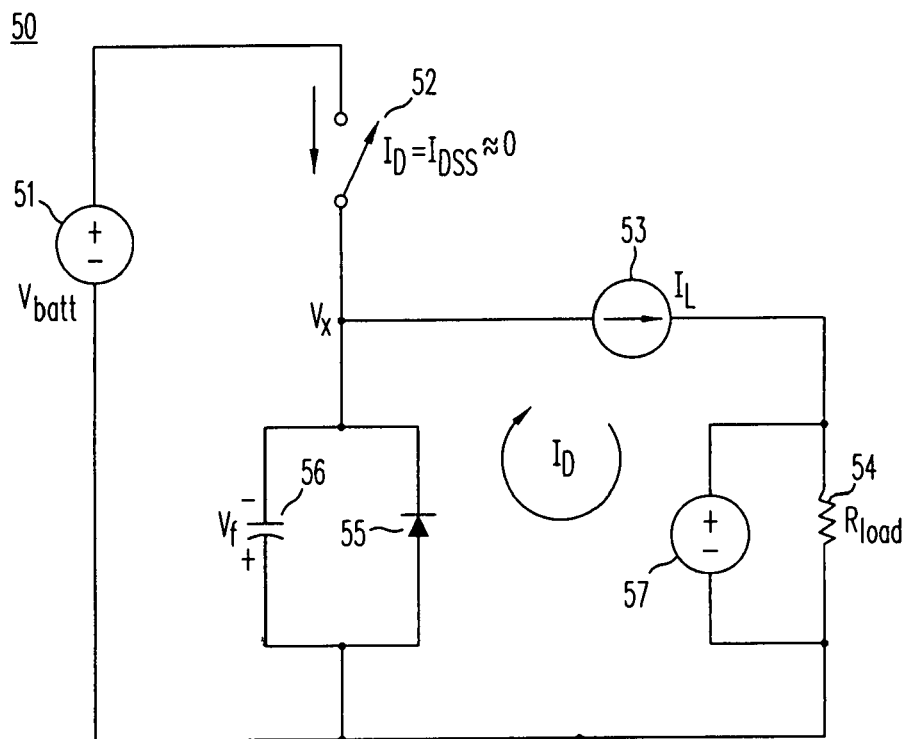
FIG. 4A is an equivalent circuit diagram illustrating the operation of a synchronous Buck converter immediately after the high-side MOSFET is turned off.
Figure 4B:
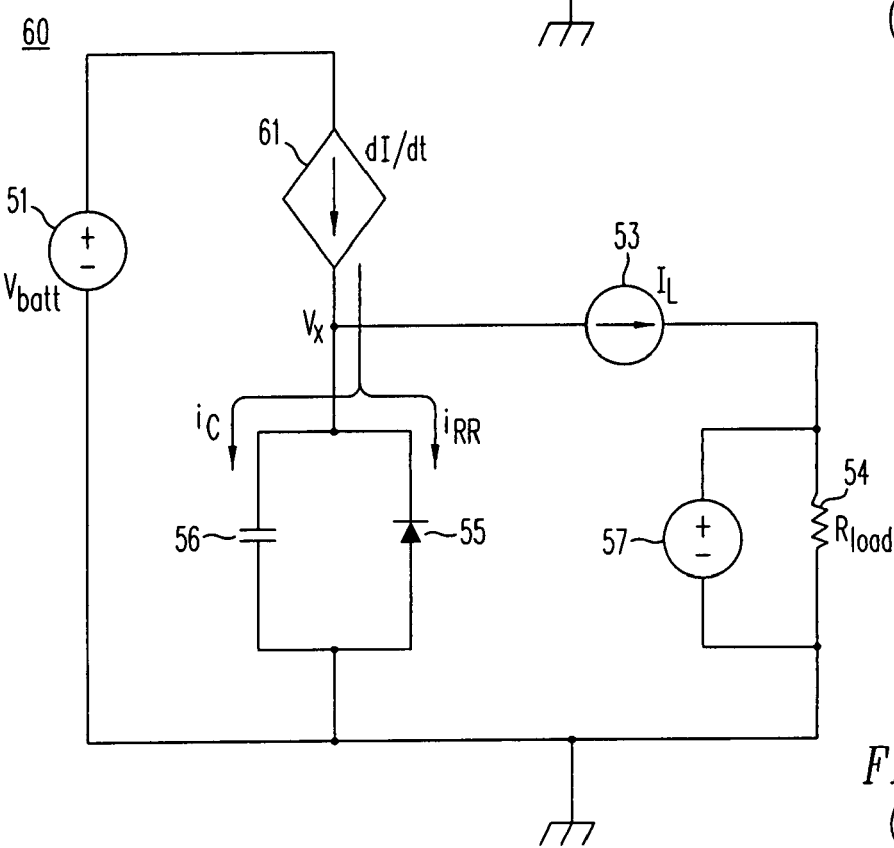
Figure 4C:
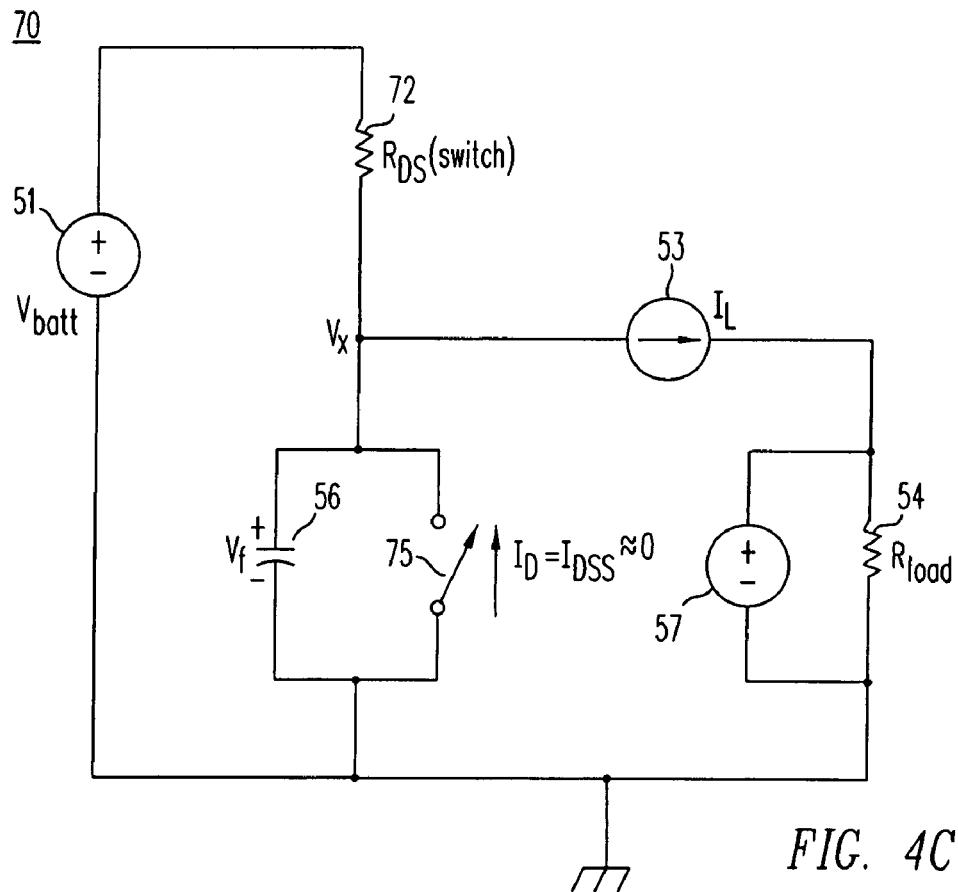
FIG. 4C is an equivalent circuit diagram illustrating the operation of a synchronous Buck converter immediately after the high-side MOSFET is turned on as a fully-enhanced on-state switch.
Figure 7:
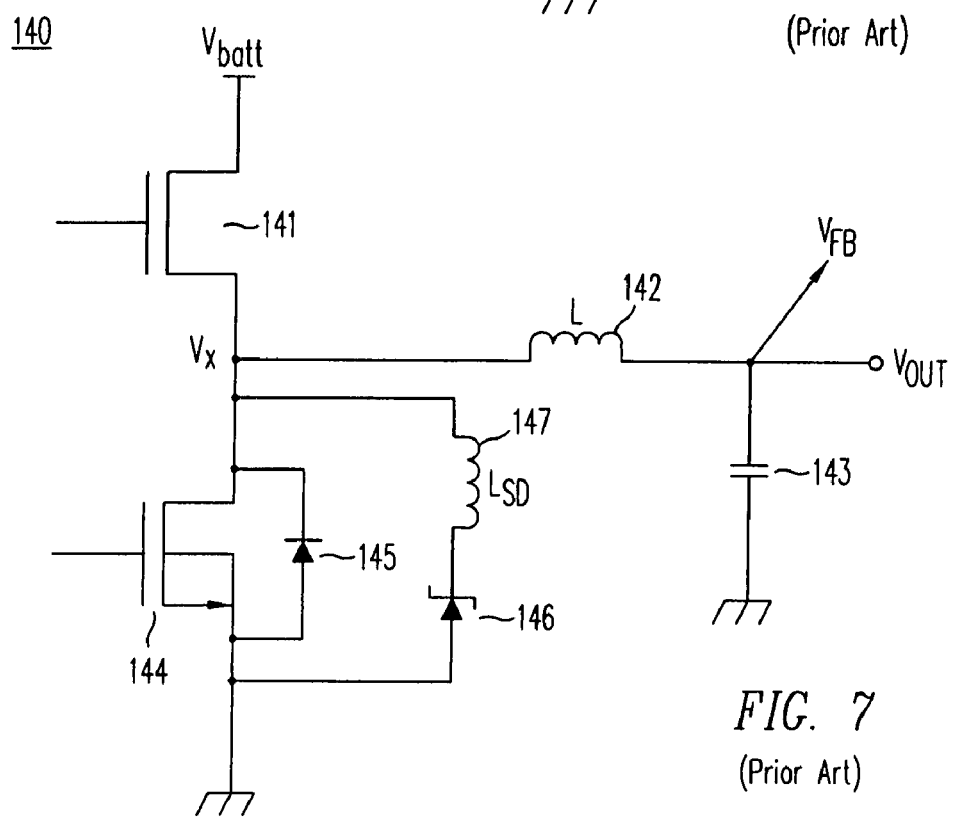
FIG. 7 is an equivalent circuit diagram of a Schottky diode used to shunt current from a MOSFET.

FIG. 16B, which should be compared with FIG. 2B, shows that over ring 362 (dashed line) is suppressed by operating the intermediate voltage $V_x$ at a slightly negative level $V_x$(bias), less than a diode drop $V_f$ but more than $I \cdot R_{DS}$(sync rect).

Figure 17:
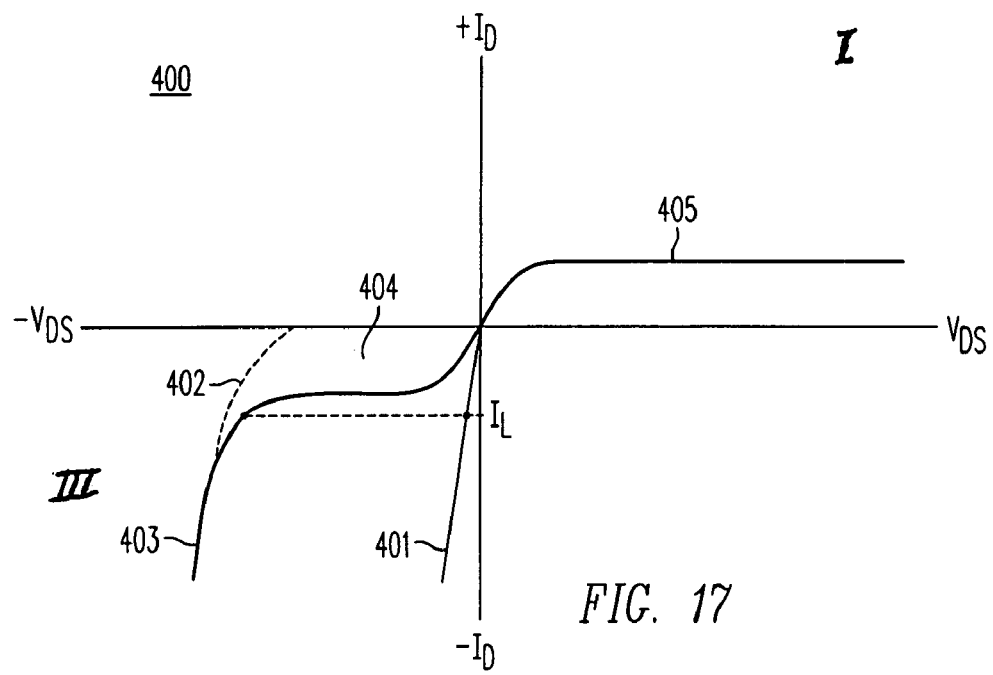
FIG. 17 is a graph of the I-V operating characteristics of the synchronous rectifier MOSFET in a synchronous Buck converter according to the invention.

FIG. 17 is a graph of the I-V operating characteristics of the low-side synchronous rectifier MOSFET 308. As shown, MOSFET 308 is on in Quadrant III (line 404) during BBM and in Quadrant I during diode recovery (line 405).

Figure 18A:
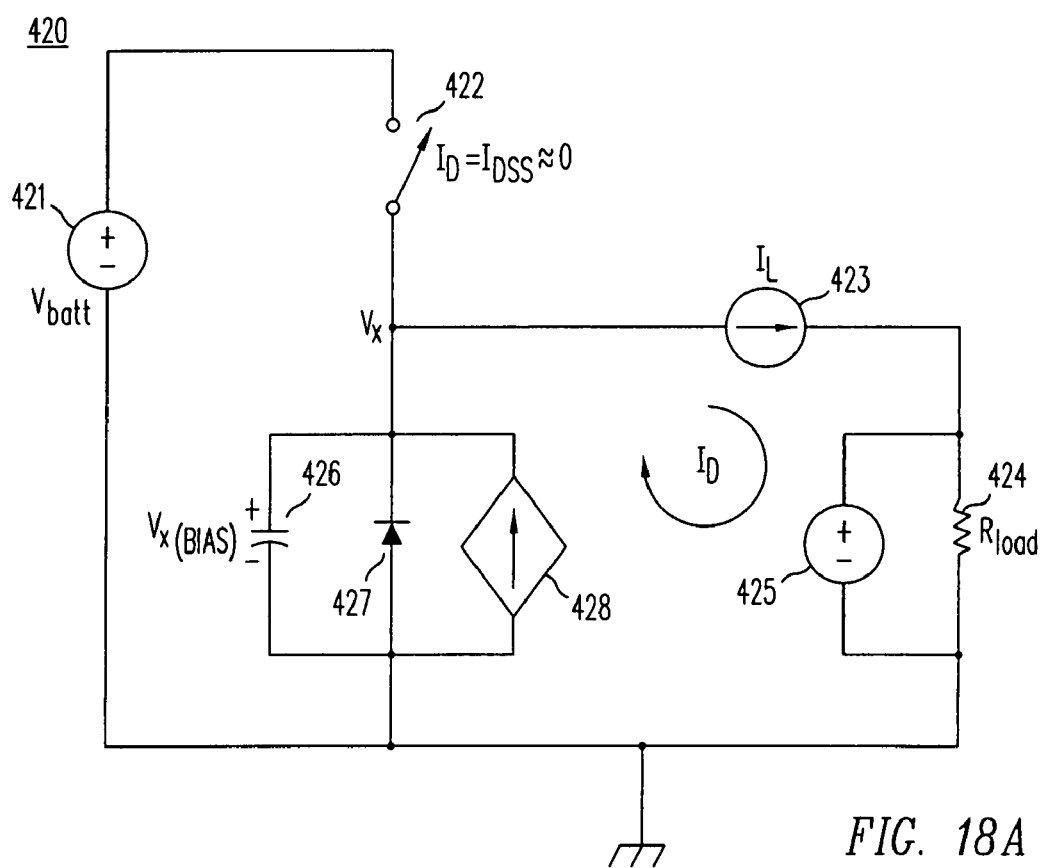
FIG. 18A is an equivalent circuit of the Buck converter during the break-before-make interval immediately after the low-side MOSFET has turned off.
Figure 18B:
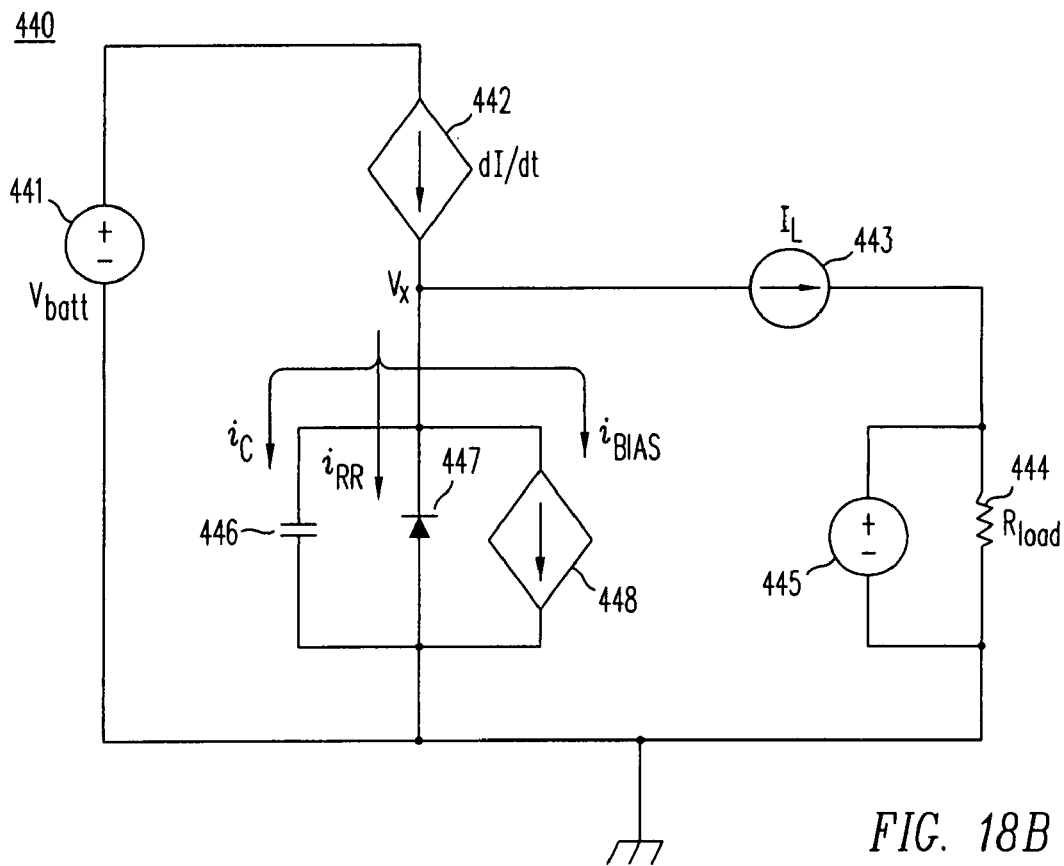
Figure 18C:
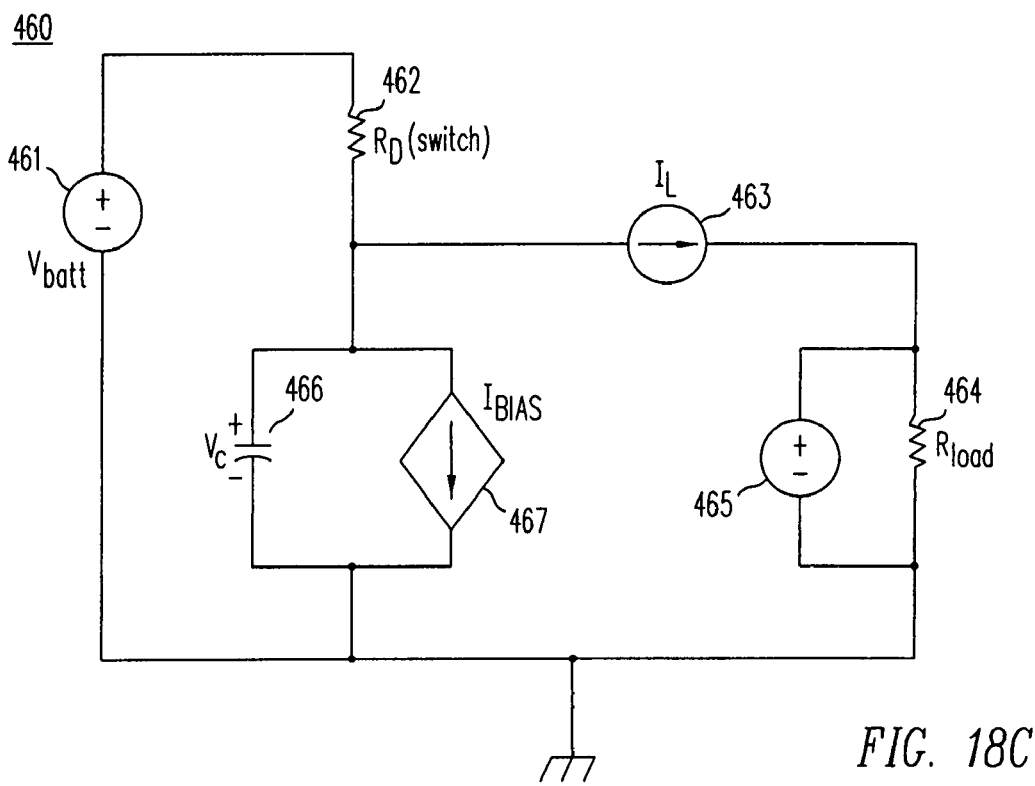
FIG. 18C is an equivalent circuit of the Buck converter after the conclusion of diode recovery when the high-side MOSFET is again in its linear operating region.

FIGS. 18A-18C represent a phenomenological description of the forced-diode recovery process and its influence on switching transient generated noise in synchronous Buck converter 300, shown in FIG. 15A. Specifically, equivalent circuit 420 in FIG. 18A illustrates Buck converter 300 during diode recirculation immediately after MOSFET 307 is turned off, as represented by open switch 422. Voltage source 421 ($V_{batt}$) represents the battery or other voltage input, resistor 424 represents an idealized approximation of the load, and voltage-source 425 represents charged capacitor 311, which for short duration transients can be modeled as an AC short. Fixed current source 423 is an idealized representation of inductor 310 operating under steady state switching conditions—a valid assumption so long that the clock's switching frequency is substantially greater than the resonant frequency of the LC filter.

Diode 427 represents the forward-biased silicon P-N junction intrinsic to MOSFET 308 and capacitor 426 represents charge stored in the forward-biased junction. So long that the leakage current $I_{DSS}$ in open switch 422 is substantially zero, e.g., less than one microampere, then the inductor current $I_L$ is entirely carried by diode 427, or $I_D = I_L$. A forward biased voltage $V_x$ (BIAS) develops across diode 427 commensurate with this current level. The current source 428 represents the current $I_{bias}$ flowing through the channel of the low side MOSFET 308 when it is acting as a current source. The current $I_{bias}$ shunts current away from diode 427, resulting in less charge storage in diode 427. This condition persists during the entire BBM interval.

Equivalent circuit 440, shown in FIG. 18B, represents converter 300 immediately after high-side MOSFET 307 is turned on. As a saturated device with a steadily rising gate voltage, MOSFET 307 is represented as a controlled current source 442, producing a current increasing at a relatively constant dI/dt, and in so doing, reverse biasing diode 447. Before the intermediate voltage $V_x$ can rise, however, all the charge stored in rectifier diode 447 must be depleted. This stored charge comprises both depletion capacitance, represented by capacitor 446, and minority carriers stored in "real" junction diode 447, referred to as "diffusion capacitance". The transient current $i_C$ represents the current needed to discharge diffusion capacitance 446 while the current $i_{RR}$ represents the reverse recovery charge needed to overcome diffusion capacitance and turn-off the forward biasing of diode 447.

While depletion capacitance and diffusion capacitance each exhibit different transient characteristics, their combined impact determines the overall "diode recovery", a phenomenon delaying the cessation of conduction in P-N diode 447 and postponing the rise of voltage $V_x$.

FIG. 18B shows that the current $I_{BIAS}$ provided by current source 448 allows the voltage Vx to slew during diode recovery of the intrinsic diode (represented by diode 447) in MOSFET 308, even though diode 447 has not totally recovered (since it has less charge).

Equivalent circuit 460, shown in FIG. 18C, illustrates synchronous Buck converter 300 after the conclusion of diode recovery when MOSFET 307 is once again biased in its linear operating region as a fully-enhanced on-state switch, represented as a resistor 462. The low-side diode 309 and synchronous rectifier MOSFET 308, now in their current source state, are represented by current source 467, exhibiting a leakage current caused by $I_{BIAS}$ after recovery of diode 447. The leakage current can be turned off after the transient has ended.

Figure 5:
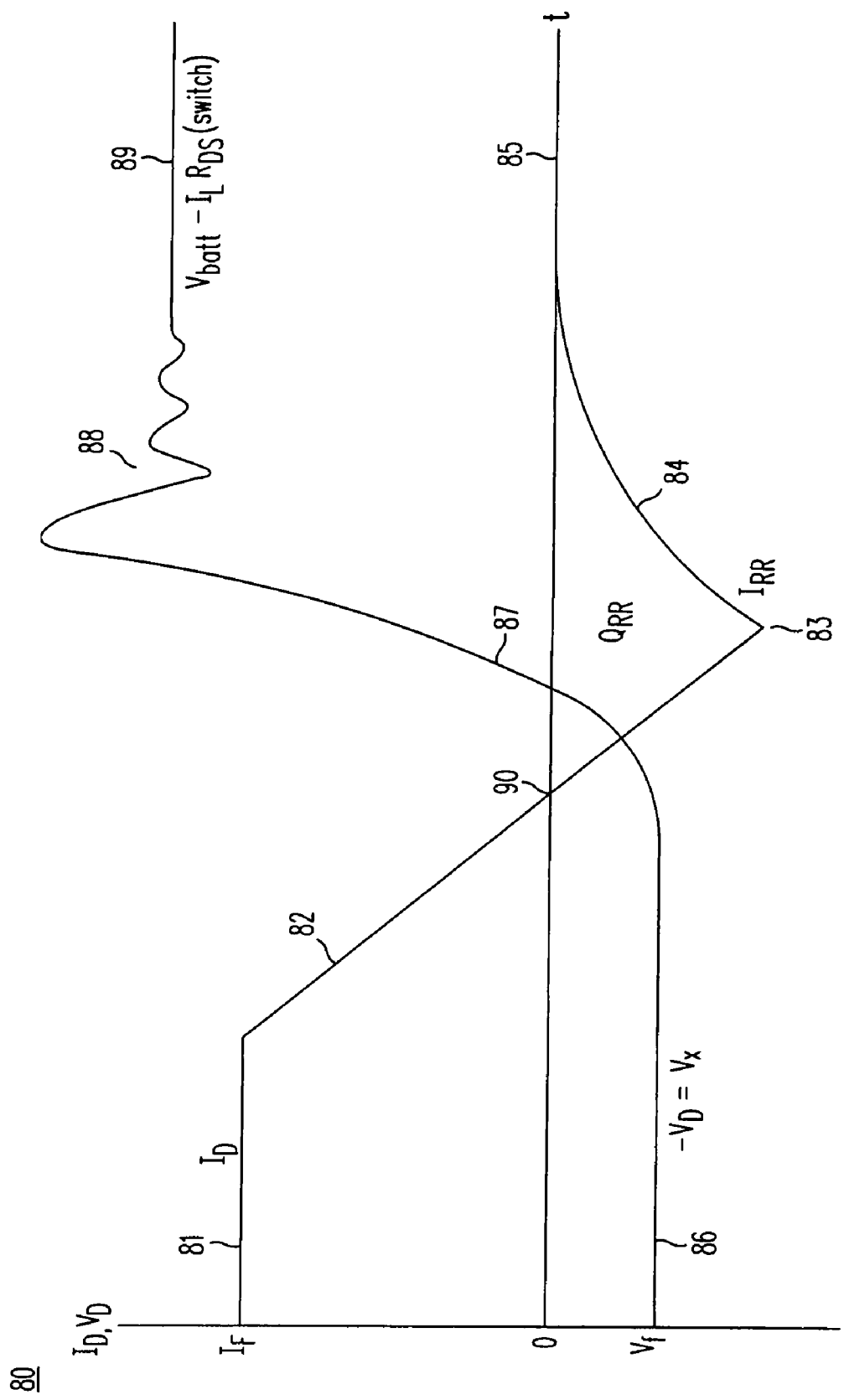
FIG. 5 is a graph showing the current and voltage in a diode during the forced diode recovery that occurs following the switching of the diode from a forward-biased to a reverse-biased condition.
Figure 6A:
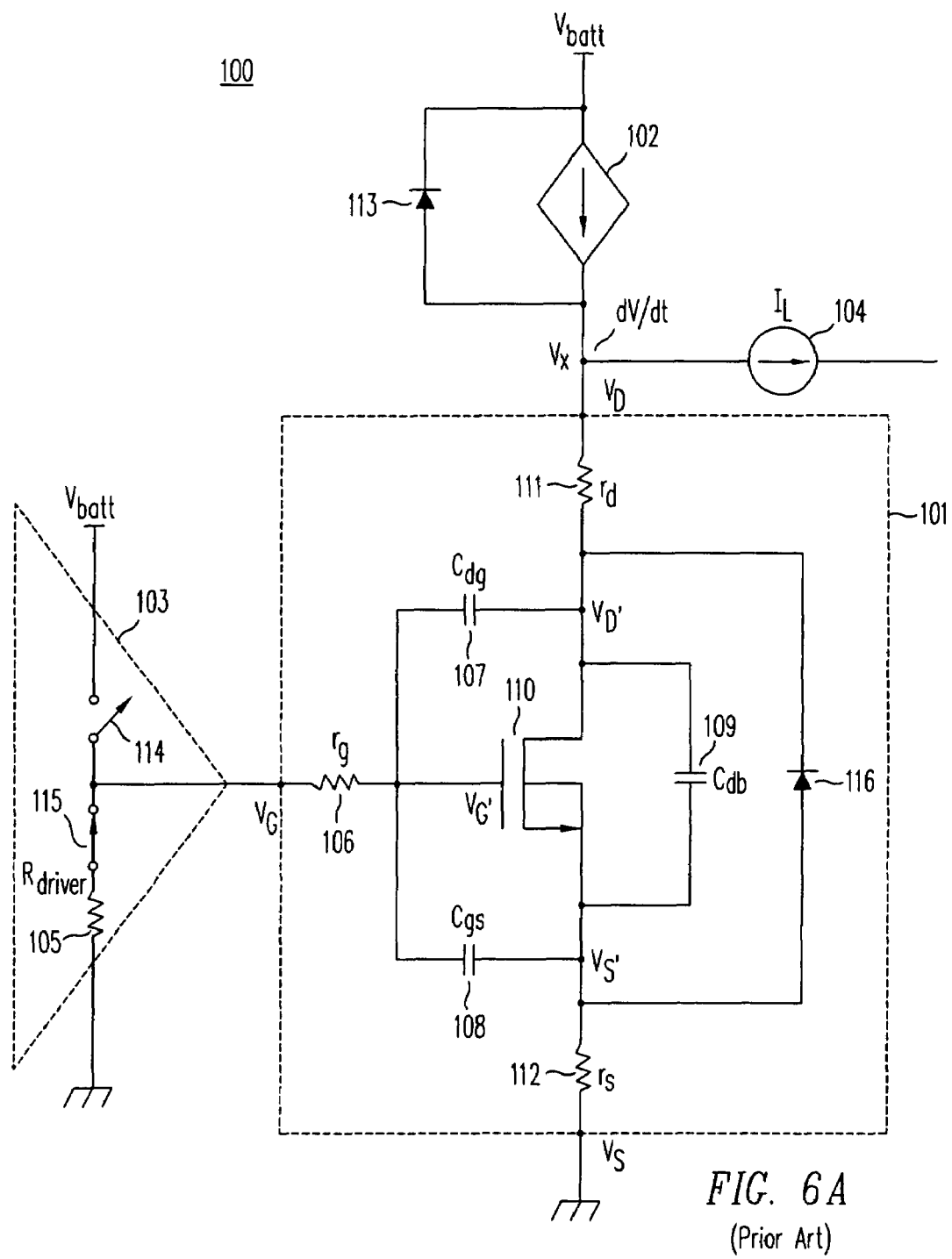
FIG. 6A is an equivalent circuit diagram of the slew-rate-induced false turn-on of synchronous rectifier during high dV/dt.
Figure 6B:
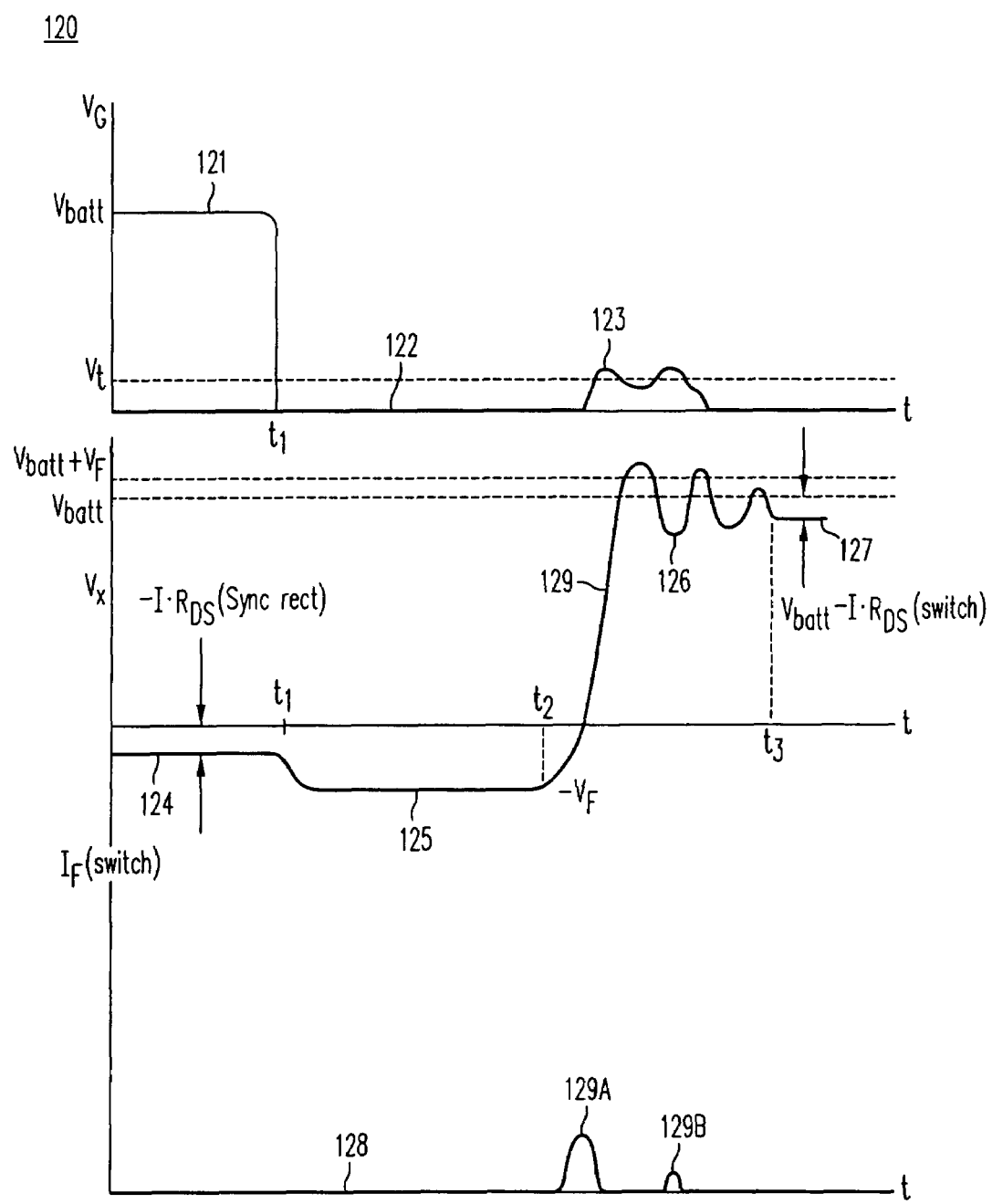
FIG. 6B is a graph showing waveforms of various voltages and currents in the equivalent circuit shown in FIG. 6A.
Figure 8C:
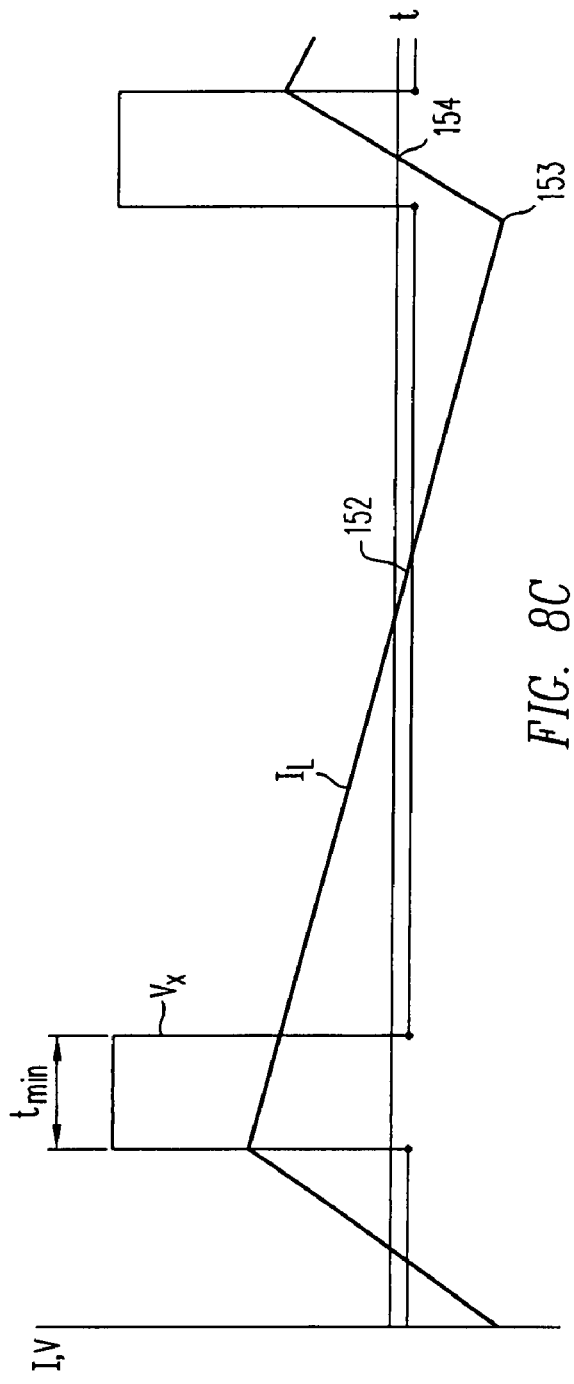
FIG. 8C is a graph of the inductor current in a synchronous Buck converter operating at a light-load condition with current reversal.
Figure 19A:
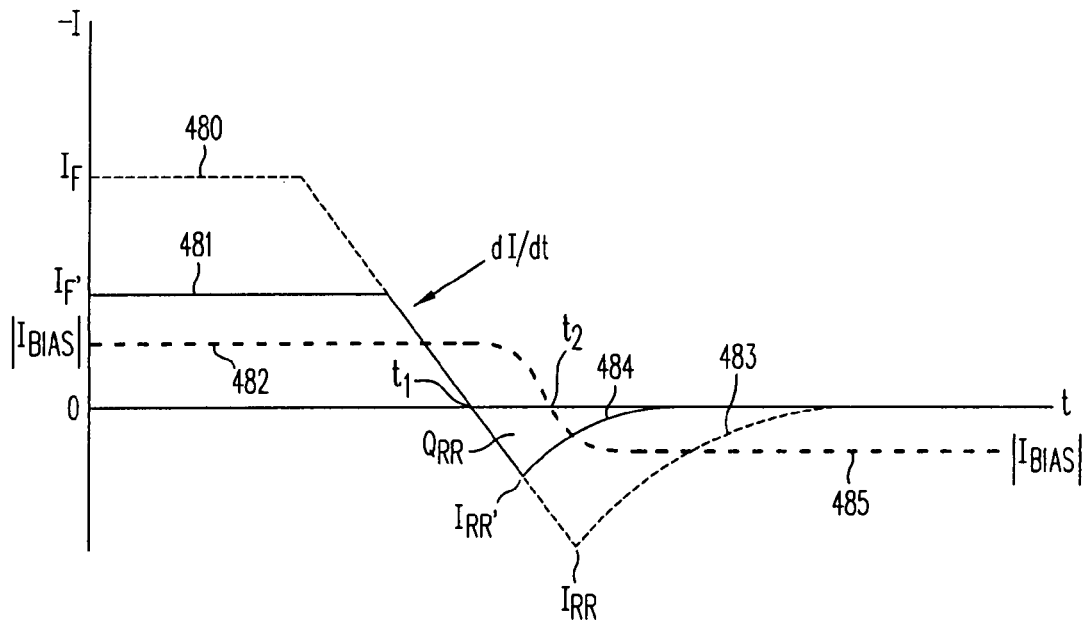
FIG. 19A shows the current in the low-side MOSFET during diode recovery, overlaid against the equivalent waveform in FIG. 5.
Figure 19B:
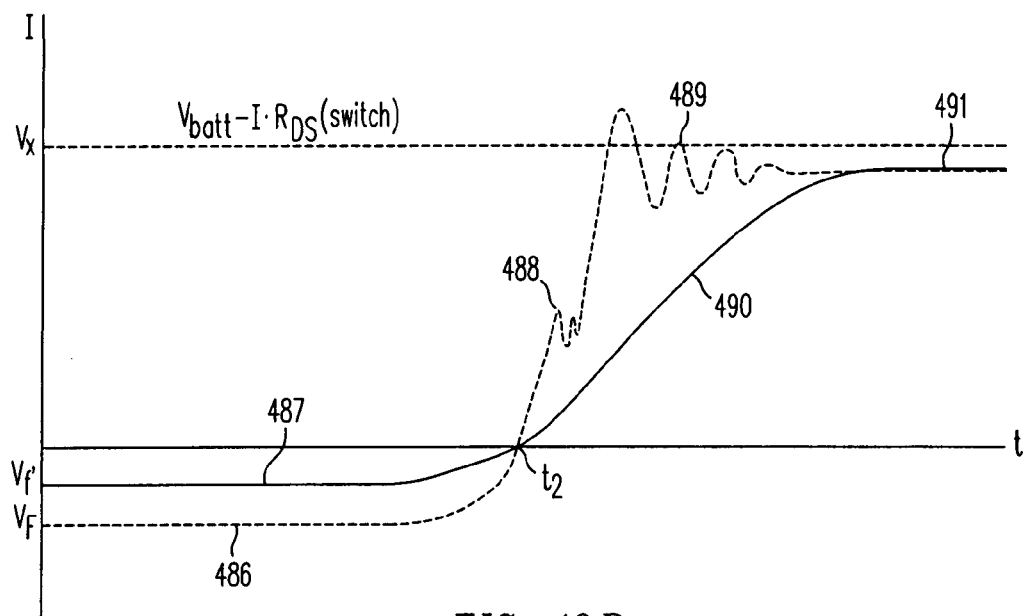
FIG. 19B shows voltage across the low-side MOSFET during diode recovery, overlaid against the equivalent waveform in FIG. 5.

The recovery of diode 309 is illustrated in FIGS. 19A and 19B by its current and voltage waveforms at the onset of reverse recovery, overlaid against the equivalent waveforms in FIG. 5. Prior to the transition, diode 309 conducts current $I_f'$ shown by line segment 481 and has a corresponding forward bias voltage of $V_f'$ shown by line segment 487. As the high side MOSFET 307 begins to conduct, it reduces the recirculation current flowing in diode 309.

The voltage across diode 309 diminishes only slightly due to the exponential nature of P-N diode conduction. At point $t_1$ the polarity of the current in the diode reverses direction, allowing current to momentarily flow on its cathode, backwards from normal conduction. Ideally, a diode will only let conduction occur when it is forward biased, i.e. when the current is flowing in the direction of the anode. Because of unwanted stored charge, beyond point $t_1$, reverse current is flowing in diode 309.

The magnitude of the reverse current increases until the charge stored in diode 309 has been removed and diode 309 can no longer support a reverse current. The reverse current reaches its peak value $I_{RR}'$ then begins to decrease in magnitude along a more exponentially shaped curve 484. Note that $I_{RR}'$ is much lower than original $I_{RR}$ shown in FIG. 5.

The onset of the rise of the intermediate voltage $V_x$ is delayed for some time after the peak reverse current occurs but eventually $V_x$ begins to rise rapidly in line segment 490 as the last vestige of minority carrier charge is removed or recombines within the two-dimensional P-N junction in diode 309. The voltage $V_x$ does not overshoot but instead rises smoothly to a steady state value of $V_{batt} - I_L \cdot R_{DS}$(switch) at point 491. To summarize, FIG. 19B shows that, following reverse diode recovery, the intermediate voltage $V_x$ experiences less dV/dt and no false turn-on effect (curve 488) than the intermediate voltage in a conventional synchronous Buck converter.

Figure 20A:
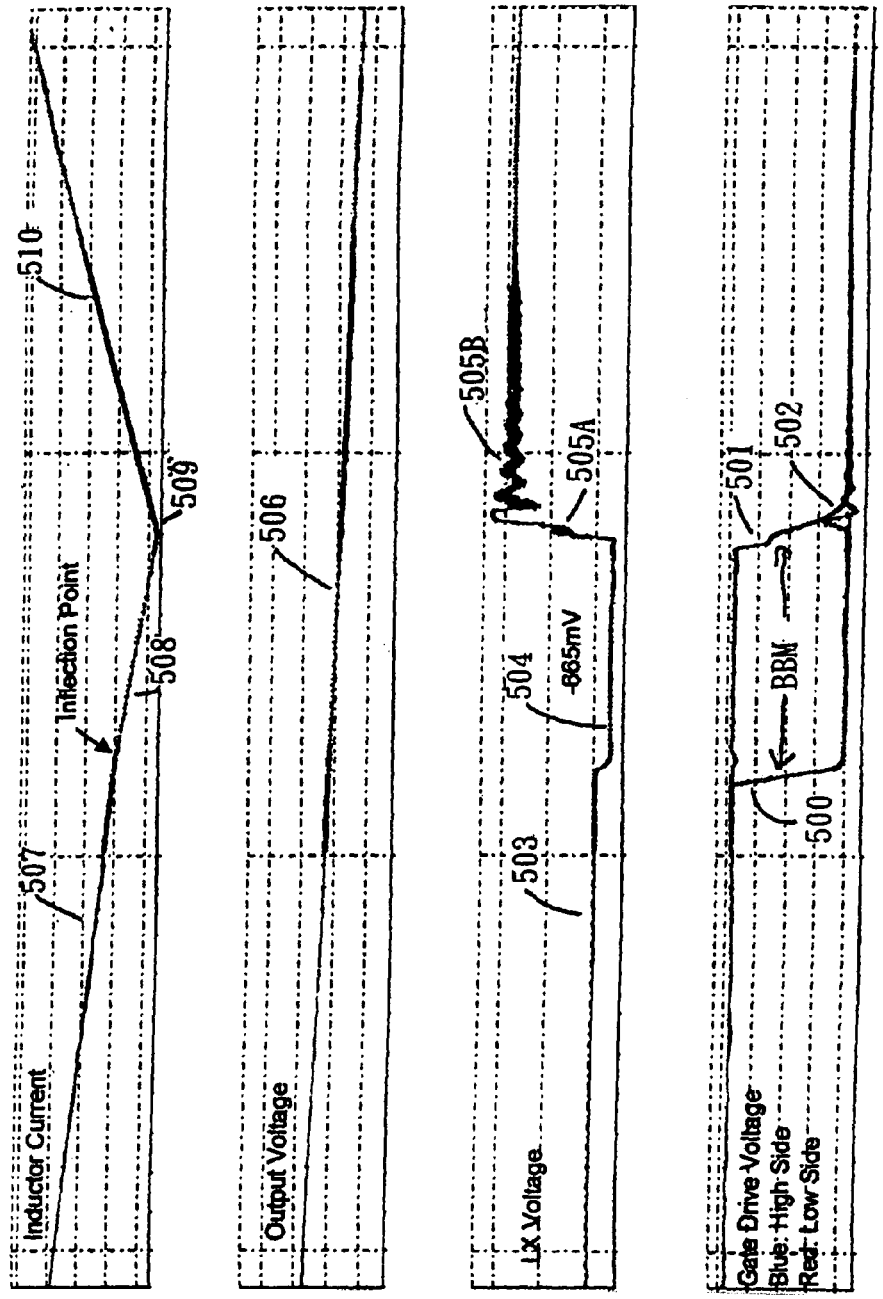
FIG. 20A shows simulated waveforms of inductor current, output voltage, intermediate voltage and gate voltage for a conventional synchronous Buck converter in full-load operation.

FIG. 20A shows simulated waveforms of inductor current, output voltage, intermediate voltage and gate voltage for a conventional synchronous Buck converter during full load operation. Note the oscillations (curve 505B) and false turn-on (curves 505A and 502).

Figure 20B:
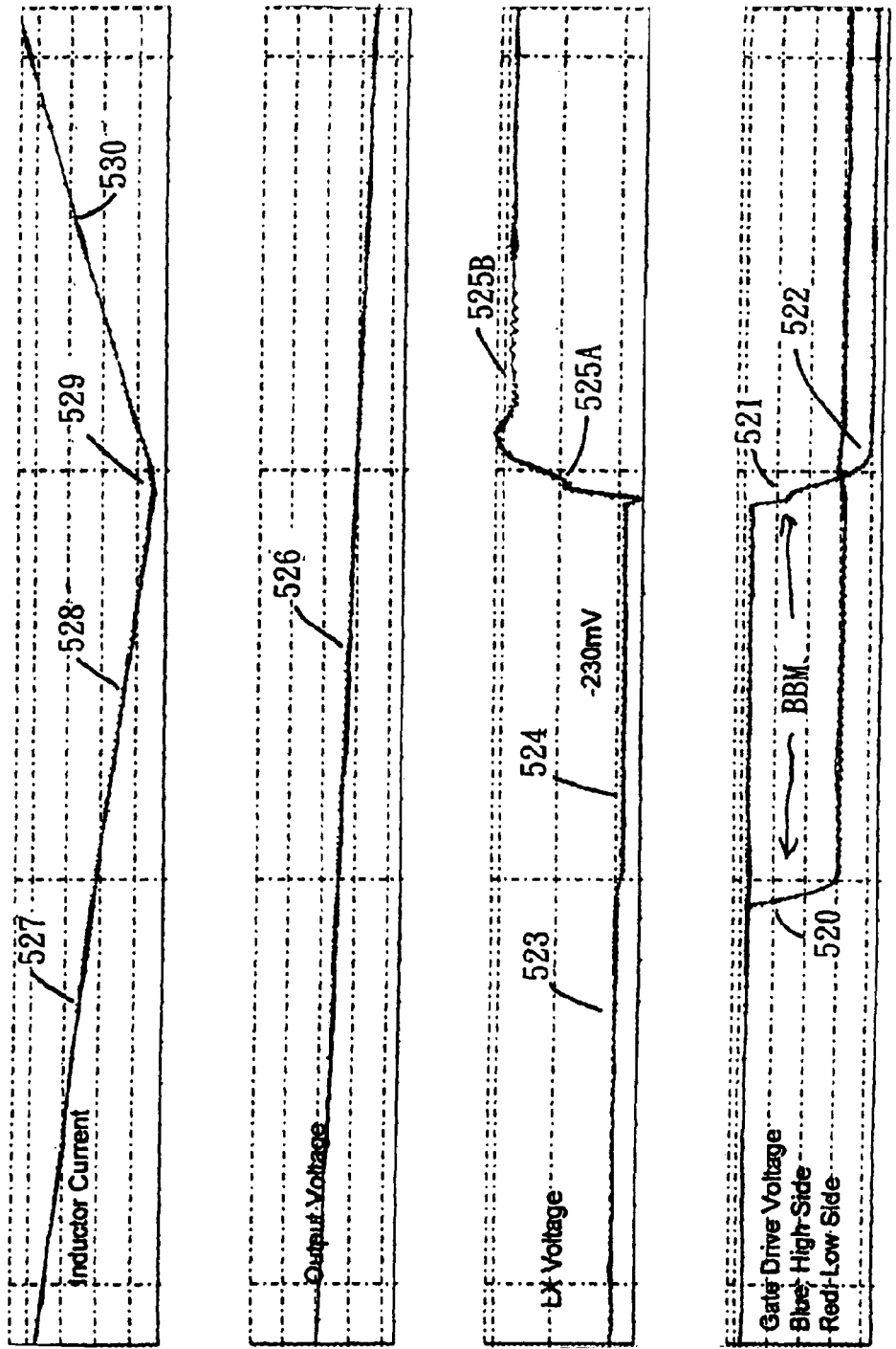
FIG. 20B shows simulated waveforms of inductor current, output voltage, intermediate voltage and gate voltage for a Buck converter in accordance with this invention in full-load operation.

FIG. 20B shows simulated waveforms of inductor current, output voltage, intermediate voltage and gate voltage for a Buck converter in accordance with this invention during full load operation. Note that the oscillations that appear in FIG. 20A are not present. The waveforms at regions 525A and 525B do not oscillate.

Figure 20C:
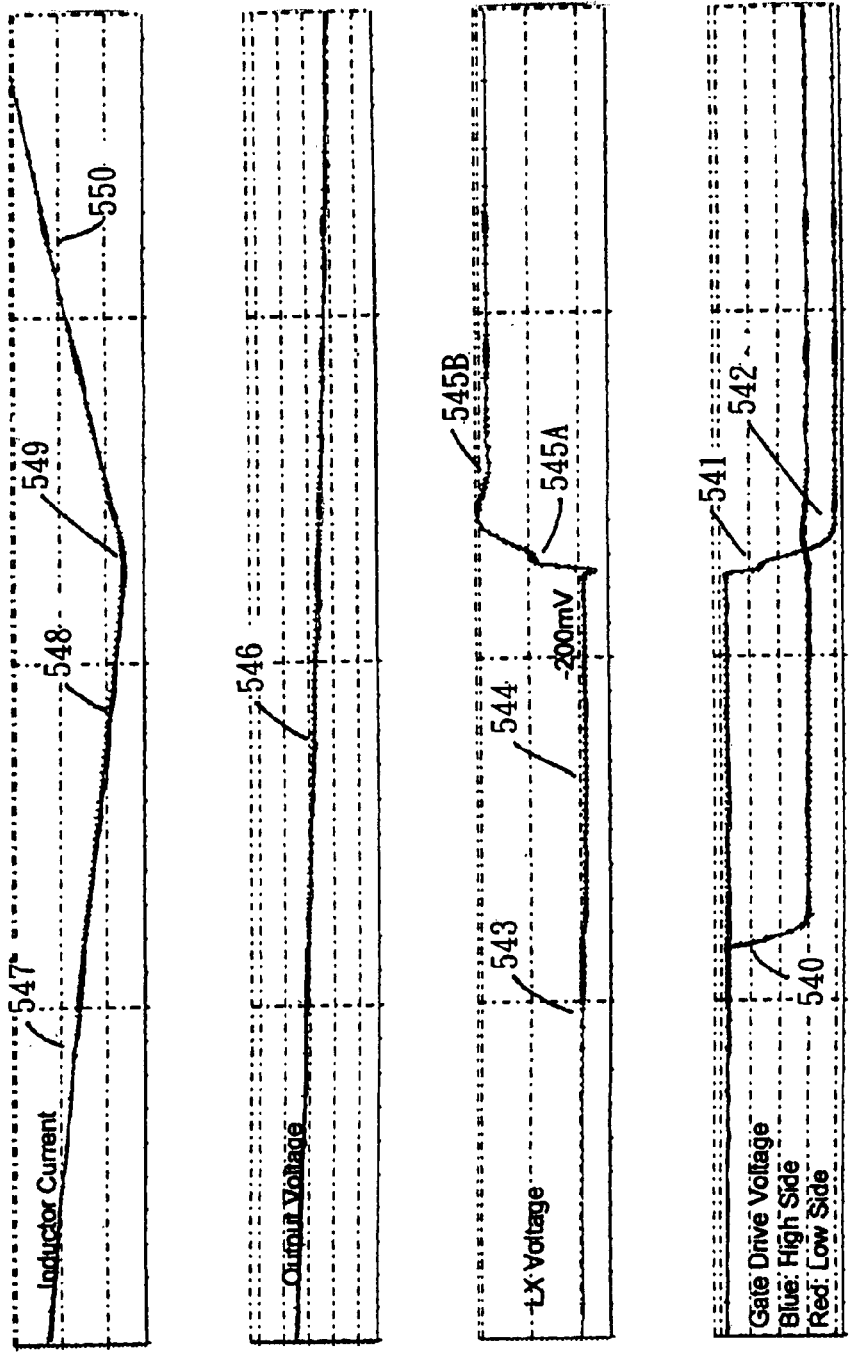
FIG. 20C shows simulated waveforms of inductor current, output voltage, intermediate voltage and gate voltage for a Buck converter in accordance with this invention at higher bias currents.

FIG. 20C shows simulated waveforms of inductor current, output voltage, intermediate voltage and gate voltage for a Buck converter in accordance with this invention at higher bias currents.

The operating sequence of a synchronous Buck converter in accordance with this invention is summarized in Tables 9 and 10:

TABLE 9

| Mode | High-Side | Low-Side | $I_L$ Direction | Diode Bias |
|---|---|---|---|---|
| Magnetization | On Switch ($R_{DS}$) | Off | To Output | Reverse Bias (RB) |
| BBM | Off | On Current Source | | Forward Bias (FB) |
| Recirculation | Off | On Switch ($R_{DS}$) | | Shunted FB |
| BBM | Off | On Current Source | | Forward Bias (FB) |
| Recovery | On Current Source | On Current Source | | Reverse Recovery |

Or alternatively:

TABLE 10

| Mode | High-Side | Low-Side | $I_L$ Direction | Diode Bias |
|---|---|---|---|---|
| Magnetization | On Switch ($R_{DS}$) | Off | To Output | Reverse Bias (RB) |
| BBM | Off | Off | | Forward Bias (FB) |
| Recirculation | Off | On Switch ($R_{DS}$) | | Shunted FB |
| BBM | Off | On Current Source | | Forward Bias (FB) |
| Recovery | On Current Source | On Current Source | | Reverse Recovery |

Light Load Operation

Figure 21:
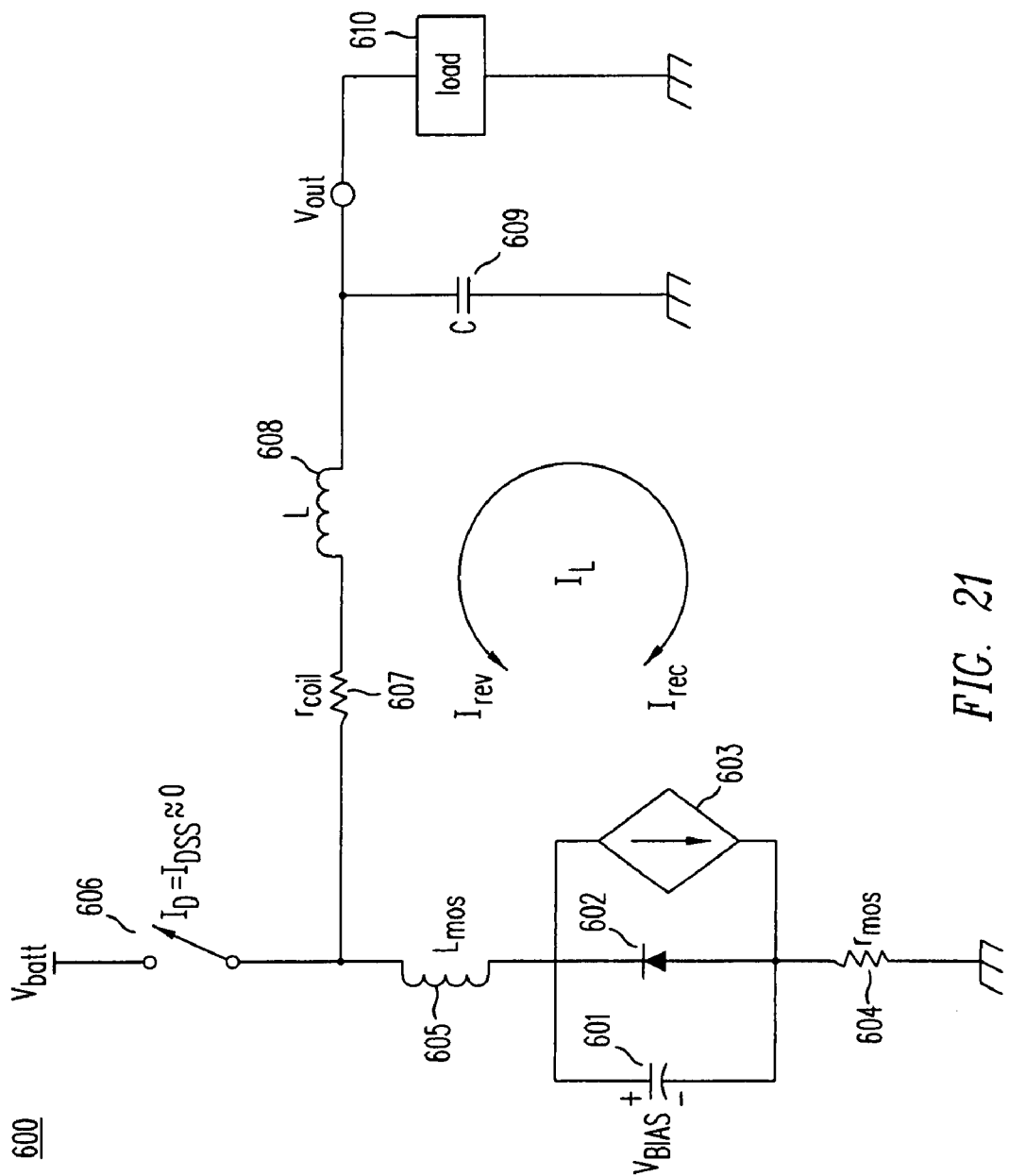
FIG. 21 is an equivalent circuit diagram of a Buck converter in accordance with the invention during light-load operation.

FIG. 21 is an equivalent circuit diagram of a Buck converter in accordance with the invention during light-load operation. RLC tank circuit 600 includes a low side MOSFET represented by a depletion capacitance 601, a P-N diode 602 having a diffusion capacitance, a stray inductance 605 and a small-signal AC series resistance 604. An inductor 608 of magnitude L includes a winding resistance 607 of magnitude $r_{coil}$. The oscillating tank is completed by a filter capacitor 609 and a load impedance 610. While the equivalent LC resonant frequency determines the natural frequency of oscillation, the damping constant is determined by the equivalent RC time constant. Any stored charge in P-N diode 602 also affects the oscillating behavior of the circuit when both the high-side and low-side MOSFETs are off.

The high side MOSFET remains off in this interval and is illustrated as an open switch 606. Under this condition, the coil of inductor 608 cannot be represented as a current source, since the oscillations will occur near the passive circuit's resonant frequency, not driven by a significantly higher clock frequency. As shown in FIG. 9B, the oscillations 165 continue until at $t_4$, the high side MOSFET is activated by the controller and again the coil of inductor 608 is magnetized. This unwanted oscillation is unavoidable whenever the synchronous rectifier is simply turned off since energy is left stored in capacitance 601 and diode 602, and with MOSFET 603 off, there is no active device left to help damp the oscillation or otherwise remove the energy. On the other hand if the synchronous rectifier MOSFET remains on and conducting a low current 603 it helps to discharge the capacitors and damp the oscillations both in magnitude and in duration.

Figure 9A:
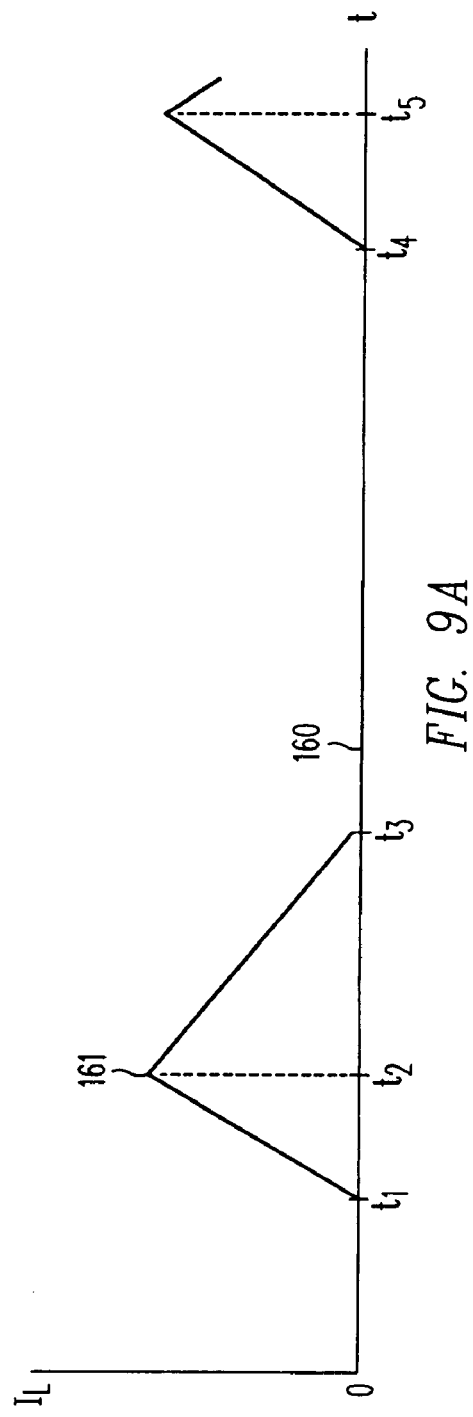
FIG. 9A is a graph of the inductor current in a synchronous Buck converter having its synchronous rectifier biased off during light-load reverse conduction.
Figure 10:
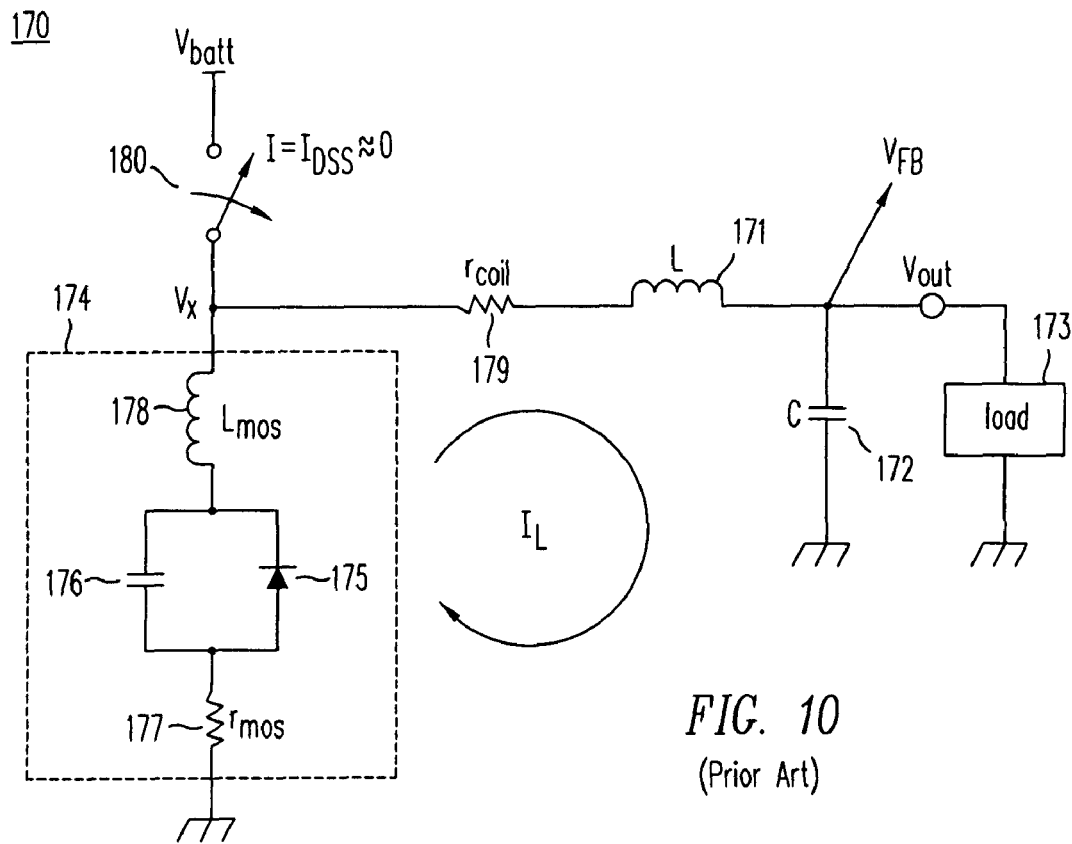
FIG. 10 is an equivalent circuit of a synchronous Buck converter in light-load conditions following the turn-off of the synchronous rectifier.
Figure 22A:
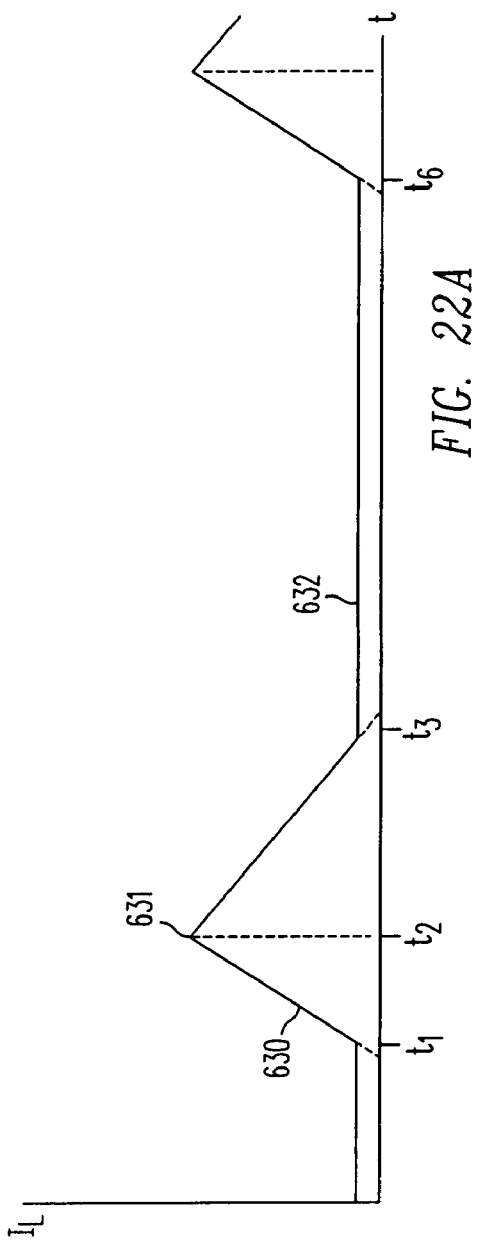
FIG. 22A is a graph comparing the waveform of the inductor current in a Buck converter according to this invention in light-load conditions with that shown for a conventional Buck converter in FIG. 9A (dashed line).
Figure 22B:
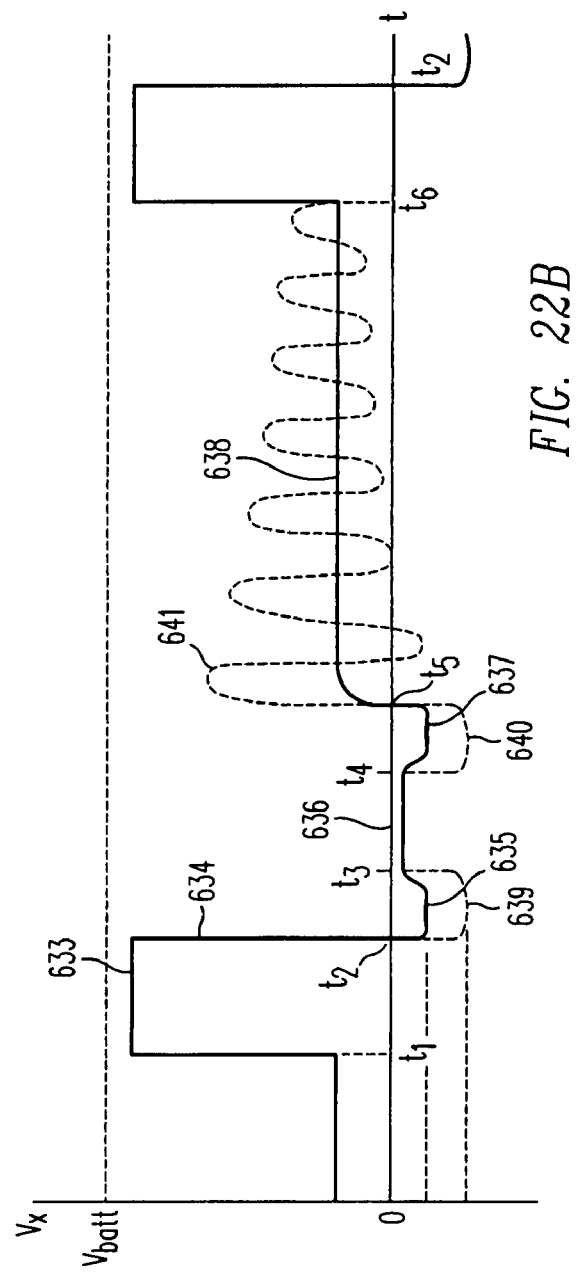
FIG. 22B is a graph comparing the waveform of the intermediate voltage in a Buck converter according to this invention in light-load conditions with that shown for a conventional Buck converter in FIG. 9B (dashed line).

FIGS. 22A and 22B compare the waveforms of $I_L$ and $V_X$ in this embodiment, respectively, with those in the embodiment shown in FIGS. 9A and 9B (dashed lines). As shown in FIG. 22B, there is no ringing in $V_x$ (compare line 638 with dashed line 641).

Figure 23A:
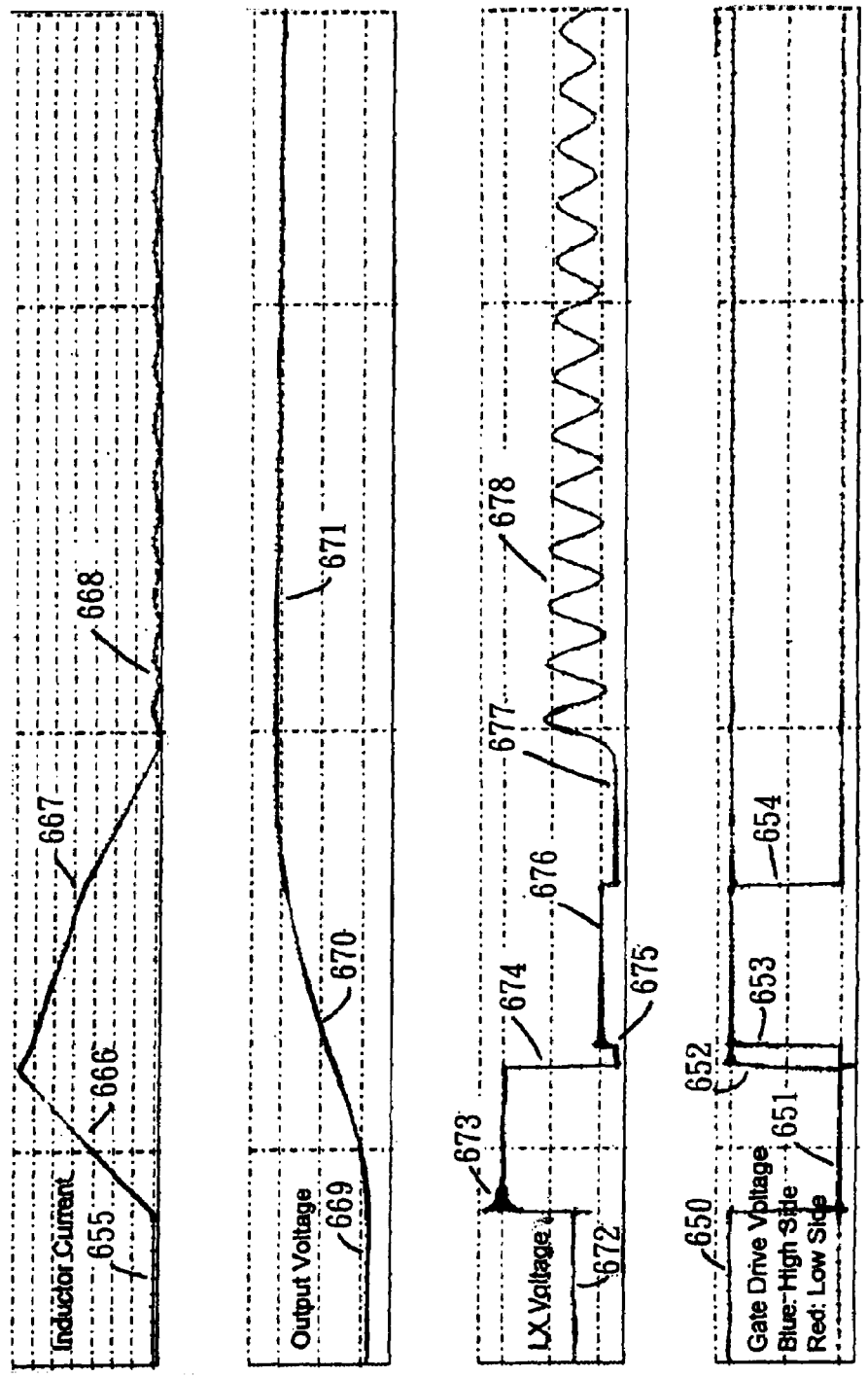
FIG. 23A shows simulated waveforms of inductor current, output voltage, intermediate voltage and gate voltage for a conventional synchronous Buck converter in light-load operation.
Figure 23B:
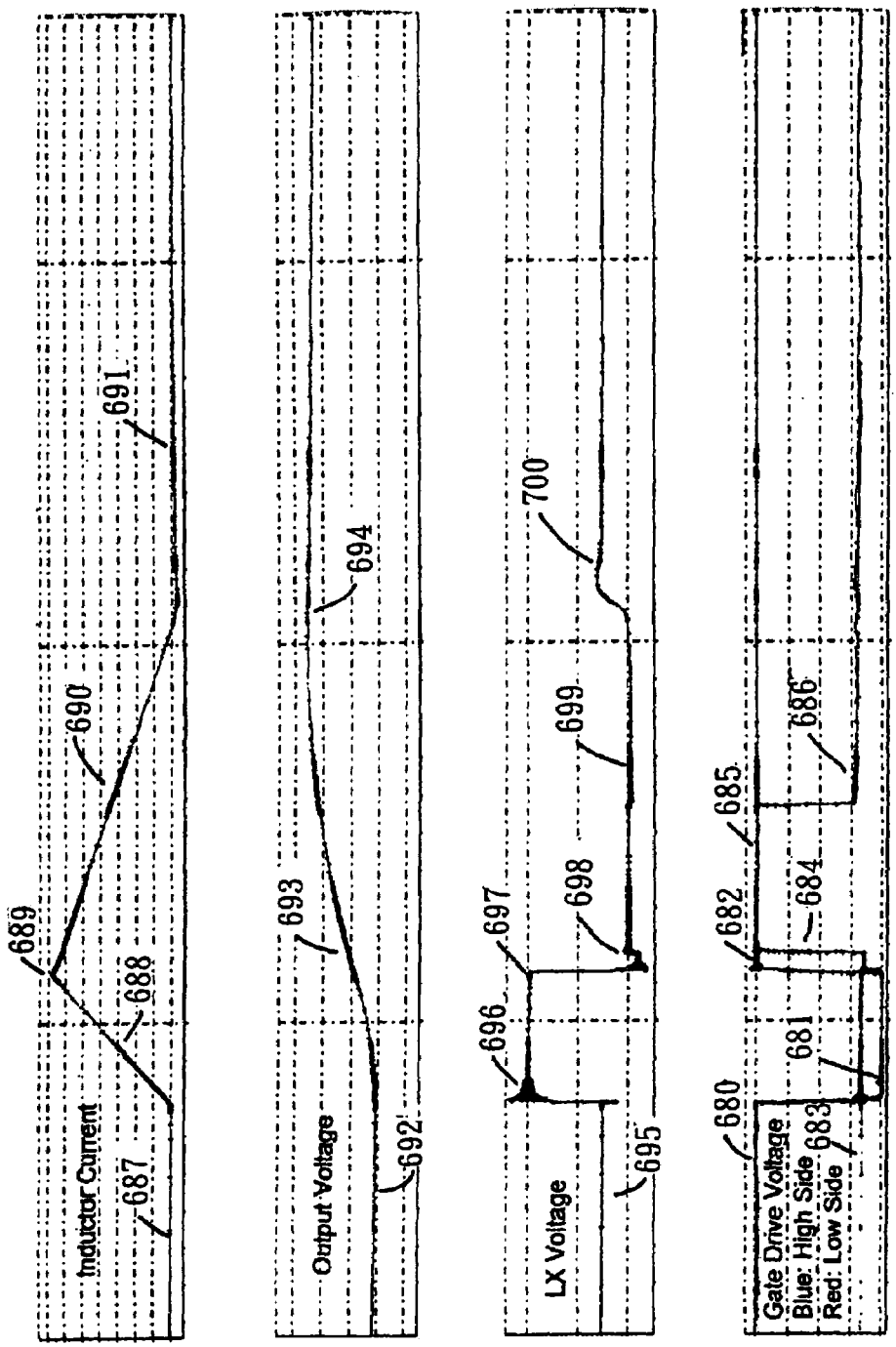
FIG. 23B shows simulated waveforms of inductor current, output voltage, intermediate voltage and gate voltage for a Buck converter in accordance with this invention in light-load operation.

Similarly, as shown in FIG. 23B, the oscillations shown in FIG. 23A are eliminated (compare curves 700 and 678).

Boost Converter

Figure 24:
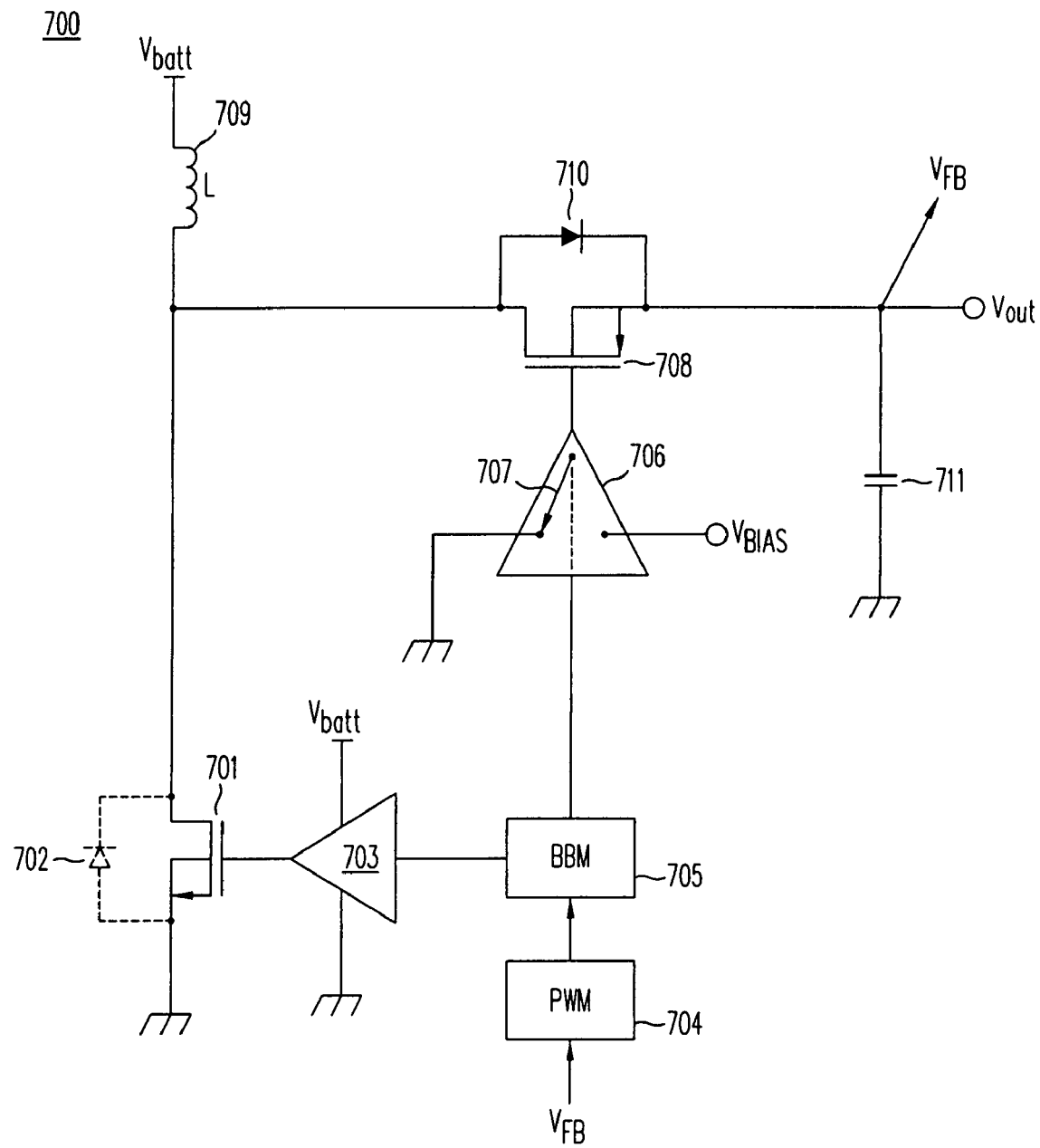
FIG. 24 is a schematic circuit diagram of a synchronous boost converter in accordance with this invention.

Synchronous boost converter 700 shown in FIG. 24 includes a low-side power MOSFET 701, a battery connected inductor 709, and a "floating" synchronous rectifier MOSFET 708, with the gates of the MOSFETs 701 and 708 driven by gate buffers 703 and 706, respectively. Gate buffers 703 and 706 are driven by a BBM circuit 705 and a PWM controller 704 in response to voltage feedback $V_{FB}$ from the output voltage $V_{out}$ present across a filter capacitor 711. Synchronous rectifier MOSFET 708 is considered "floating" in the sense that neither its source nor its drain terminal is permanently connected to any supply rail, i.e. ground or $V_{batt}$.

Figure 11:
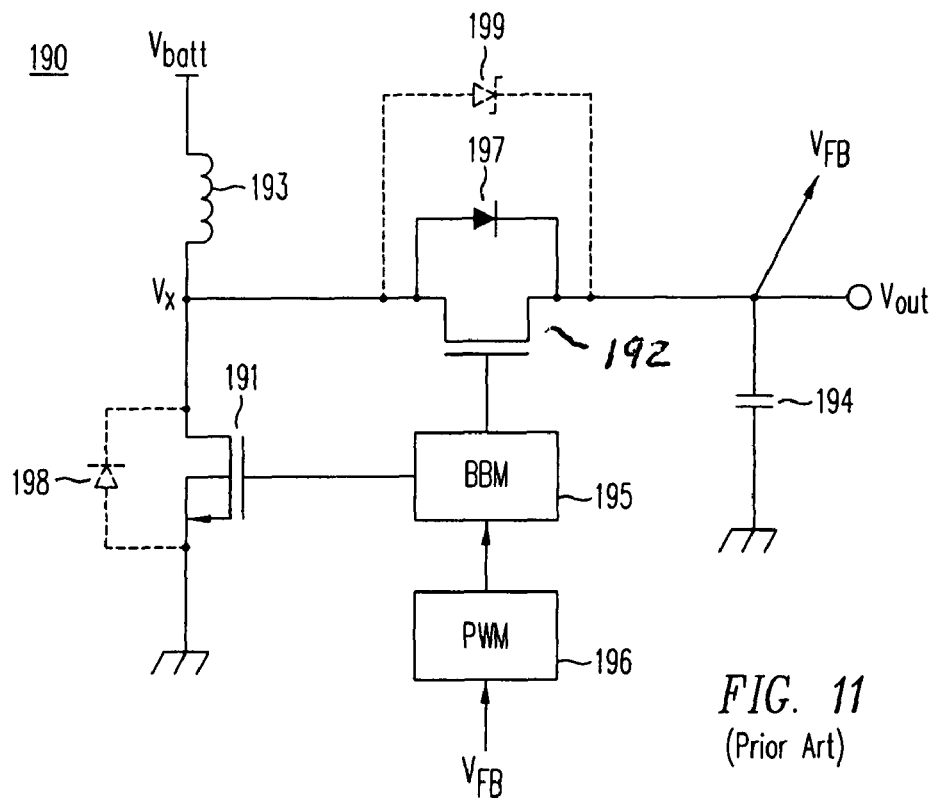
FIG. 11 is a schematic circuit diagram of a conventional synchronous boost converter.
Figure 12A:
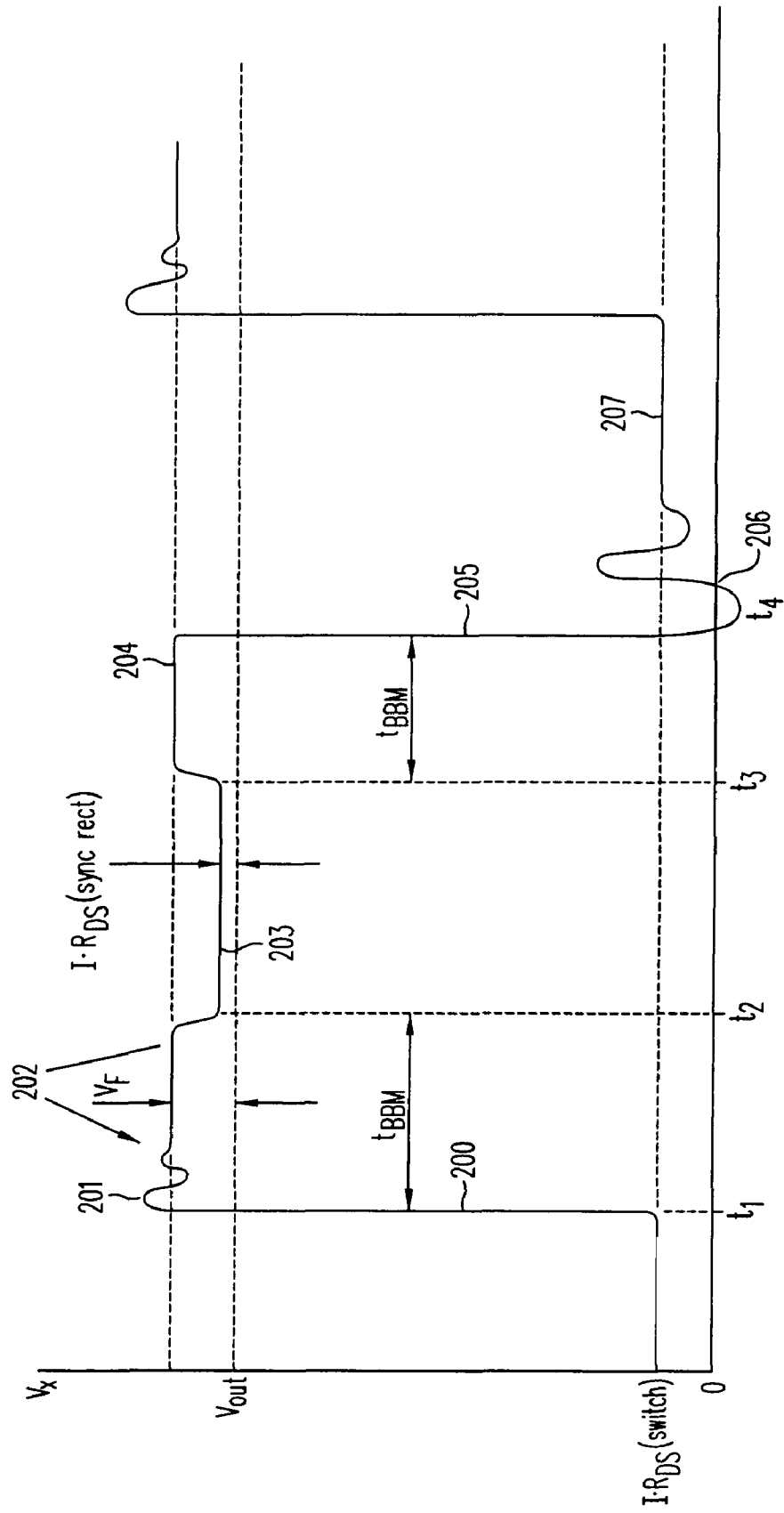
FIG. 12A is a graph of the intermediate voltage during the operation of a synchronous boost converter.
Figure 13A:
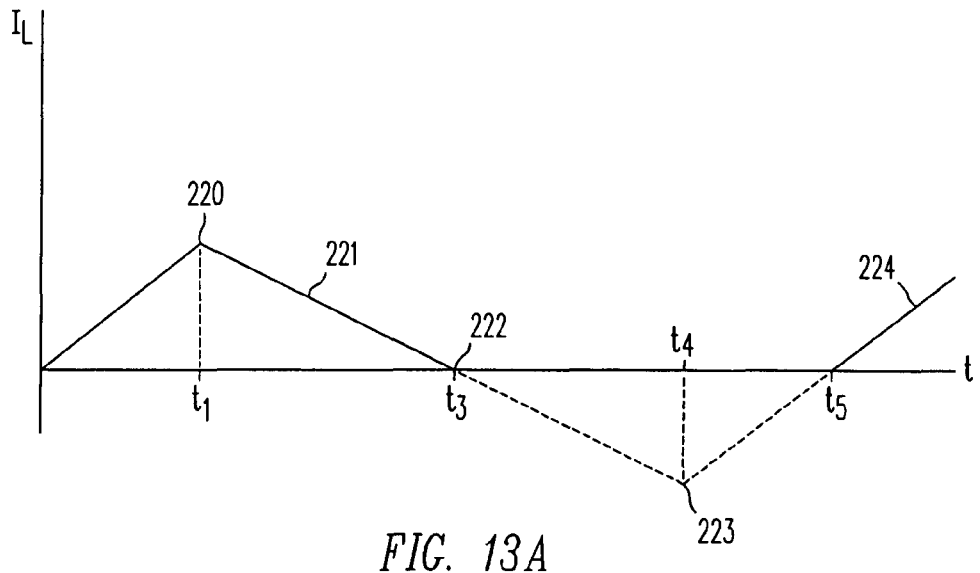
FIG. 13A is a graph of the inductor current during the operation of a synchronous boost converter in light-load conditions, showing a reverse current.
Figure 13B:
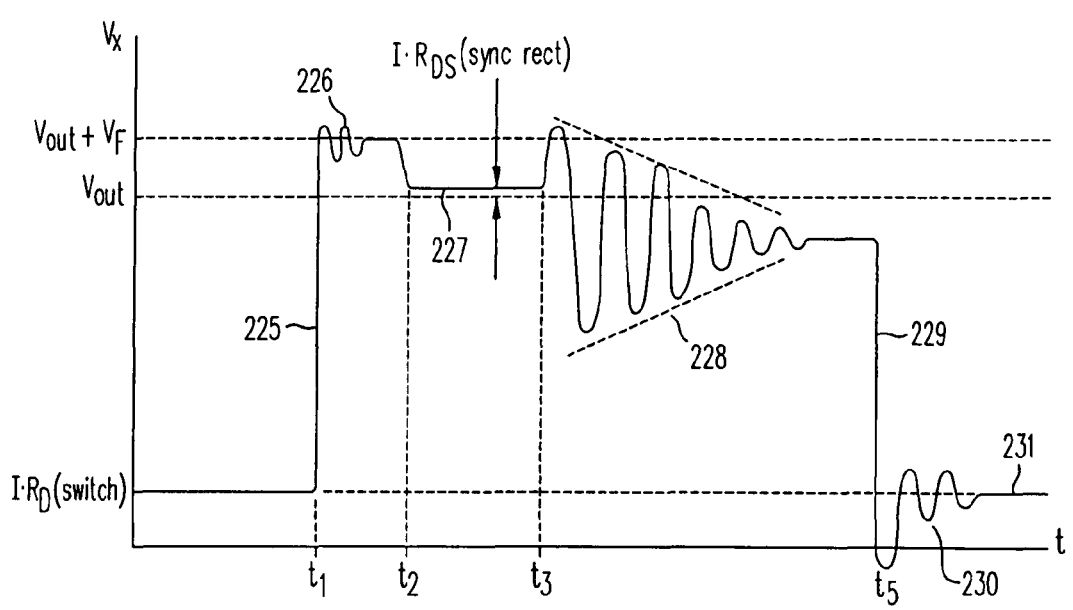
FIG. 13B is a graph of the intermediate voltage during the operation of a synchronous boost converter in light-load conditions.
Figure 14:
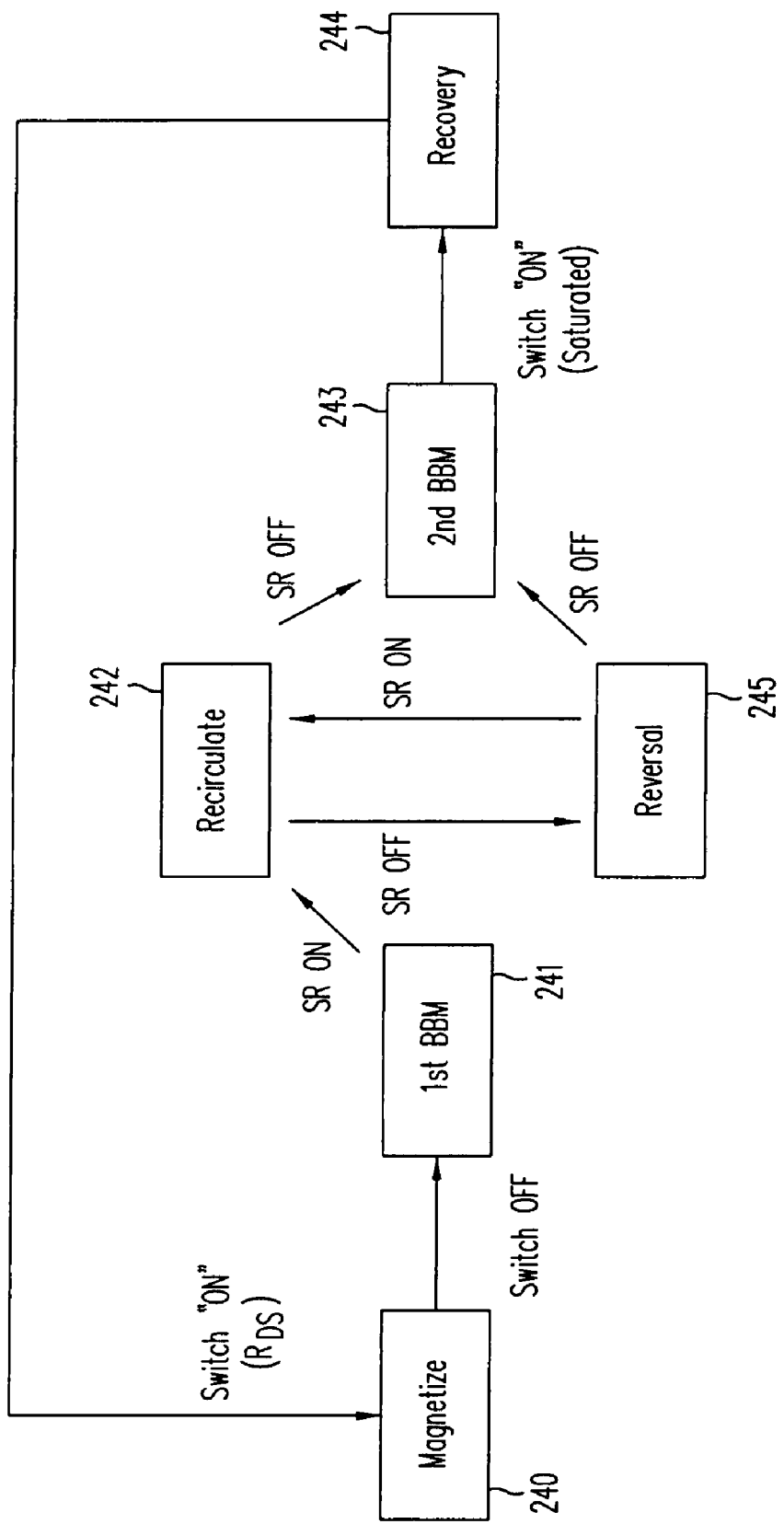
FIG. 14 is an operational flow chart for synchronous Buck and boost converters including light-load operation.

In contrast to the conventional synchronous boost converter 190 shown in FIG. 11, the synchronous rectifier 708 is not switched between its linear-region and off, but in lieu of being off, a current source or voltage source biases MOSFET 708 into saturation conducting a controlled low-current.

Diode 710 is a P-N diode intrinsic to synchronous rectifier MOSFET 708, regardless whether synchronous rectifier is a P-channel or an N-channel device. Diode 702 is a P-N junction diode intrinsic to N-channel low-side MOSFET 701. A gate buffer circuit 706 drives the gate of MOSFET 708.

At start-up, when power is first connected to converter 700, $V_{out}$ is pre-biased to a positive voltage $V_{out}(0-)$ because diode 710 becomes forward-biased and charges capacitor 711 to a voltage one forward-biased diode-drop below the battery input, i.e. $V_{out}(0-)=V_{batt}-V_f$. After pre-biasing, operation of the synchronous boost converter commences according to Table 11:

TABLE 11

| Mode | Low-Side MOSFET | Floating MOSFET | $I_L$ Direction | Diode Bias |
|---|---|---|---|---|
| Magnetization | On Switch ($R_{DS}$) | Off or On Current Source | To Ground | Reverse Bias (RB) |
| BBM | Off | Off or On Current Source | To Output | Forward Bias (FB) |
| Recirculation | Off | On Switch ($R_{DS}$) | | Shunted FB |
| BBM | Off | On Current Source | | Forward Bias (FB) |
| Recovery | On Current Source | On Current Source | | Reverse Recovery |

Synchronous boost converter operation involves turning on low-side MOSFET 701 in its linear region of operation, i.e. operating as a "switch", and magnetizing inductor 709 while synchronous rectifier MOSFET 708 acts as a current source. Since MOSFET 708 is a P-channel, whenever its gate is grounded by buffer 706 it is biased in its linear region with a low resistance. When its gate is connected to $V_{BIAS}$, the MOSFET is saturated conducting a controlled low current. The bias voltage may be created using similar techniques disclosed for the low-side synchronous rectifier in a Buck converter including either a current mirror gate drive, adjusting the bias voltage with current feedback, or a bandgap voltage reference trimmed to bias MOSFET 708 to a specific magnitude.

Assuming that the converter's output of converter 700 is pre-biased to some potential above ground to a voltage $V_{out}(0-)$ then turning on MOSFET 701 pulls $V_x$ to a voltage near ground and diode 710 is reverse-biased. Since MOSFET 708 acts as a current source, it shunts current from diode 710, reducing charge storage in diode 710 and limiting the efficiency and noise problems described above.

Viewing FIGS. 15A, 15B and 24, it is evident that a DC/DC converter according to this invention includes three current paths joined together at a common node. The first current path extends from a terminal representing the first input voltage rail, $V_{batt}$ for example. The second current path extends from a second terminal representing a second input voltage rail, ground for example. The third current path extends from the output terminal of the converter. These three current paths are joined together at a common node where the intermediate voltage $V_x$ is present. In some embodiments, the second current path includes a MOSFET (such as MOSFETs 308 and 326) which is operated as a current source in the manner described above. In other embodiments, the third current path includes a MOSFET (such as MOSFET 708) which is operated as a current source in the manner described above.

While several embodiments of this invention have been described, these embodiments are intended to be illustrative and not limiting. Numerous additional and alternative embodiments within the broad scope of this invention while be apparent to persons of skill in the art.

A related patent application titled "MOSFET Gate Drive With Reduced Power Loss", application Ser. No. 11/890,942, filed concurrently herewith and incorporated herein by reference in its entirety, illustrates various circuit means by which to bias a power MOSFET's current in its saturation region.

We claim:

1. A method of converting a first DC voltage to a second DC voltage using a switched inductor voltage converter, the switched inductor voltage converter comprising a main MOSFET, a synchronous rectifier MOSFET, and an inductor, the method comprising: switching the synchronous rectifier MOSFET between a fully-on state and a low-current state, wherein the synchronous rectifier MOSFET is never turned fully off and carries a current in the range of 0.5 A to 5 A in the fully-on state and a current in the range of 1 µA to 1 mA in the low-current state; and operating the switched inductor voltage converter in a switching sequence comprising a magnetization interval wherein the main MOSFET is turned on, a first break-before-make interval wherein the main MOSFET is turned off; a recirculation interval wherein the main MOSFET is turned off and the synchronous rectifier MOSFET is switched to the fully-on state, a second break-before-make interval wherein the main MOSFET is turned off and the synchronous rectifier MOFET is switched to the low current state, and a diode recovery interval.

2. The method of claim 1 comprising switching the synchronous rectifier MOSFET to the low-current state in the magnetization interval.

3. The method of claim 2 comprising switching the synchronous rectifier MOSFET to the low-current state in the first break-before-make interval.

4. The method of claim 1 comprising switching the synchronous rectifier MOSFET to the low-current state in the diode recovery interval.

5. The method of claim 1 comprising operating the switched inductor voltage converter in a light-load condition wherein the switching sequence comprises a current reversal interval following the recirculation interval, the method comprising switching the synchronous rectifier MOSFET to the low-current state in the current reversal interval.

6. A method of converting a first DC voltage to a second DC voltage using a switched inductor voltage converter, the switched inductor voltage converter comprising a synchronous rectifier MOSFET, a power MOSFET and an inductor, the method comprising switching the synchronous rectifier MOSFET between a fully-on state and a low-current state, wherein the synchronous rectifier MOSFET is never turned fully off and carries a current in the range of 5 A to 50 A in the fully-on state and a current in the range of 100 µA to 300 mA in the low-current state.

7. The method of claim 6 comprising operating the switched inductor voltage converter in a switching sequence comprising a magnetization interval wherein the main MOSFET is turned on, a first break-before-make interval wherein the main MOSFET is turned off a recirculation interval wherein the main MOSFET is turned off and the synchronous rectifier MOSFET is switched to the fully-on state, a second break-before-make interval wherein the main MOSFET is turned off, and a diode recovery interval, the method comprising switching the synchronous rectifier MOSFET to the low current state in the second break-before-make interval.

8. The method of claim 7 comprising switching the synchronous rectifier MOSFET to the low-current state in the magnetization interval.

9. The method of claim 8 comprising switching the synchronous rectifier MOSFET to the low-current state in the first break-before-make interval.

10. The method of claim 7 comprising switching the synchronous rectifier MOSFET to the low-current state in the diode recovery interval.

11. The method of claim 7 comprising operating the switched inductor voltage converter in a light-load condition wherein the switching sequence comprises a current reversal interval following the recirculation interval, the method comprising switching the synchronous rectifier MOSFET to the low-current state in the current reversal interval.

12. A method of converting a first DC voltage to a second DC voltage comprising:
providing a circuit, the circuit comprising a first MOSFET, a second MOSFET and an inductor;
connecting the first DC voltage to the circuit; and
switching the MOSFETs, the first MOSFET being switched repeatedly between an on condition and an off condition, the second MOSFET being switched repeatedly between an on condition and a condition wherein the second MOSFET operates as a current source;
the method further comprising switching the MOSFETs in a sequence consisting of:
a first period wherein the first MOSFET is maintained in an on condition and the second MOSFET is operated solely as a current source, followed by;
a second period wherein the first MOSFET is maintained in an off condition and the second MOSFET is operated as a current source, followed by;
a third period wherein the first MOSFET is maintained in an off condition and the second MOSFET is maintained in an on condition, followed by;
a fourth period wherein the first MOSFET is maintained in an off condition and the second MOSFET is operated as a current source, and
repeating said sequence, wherein said fourth period of the sequence is immediately followed by the first period of the repetition of the sequence.

13. The method of claim 12 wherein operating the second MOSFET as a current source comprises applying a voltage between 10% and 125% of the extrapolated threshold voltage of the second MOSFET to the gate of the second MOSFET.

14. The method of claim 13 wherein operating the second MOSFET as a current source comprises applying a voltage between 25% and 100% of the extrapolated threshold voltage of the second MOSFET to the gate of the second MOSFET.

15. A method of converting a first DC voltage to a second DC voltage using a switched inductor voltage converter, the switched inductor voltage converter comprising a main MOSFET, a synchronous rectifier MOSFET, and an inductor, the method comprising switching the synchronous rectifier MOSFET between a fully-on state and a low-current state, the synchronous rectifier MOSFET never being in a fully-off state, wherein in the low-current state the synchronous rectifier MOSFET carries a low-current and in the fully-on state the synchronous rectifier MOSFET carries a high-current, the magnitude of the low-current being at least ten (10) times greater than a leakage current in the synchronous rectifier MOSFET when a gate-to-source voltage in the synchronous rectifier MOSFET is equal to zero and no greater than ten percent (10%) of a magnitude of the high-current.

16. The method of claim 15 wherein the magnitude of the low-current is no greater than one percent (1%) of the magnitude of the high-current.

17. The method of claim 16 wherein the magnitude of the low-current is at least one hundred (100) times greater the leakage current.

18. The method of claim 15 wherein the magnitude of the low-current is at least one hundred (100) times greater the leakage current.

* * * * *